US012628822B2

(12) United States Patent
Cannella et al.

(10) Patent No.: US 12,628,822 B2
(45) Date of Patent: May 19, 2026

(54) PLANT PATHOGEN DEFENCE ELICITORS

(71) Applicant: UNIVERSITÉ LIBRE DE BRUXELLES, Brussels (BE)

(72) Inventors: David Cannella, Ixelles (BE); Marco Zarattini, Ixelles (BE)

(73) Assignee: Universite Libre de Bruxelles, Brussels (BE)

( * ) Notice: Subject to any disclaimer, the term of this patent is extended or adjusted under 35 U.S.C. 154(b) by 757 days.

(21) Appl. No.: 18/019,685

(22) PCT Filed: Aug. 4, 2021

(86) PCT No.: PCT/EP2021/071800
§ 371 (c)(1),
(2) Date: Feb. 3, 2023

(87) PCT Pub. No.: WO2022/029192
PCT Pub. Date: Feb. 10, 2022

(65) Prior Publication Data

US 2023/0270110 A1 Aug. 31, 2023

(30) Foreign Application Priority Data

Aug. 5, 2020 (EP) .................................... 20189578

(51) Int. Cl.
*A01N 43/16* (2006.01)
*A01P 1/00* (2006.01)
*A01P 3/00* (2006.01)

(52) U.S. Cl.
CPC ................ *A01N 43/16* (2013.01); *A01P 1/00* (2021.08); *A01P 3/00* (2021.08)

(58) Field of Classification Search
None
See application file for complete search history.

(56) References Cited

U.S. PATENT DOCUMENTS

2010/0137568 A1* 6/2010 Shoseyov ................ C12P 7/10 568/903

FOREIGN PATENT DOCUMENTS

| | | | | |
|---|---|---|---|---|
| CN | 109966173 A | 7/2019 | | |
| WO | 2012101106 A1 | 8/2012 | | |
| WO | WO-2015168184 A1 * | 11/2015 | .............. | C12P 19/44 |
| WO | WO-2015200281 A1 * | 12/2015 | .............. | C12P 19/12 |

OTHER PUBLICATIONS

Sulej et al.; Antimicrobial and antioxidative potential of free and immobilised cellobiose dehydrogenase isolated from wood degrading fungi; Elsevier; Fungal Biology 123 (2019) 875-886 (Year: 2019).*
Blossom, Benedikt M, et al., Photobiocatalysis by a Lytic Polysaccharide Monooxygenase Using Intermittent Illumination. ACS Sustainable Chemistry Engineering, May 21, 2020, 8, 25, 9301-9310.
Dixit, P., et al., A screening approach for assessing lytic polysaccharide monooxygenase activity in fungal strains. Jul. 22, 2019, Biotechnology for Biofuels, vol. 12, No. 1, 185.
Higham, Christopher W et al., "Direct 1H NMR evidence for conversion of β-d-cellobiose to cellobionolactone by cellobiose dehydrogenase from Phanerochaete chrysosporium." FEBS Letters, No. 351, Aug. 29, 1994, pp. 128-132.
PCT International Search Report and Written Opinion; Application No. PCT/EP2021/071800 Universite Libre De Bruxelles, International filing date of Aug. 4, 2021, date of mailing Nov. 18, 2021, 12 pages.
Valenzuela, Susana V., et al., Differential activity of lytic polysaccharide monooxygenases on celluloses of different crystallinity. Effectiveness in the sustainable production of cellulose nanofibrils. Carbohydrate Polymers, vol. 207, Nov. 24, 2018, pp. 59-67.

* cited by examiner

*Primary Examiner* — Robert A Wax
*Assistant Examiner* — John W Lippert, III
(74) *Attorney, Agent, or Firm* — Patent Law Works LLP

(57) ABSTRACT

The invention relates to uses of, and methods employing, cellobionic acid or a phytopharmaceutically acceptable salt thereof as plant pathogen defence elicitor. Also provided are phytopharmaceutical compositions comprising cellobionic acid or a phytopharmaceutically acceptable salt thereof, and applications thereof. In certain preferred embodiments, the compositions may further comprise other oxidised cellodextrin(s) or may comprise oxidised cellodextrins and native cellodextrins. In certain preferred embodiments, the compositions may be produced by decomposition of cellulose by one or more lytic polysaccharide monooxygenases (LPMO).

20 Claims, 15 Drawing Sheets

Specification includes a Sequence Listing.

PLANT PATHOGEN DEFENCE ELICITORS

CROSS-REFERENCE TO RELATED APPLICATIONS

This application is a national phase entry under 35 U.S.C. § 371 of International Patent Application PCT/EP2021/071800, filed Aug. 4, 2021, designating the United States of America and published in English as International Patent Publication WO 2022/029192 on Feb. 10, 2022, which claims the benefit under Article 8 of the Patent Cooperation Treaty to European Patent Application Serial No. 20189578.6, filed Aug. 5, 2020, the entireties of which are hereby incorporated by reference.

FIELD OF THE INVENTION

The invention is broadly in the field of phytopharmaceutical compounds and compositions, and in particular relates to elicitors of natural plant defences (also commonly known as plant immune-system activator molecules, or 'bio-pesticides' in layman's terms), a class of environmental-friendly molecules that retard the infection and propagation of microbial pathogens on plants, and uses thereof.

BACKGROUND

The plant cell wall is a dynamic structure made up mostly of high molecular weights polysaccharides, i.e. cellulose, hemicellulose, and pectin. This complex mixture confers structural integrity and physical protection at the plant cells. Plant pathogens, including pathogenic fungi and pathogenic bacteria, use a variety of strategies to colonise plants and derive nutrients from their hosts.

For example, to overcome the cell wall phytopathogens may employ a heterogeneous consortium of enzymes referred to as Cell Wall Degrading Enzymes (CWDEs) (Kubicek et al. *Plant cell wall-degrading enzymes and their secretion in plant-pathogenic fungi*. Annu Rev Phytopathol. 2014, vol. 52, 427-51). While a variety of cellulolytic enzymes is required to decompose cellulose into glucose, the recently discovered Lytic Polysaccharide Monooxygenase (LPMO) family may be among the initial players in this process thus paving the way to other hydrolases. LPMO are a class of copper-enzymes that catalyse the oxidative cleavage of glycosidic bonds of recalcitrant polysaccharides including cellulose and chitin, and are widely distributed across bacterial and fungal kingdoms. LPMO are presently classified into seven "auxiliary activity" (AA) families (AA9, AA10, AA11, AA13, AA14, AA15 and AA16) according to the carbohydrate-active enzymes (www.cazy.org) database. The LPMO-driven oxidative cleavage of glucans can take place at either C1 or C4 position of pyranose ring, which can thus produce a mixtures of native and oxidised (C1-oxidised, C4-oxidised and/or C1- and C4-doubly oxidised) oligosaccharides of different degrees of polymerization.

Plant cells possess at least two partially overlapping layers of defence defined as pattern triggered immunity (PTI) and effector triggered immunity (ETI), that constitute the so-called plant immune system (Jones and Dangl. *The plant immune system*. Nature. 2006, vol. 444(7117), 323-9). ETI confers a narrow strain-specific resistance as it is initiated following the recognition of virulence effectors (Avirulence-proteins) by cytoplasmic resistance genes (R-genes). This generally causes a strong site-specific accumulation of reactive oxygen species (ROS) leading to apoptosis. In contrast, PTI provide a broad-spectrum protection. Evolutionarily-conserved pathogen-associated molecular-pattern (PAMPs) are sensed by plants through a plethora of plasma membrane-anchored pattern-recognition receptors (PRRs) (Albert et al. *Surface Sensor Systems in Plant Immunity*. Plant Physiol. 2020, vol. 182(4), 1582-1596). For example, flagellin (FLG22) and chitin, two well-characterized PAMPs, are perceived by leucine-rich repeat receptor like kinase (LRR-RLK), such as FLS2 and CERK1, respectively. In addition, plants can self-trigger PTI by recognising damage-associated molecular patterns (DAMPs) (Boller and Felix. *A renaissance of elicitors: perception of microbe-associated molecular patterns and danger signals by pattern-recognition receptors*. Annu Rev Plant Biol. 2009, vol. 60, 379-406; Jones and Dangl. 2006, supra). DAMPs may comprise certain cell wall-derived molecules as well as de novo synthesised stress-associated peptides. In particular, pectin fragments and oligogalacturonides (OGs) are prominent DAMPs known to be recognised by cell wall-associated kinases (WAKs) receptors (Kohorn et al. *Cell Wall-Associated Kinases and Pectin Perception*. J Exp Bot. 2016, vol. 67(2), 489-94; Ferrari et al. *Oligogalacturonides: plant damage-associated molecular patterns and regulators of growth and development*. Front. Plant Sci. 2013, vol. 4, 49). Common signalling events underlying PTI involve $Ca^{2+}$ influx into cytoplasm, activation of mitogen-activated protein kinase (MAPK) cascades, apoplastic reactive oxygen species (ROS) accumulation and an extensive transcriptional reprogramming including transcription factors (Yu et al. *From Chaos to Harmony: Responses and Signaling upon Microbial Pattern Recognition*. Annu Rev Phytopathol. 2017, vol. 55, 109-137). Concomitant with transcriptional responses during PTI, plants produce different signalling hormones such as salicylic acid (SA), jasmonic acid (JA) and ethylene (ET), while callose deposition at the cell wall occurs a few hours after PTI activation.

Compounds, which when perceived by a plant give rise to such defence responses, are commonly referred to as plant pathogen defence elicitors, plant elicitors or simply elicitors. Previously, studies have been conducted on the elicitor properties of oligogalacturonides (OGs), a class of DAMPs deriving from pectin hydrolysis catalysed by polygalacturonase (PG) enzymes (Ferrari et al. 2013, supra). Only recently, a few other cell wall-deriving compounds, in particular cellobiose, xyloglucan and non-branched β-1,3-glucan were identified acting as DAMPs (Souza et al. *Cellulose-derived oligomers act as damage-associated molecular patterns and trigger defense-like responses*. Plant Physiol. 2017, vol. 173, 2383-2398; Claverie et al. *The Cell Wall-Derived Xyloglucan Is a New DAMP Triggering Plant Immunity in Vitis vinifera and Arabidopsis thaliana. Front. Plant Sci.* 2018, vol. 9, 1725; Mélida, et al. *Non-branched β-1,3-glucan oligosaccharides trigger immune responses in Arabidopsis*. Plant J. 2018, vol. 93(1), 34-49).

The agricultural industry is engaged in a relentless fight against plant pathogens, exacerbated by an ever-changing environment due to inter alia climate changes, striving to avoid major economical yearly losses and uncertainty in the food supply chain. While only a small variety of chemicals are in common use as pesticides or fungicides, even this reservoir is diminishing, due to emerging biological resistance in plant pathogens, and because of the side effects of some of these chemicals compounds on human health. Therefore, there is an urgent need for new plant protection compounds and compositions.

SUMMARY

As evidenced by the experimental section, which sets forth certain illustrative embodiments of the invention, the present inventors have for the first time demonstrated that cellobionic acid acts as a potent plant defence elicitor. Further, the inventors have demonstrated that compositions comprising oxidised cellodextrins, as well as compositions comprising both native and oxidised cellodextrins, such as in particular compositions comprising one or more native cellodextrin in combination with one or more C1-oxidised cellodextrin, one or more C4-oxidised cellodextrin, and/or one or more C1- and C4-oxidised cellodextrin (i.e., doubly oxidised cellodextrins), display advantageous plant elicitor potential. In certain examples, the inventors have shown strong plant elicitor activity for mixtures of native and oxidised cellodextrins produced by decomposition of cellulose by one or more lytic polysaccharide monooxygenase (LPMO).

Accordingly, an aspect of the invention provides use of cellobionic acid or a phytopharmaceutically acceptable salt thereof as plant pathogen defence elicitor. A related aspect concerns a method for activating plant defence against plant pathogens comprising contacting a plant with an effective amount of cellobionic acid or a phytopharmaceutically acceptable salt thereof. A further aspect provides a phytopharmaceutical composition comprising cellobionic acid or a phytopharmaceutically acceptable salt thereof, and a phytopharmaceutically acceptable carrier. In a particularly preferred embodiment, the carrier may include an anionic, non-ionic, amphoteric, and/or cationic surfactant. Hence, particularly provided is a phytopharmaceutical composition comprising cellobionic acid or a phytopharmaceutically acceptable salt thereof, and a phytopharmaceutically acceptable carrier comprising or selected from one or more anionic, non-ionic, amphoteric, or cationic surfactant, or a combination thereof.

A further aspect of the invention provides use of (i) one or more cellodextrin (i.e., native or not oxidised cellodextrins) and (ii) one or more C1-oxidised cellodextrin (aldonic acids) or a phytopharmaceutically acceptable salt thereof, one or more C4-oxidised cellodextrin (4-ketoaldoses or gemdiols), and/or one or more C1- and C4-oxidised cellodextrin (4-keto-oligochaccharide-1-aldonic acids) or a phytopharmaceutically acceptable salt thereof, such as in a composition comprising these components, as plant pathogen defence elicitor. A related aspect concerns a method for activating plant defence against plant pathogens comprising contacting a plant with an effective amount of the aforementioned components (i) and (ii). A further aspect provides a phytopharmaceutical composition comprising the aforementioned components (i) and (ii), and a phytopharmaceutically acceptable carrier, such as a phytopharmaceutically acceptable carrier comprising one or more anionic, non-ionic, amphoteric, or cationic surfactant, or a combination thereof.

A further aspect of the invention provides use of one or more C4-oxidised cellodextrin (i.e., 4-ketoaldoses or gemdiols) as plant pathogen defence elicitor. A related aspect concerns a method for activating plant defence against plant pathogens comprising contacting a plant with an effective amount of one or more C4-oxidised cellodextrin. A further aspect provides a phytopharmaceutical composition comprising one or more C4-oxidised cellodextrin, and a phytopharmaceutically acceptable carrier, such as a phytopharmaceutically acceptable carrier comprising one or more anionic, non-ionic, amphoteric, or cationic surfactant, or a combination thereof.

A further aspect of the invention provides use of one or more C1- and C4-oxidised (i.e., doubly oxidised) cellodextrin (i.e., 4-keto-oligochaccharide-1-aldonic acids) or a phytopharmaceutically acceptable salt thereof, as plant pathogen defence elicitor. A related aspect concerns a method for activating plant defence against plant pathogens comprising contacting a plant with an effective amount of one or more C1- and C4-oxidised cellodextrin or a phytopharmaceutically acceptable salt thereof. A further aspect provides a phytopharmaceutical composition comprising one or more C1- and C4-oxidised cellodextrin or a phytopharmaceutically acceptable salt thereof, and a phytopharmaceutically acceptable carrier, such as a phytopharmaceutically acceptable carrier comprising one or more anionic, non-ionic, amphoteric, or cationic surfactant, or a combination thereof.

Methods and uses which employ the phytopharmaceutical composition to elicit plant protection against pathogens are also provided.

These and further aspects and preferred embodiments of the invention are described in the following sections and in the appended claims. The subject-matter of the appended claims is hereby specifically incorporated in this specification.

BRIEF DESCRIPTION OF DRAWINGS

FIG. 3 illustrates analysis of early transcriptomic changes in *Arabidopsis* seedlings treated with LPMO products (AA9_COS) and cellobiose.

FIG. 5 illustrates the comparison between transcriptomic changes induced by AA9_COS (COS) or by cellobiose (CB) treatments.

FIG. 16 illustrates phytohormones quantification.

DESCRIPTION OF EMBODIMENTS

Figure 1A:
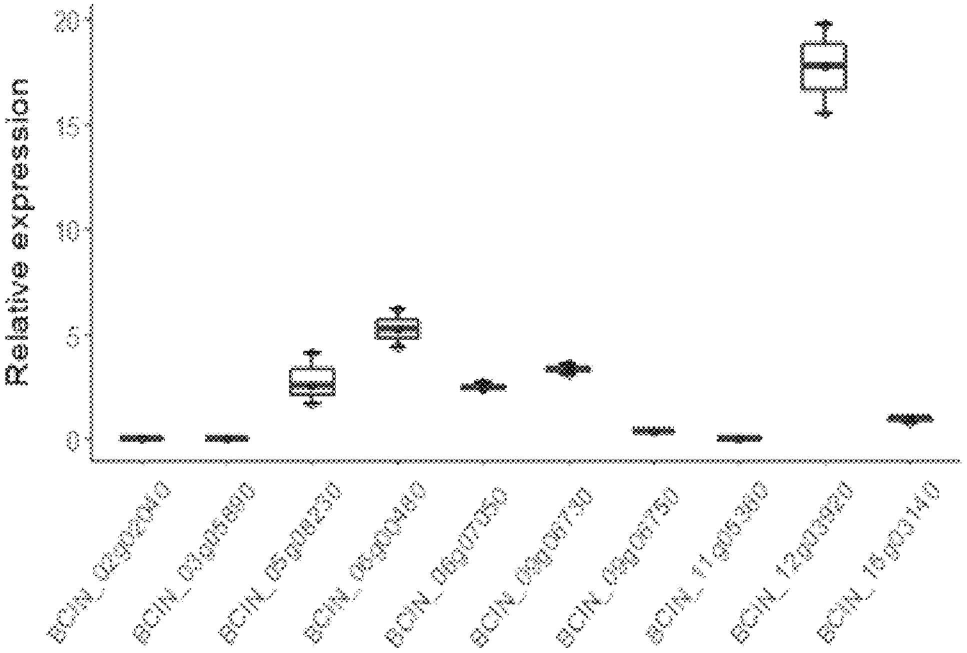
FIG. 1 illustrates (FIG. 1A) LPMOs gene expression during *Arabidopsis-B. cinerea* interaction. Five-week old *Arabidopsis* plants were drop-treated with *B. cinerea* spores ($10^5$ spores $ml^{-1}$) and LPMOs gene expression was evaluated 48 hours post fungus infection.
FIG. 1B) Sequence based comparison of BcAA9s with AA9s characterized biochemically and structurally. Phylogenetic tree was created based on alignment of catalytic modules only. The oxidative regiospecificity (C1, blue; C4, green; C1/C4, red) is indicated for each characterised LPMO. AA9s from *B. cinerea* are labelled with arrows.
FIG. 1C) Structural comparison between TtAA9E and BCIN_12g03920 was built using the Swiss-Model Server and the TtAA9E crystal structure obtained from the protein data bank (PDB:3EII). The structural models are shown in ribbon representation and copper ion shown as a blue sphere.
(FIG. 1D) HPAEC-PAD analysis of the products generated by TtAA9E using PASC 0.5% (w/v) as cellulosic substrate. Glc2: cellobiose, Glc3: cellotriose, Glc4: cellotetraose, Glc5: cellopentaose, GlcGlc1A: cellobionic acid, Glc2Glc1A: cellotrionic acid, Glc3Glc1A: cellotetraonic acid, Glc4Glc1A: cellopentaoinic acid, Glc5Glc1A: cellohexaoinic acid, Glc6Glc1A: celloeptaonic acid, Glc7Glc1A: cellooctaonic acid.

As used herein, the singular forms “a”, “an”, and “the” include both singular and plural referents unless the context clearly dictates otherwise.

The terms “comprising”, “comprises” and “comprised of” as used herein are synonymous with “including”, “includes” or “containing”, “contains”, and are inclusive or open-ended and do not exclude additional, non-recited members, elements or method steps. The terms also encompass “consisting of” and “consisting essentially of”, which enjoy well-established meanings in patent terminology.

The recitation of numerical ranges by endpoints includes all numbers and fractions subsumed within the respective ranges, as well as the recited endpoints. This applies to numerical ranges irrespective of whether they are introduced by the expression “from . . . to . . . ” or the expression “between . . . and . . . ” or another expression.

The terms "about" or "approximately" as used herein when referring to a measurable value such as a parameter, an amount, a temporal duration, and the like, are meant to encompass variations of and from the specified value, such as variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more members or at least one member of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members. In another example, "one or more" or "at least one" may refer to 1, 2, 3, 4, 5, 6, 7 or more.

The discussion of the background to the invention herein is included to explain the context of the invention. This is not to be taken as an admission that any of the material referred to was published, known, or part of the common general knowledge in any country as of the priority date of any of the claims.

Throughout this disclosure, various publications, patents and published patent specifications are referenced by an identifying citation. All documents cited in the present specification are hereby incorporated by reference in their entirety. In particular, the teachings or sections of such documents herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the invention. When specific terms are defined in connection with a particular aspect of the invention or a particular embodiment of the invention, such connotation or meaning is meant to apply throughout this specification, i.e., also in the context of other aspects or embodiments of the invention, unless otherwise defined.

In the following passages, different aspects or embodiments of the invention are defined in more detail. Each aspect or embodiment so defined may be combined with any other aspect(s) or embodiment(s) unless clearly indicated to the contrary. In particular, any feature indicated as being preferred or advantageous may be combined with any other feature or features indicated as being preferred or advantageous.

Reference throughout this specification to "one embodiment", "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

Aspects of the invention relate to use of:

- cellobionic acid or a phytopharmaceutically acceptable salt thereof,
- compositions comprising (i) one or more cellodextrin (i.e., native or not oxidised cellodextrins) and (ii) one or more C1-oxidised cellodextrin or a phytopharmaceutically acceptable salt thereof, one or more C4-oxidised cellodextrin, and/or one or more C1- and C4-oxidised cellodextrin or a phytopharmaceutically acceptable salt thereof,
- one or more C4-oxidised cellodextrin; or
- one or more C1- and C4-oxidised cellodextrin or a phytopharmaceutically acceptable salt thereof, as plant pathogen defence elicitor.

Corresponding methods for activating plant defence against plant pathogens comprising contacting a plant with an effective amount of such substances or compositions are also provided, and so are phytopharmaceutical compositions comprising said substances and a phytopharmaceutically acceptable carrier. Such methods may also be deemed as ones for obtaining a plant that is resistant to a pathogen.

Cellobionic acid is a disaccharide consisting of beta-D-glucosyl and D-gluconic acid residues joined by a (1→4) linkage. Chemical names include 4-O-β-D-glucopyranosyl-D-gluconic acid, 4-O-β-D-glucosyl-D-gluconic acid, β-D-glucosyl-(1→4)-D-gluconic acid, and maltobionic acid. The compound is thus a disaccharide and a carbohydrate acid, displays the molecular formula $C_{12}H_{22}O_{12}$, and can be illustrated by any one of the representative structural formulas (I) or (II):

(I)

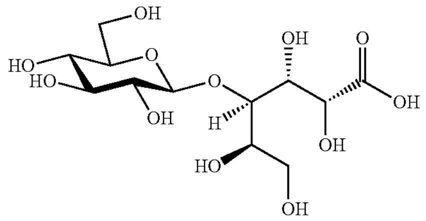

(II)

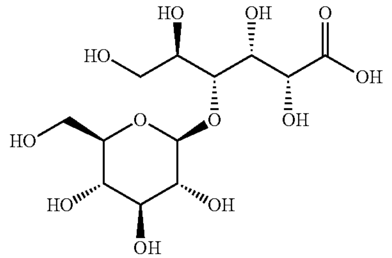

Cellobionic acid can thus also be seen as C1-oxidised form of cellobiose, or an aldonic acid counterpart of cellobiose. Cellobiose is a disaccharide consisting of two glucose units joined by a beta (1→4) linkage, i.e., β-D-glucopyranosyl(1→4)D-glucopyranose, with the molecular formula $C_{12}H_{22}O_{11}$, and can be illustrated by any one of the representative structural formulas (III) or (IV):

(III)

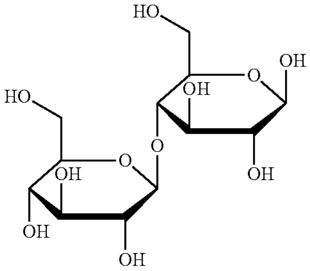

(IV)

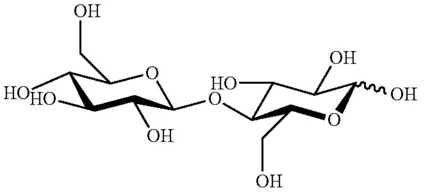

The term "cellodextrin" refers to any one of or to a population or mixture of two or more low-molecular-weight carbohydrates composed of two or more beta (1→4)-linked glucose monomers. Cellodextrins can thus be denoted as linear β-1,4-D-gluco-oligosaccharides. Cellodextrins may be typically produced via hydrolysis of cellulose, such as particularly via enzymatic hydrolysis of cellulose. Hence, by means of illustration, cellobiose is a cellodextrin composed of two beta (1→4)-linked glucose monomers, whereas cellotriose, cellotetraose, and cellopentaose are cellodextrins composed to three, four, and five beta (1→4)-linked glucose monomers, respectively. The number of linked glucose monomers in a cellodextrin, i.e., the degree of polymerisation (DP) of a cellodextrin, can be variable, such as without limitation from 2 to 20, or from 2 to 15, or from 2 to 10, such as for example 2, 3, 4, 5, 6, 7, 8, 9 or 10. For example, a cellodextrin population or mixture may contain cellodextrins with a variety of degrees of polymerisation, such as cellodextrins with DP from 2 to 20, or from 2 to 15, or from 2 to 10, or from 2 to 8. By means of examples and without limitation, the number-average or the weight-average degree of polymerisation of a population or mixture of cellodextrins may be between 2 and 10, such as between 3 and 7, such as for example about 3, about 4, about 5, about 6 or about 7.

Hence, the term "cellodextrin" when used herein without further qualification particularly refers to native cellodextrins or populations or mixtures of native cellodextrins. "Native" in this context means that neither the free anomeric carbon atom at position 1 (C1) of the glucose moiety at the reducing end of the cellodextrin, nor the carbon at position 4 (C4) of the glucose moiety at the non-reducing end of the cellodextrin are further oxidised. In other words, in a native cellodextrin the glucose moiety at the reducing end of the cellodextrin can be represented as follows (formula V), (V)

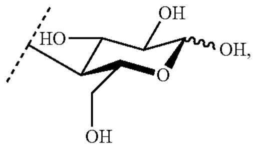

and the glucose moiety at the non-reducing end of the cellodextrin can be represented as follows (formula VI):

(VI)

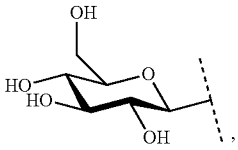

wherein the dashed line indicates the point of attachment (via —O—) to the remainder of the cellodextrin molecule.

The reference to "oxidised cellodextrin" encompasses cellodextrins in which at least one carbon atom is further oxidised, such as in particular where a carbon atom carrying a hydroxyl (—OH) group is further oxidised to a carbon atom carrying an oxy (═O) group or two hydroxyl (—OH) groups, or where the hemiacetal carbon is further oxidised to a carboxyl group (—COOH). In particular, oxidised cellodextrins encompass C1-oxidised cellodextrins (aldonic acids), C4-oxidised cellodextrins (4-ketoaldoses or gemdiols), as well as C1- and C4-oxidised cellodextrin (doubly oxidised cellodextrins, 4-keto-oligosaccharide-1-aldonic acids).

In C1-oxidised cellodextrins, the anomeric carbon atom at position 1 (C1) of the glucose moiety at the reducing end of the cellodextrin is oxidised to a carboxyl group, providing for a gluconic acid moiety, which can be represented as follows (formula VII):

(VII)

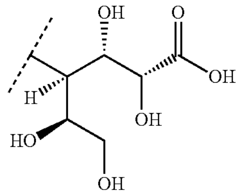

wherein the dashed line indicates the point of attachment (via —O—) to the remainder of the C1-oxidised cellodextrin molecule. Non-limiting examples of C1-oxidised cellodextrins include linear oligomers of the following structure: (D-glucosyl-(1→4))$_n$(1→4)-D-gluconic acid, in which n is degree of polymerisation minus 1, e.g., in which n is 1, 2, 3, 4, 5 or 6. Non-limiting examples of C1-oxidised cellodextrins include cellobionic acid (DP=2), cellotrionic acid (DP=3), cellotetraonic acid (DP=4), cellopentaonic acid (DP=5), etc., e.g., DP=6, 7, 8, 9 or 10.

In C4-oxidised cellodextrins, the carbon atom at position 4 (C4) of the glucose moiety at the non-reducing end of the cellodextrin is present as a keto (—C(═O)—) or gemdiol (—C(—OH)$_2$—) group, providing for a moiety, which can be represented as follows (formulas VIII and IX).

(VIII)

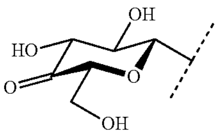

-continued (IX)

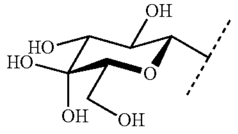

wherein the dashed line indicates the point of attachment (via —O—) to the remainder of the C4-oxidised cellodextrin molecule. Non-limiting examples of C4-oxidised cellodextrins include linear oligomers of the following structure: 4-dehydro-β-D-glucosyl-(1→4)(β-D-glucosyl-(1→4))$_n$, in which n is degree of polymerisation minus 1, e.g., in which n is 1, 2, 3, 4, 5 or 6. Non-limiting examples of C4-oxidised cellodextrins include 4-ketocellobiose (DP=2), 4-ketocellotriose (DP=3), 4-ketocellotetraose (DP=4), 4-ketocellopentaose (DP=5), etc., e.g., DP=6, 7, 8, 9 or 10.

In C1- and C4-oxidised (i.e., doubly oxidised) cellodextrins, both of the above applies. Non-limiting examples of C1- and C4-oxidised cellodextrins include linear oligomers of the following structure: 4-dehydro-β-D-glucosyl-(1→4)(β-D-glucosyl-(1→4))$_m$(1→4)-D-gluconic acid, in which m is degree of polymerisation minus 2, e.g., in which m is 0, 1, 2, 3, 4 or 5. Such molecules can also be denoted as 4-keto-biose-1-aldonic acid (DP=2), 4-keto-triose-1-aldonic acid (DP=3), 4-keto-tetraose-1-aldonic acid (DP=4), 4-keto-pentaose-1-aldonic acid (DP=5), 4-keto-exaose-1-aldonic acid (DP=6), and so on, e.g., DP=7, 8, 9 or 10.

In C1-oxidised, C4-oxidised and C1- and C4-oxidised cellodextrins as intended herein, the oxidation states of the carbon atoms other than the C1 carbon of the gluconic acid moiety and/or the C4 carbon of the 4-ketoglucose moiety at the non-reducing end are preferably the same as in a native cyclodextrin.

The reference to any compound as intended herein, such as cellobionic acid or a native or oxidised cellodextrin, may encompass the given compound as well as any phytopharmaceutically acceptable forms of such compound, such as any addition salts, hydrates or solvates of the compound. The term "phytopharmaceutically acceptable" as used herein inter alia in connection with compound forms such as salts, hydrates, solvates, as well as in connection with carriers (such as vehicles, supports, solvents, etc.), is consistent with the art and means not deleterious to the recipient plant, such as not producing any adverse effects when applied to a plant or to an organ of the plant, and where applicable, compatible with any other ingredients of a phytopharmaceutical composition. Phytopharmaceutically acceptable acid and base addition salts are meant to comprise the phytopharmaceutically active non-toxic acid and base addition salt forms which the compound is able to form. Such salts can conveniently be obtained by treating the base form of a compound with an appropriate acid. Appropriate acids comprise, for example, inorganic acids such as hydrohalic acids, e.g. hydrochloric or hydrobromic acid, sulfuric, nitric, phosphoric and the like acids; or organic acids such as, for example, acetic, propanoic, ascorbic, gallic, hydroxyacetic, lactic, pyruvic, malonic, succinic (i.e. butanedioic acid), maleic, fumaric, dehydroascorbic, malic, tartaric, citric, methanesulfonic, ethanesulfonic, benzenesulfonic, p-toluenesulfonic, cyclamic, salicylic, p-aminosalicylic, pamoic, coumaric, ferulic, caffeic, sinapic, cinnamic, resveratrol, catechin, 3-hydroxyl-antranilic, L-DOPA, melanin, eumelanin, lignols, vanillic, vanillin and the like acids. Conversely said salt forms can be converted by treatment with an appropriate base into the free base form. A compound containing an acidic proton (such as cellobionic acid, aldonic acids) may also be converted into its non-toxic metal or amine addition salt forms by treatment with appropriate organic and inorganic bases. Appropriate base salt forms comprise, for example, the ammonium salts, the alkali and earth alkaline metal salts, e.g. the lithium, sodium, potassium, magnesium, calcium salts and the like, aluminum salts, zinc salts, salts with organic bases, e.g. primary, secondary and tertiary aliphatic and aromatic amines such as methylamine, ethylamine, propylamine, isopropylamine, the four butylamine isomers, dimethylamine, diethylamine, diethanolamine, dipropylamine, diisopropylamine, di-n-butylamine, pyrrolidine, piperidine, morpholine, trimethylamine, triethylamine, tripropylamine, quinuclidine, pyridine, quinoline and isoquinoline; the benzathine, N-methyl-D-glucamine, hydrabamine salts, and salts with amino acids such as, for example, arginine, lysine and the like. Conversely the salt form can be converted by treatment with acid into the free acid form. The term solvate comprises the hydrates and solvent addition forms which the compound is able to form, as well as the salts thereof. Examples of such forms are, e.g., hydrates, alcoholates and the like.

Any compound as intended herein may be a part of a composition. The term "composition" generally refers to a thing composed of two or more components, and more specifically particularly denotes a mixture or a blend of two or more materials, such as elements, molecules, substances, biological molecules, or microbiological materials, as well as reaction products and decomposition products formed from the materials of the composition. By means of an example, a composition may comprise any compound as taught herein in combination with one or more other compounds or substances, be it one or more other compounds as taught herein or one or more other compounds or substances. For example, a composition may be obtained by combining, such as admixing, a compound as taught herein with said one or more other compounds or substances. For example, a composition may be obtained by decomposing a starting material, such as cellulose, into a mixture of a plurality of decomposition products. In certain embodiments, the present compositions may be configured as phytopharmaceutical compositions. Phytopharmaceutical compositions typically comprise one or more active ingredients (chemically and/or biologically active materials having one or more beneficial effects on plant health) and one or more phytopharmaceutically acceptable carriers. Compositions as typically used herein may be liquid, semisolid (e.g., gel), solid, or volatile or vapour-based, and may include solutions or dispersions, such as for example suspensions, emulsions, oil-in-water emulsions, water-in-oil emulsions, gelified aqueous solution or dispersion, solutions comprising a volatile organic solvent, etc. Examples of solid forms include, without limitation, powder, granules, pellets, water dispersible powder, water dispersible granules or water dispersible pellets. The composition may be formulated as a concentrate to be diluted before use, such as, for example, a soluble concentrate, an emulsifiable concentrate, a liquid concentrate and the like.

As used herein, the term "carrier" broadly includes any and all solvents, diluents, bulking agents, buffers for pH control, dispersant, solubilisers, surfactants, wetting agents, emulsifiers, tackifiers, thickeners, binders, preservatives, antioxidants, cuticle solubilising molecules, natural or regenerated mineral substances, and the like, and combinations thereof. Such materials should not be non-toxic to the plants and should not interfere with the activity of the actives.

A preferred example of a phytopharmaceutically acceptable solvent is water, hence, compositions as taught herein may comprise water, i.e., may be aqueous solutions or dispersions. Further examples of suitable solvents include, but are not limited to, aromatic hydrocarbons, such as, for example, xylene mixtures or substituted naphthalenes; phthalates, such as, for example, dibutyl phthalate or dioctyl phthalate; aliphatic hydrocarbons, such as, for example, cyclohexane or paraffins; alcohols and glycols and their ethers and esters, such as, for example, ethanol, ethylene glycol, ethylene glycol mono methyl or monoethyl ether; ketones, such as, for example, cyclohexanone; strongly polar solvents, such as, for example, N-methyl-2-pyrrolidone, dimethyl sulfoxide or dimethylformamide; vegetable oils or epoxidised vegetable oils, such as, for example, epoxidised coconut oil or soybean oil; and water. In a particular aspect, the solvent is a volatile solvent, such as methanol and ethanol.

Non-limiting examples of solid carriers include, but are not limited to, natural mineral fillers, such as, for example, calcite, talcum, kaolin, montmorillonite or attapulgite; highly dispersed silicic acid or highly dispersed absorbent polymers; pumice, broken brick, sepiolite or bentonite; calcite or sand; dolomite or pulverized plant residues.

In certain embodiments, the compositions may comprise one or more surfactant, such as an anionic, non-ionic, amphoteric, or cationic surfactant, or a combination thereof, such as without limitation Triton X-100 ($C_{14}H_{22}O(C_2H_4O)_n$, non-ionic surfactant that has a hydrophilic polyethylene oxide chain (such as on average 9.5 ethylene oxide units) and an aromatic hydrocarbon hydrophobic group, 4-(1,1,3,3-tetramethylbutyl)-phenyl); a polysorbate-type non-ionic surfactant such as polyoxyethylene (20) sorbitan monolaurate (Tween-20), polyoxyethylene (20) sorbitan monopalmitate (Tween-40); and/or a non-ionic organosilicone surfactant such as Silwet® L-77 (3-(2-methoxyethoxy)propyl-methyl-bis(trimethylsilyloxy)silane).

In certain embodiments, the cellobionic acid or salt thereof may be comprised in a composition which further comprises one or more cellodextrin; one or more C1-oxidised cellodextrin, or a phytopharmaceutically acceptable salt thereof, one or more C4-oxidised cellodextrin; and/or one or more C1- and C4-oxidised cellodextrin, or a phytopharmaceutically acceptable salt thereof.

In certain embodiments, the one or more C4-oxidised cellodextrin may be comprised in a composition which further comprises one or more cellodextrin; one or more C1-oxidised cellodextrin, or a phytopharmaceutically acceptable salt thereof, and/or one or more C1- and C4-oxidised cellodextrin, or a phytopharmaceutically acceptable salt thereof.

In certain embodiments, the one or more C1- and C4-oxidised cellodextrin or salt thereof may be comprised in a composition which further comprises one or more cellodextrin; one or more C1-oxidised cellodextrin, or a phytopharmaceutically acceptable salt thereof, and/or one or more C4-oxidised cellodextrin.

In certain illustrative embodiments, the composition may comprise the components as set forth in the following table, '+' indicating presence, '−' indicating absence, 'A' indicating cellobionic acid or a phytopharmaceutically acceptable salt thereof, 'B' indicating one or more native cellodextrin, 'C' indicating one or more C1-oxidised cellodextrin other than cellobionic acid or a phytopharmaceutically acceptable salt thereof, 'D' indicating one or more C4-oxidised cellodextrin, and 'E' indicating one or more C1- and C4-oxidised cellodextrin or a phytopharmaceutically acceptable salt thereof.

| Composition | A | B | C | D | E |
|---|---|---|---|---|---|
| 1 | + | − | − | − | − |
| 2 | + | + | − | − | − |
| 3 | + | − | + | − | − |
| 4 | + | + | + | − | − |
| 5 | + | + | + | + | − |
| 6 | + | + | + | + | + |
| 28 | + | − | − | + | − |
| 29 | + | + | − | + | − |
| 30 | + | + | + | − | + |
| 31 | + | − | + | + | − |
| 32 | + | − | + | + | − |
| 33 | + | − | − | + | + |
| 34 | + | + | + | + | + |
| 35 | + | − | − | − | + |
| 36 | + | − | + | + | + |

In certain illustrative embodiments, the composition may comprise the components as set forth in the following table, '+' indicating presence, '−' indicating absence, 'A' indicating one or more native cellodextrin, 'B' indicating one or more C1-oxidised cellodextrin or a phytopharmaceutically acceptable salt thereof, 'C' indicating one or more C4-oxidised cellodextrin, and 'D' indicating one or more C1- and C4-oxidised cellodextrin or a phytopharmaceutically acceptable salt thereof:

| Composition | A | B | C | D |
|---|---|---|---|---|
| 7 | + | + | − | − |
| 8 | + | − | + | − |
| 9 | + | − | − | + |
| 10 | + | + | + | − |
| 11 | + | + | − | + |
| 12 | + | − | + | + |
| 13 | + | + | + | + |

In certain illustrative embodiments, the composition may comprise the components as set forth in the following table, '+' indicating presence, '−' indicating absence, 'A' indicating one or more C4-oxidised cellodextrin, 'B' indicating one or more native cellodextrin, 'C' indicating one or more C1-oxidised cellodextrin or a phytopharmaceutically acceptable salt thereof, and 'D' indicating one or more C1- and C4-oxidised cellodextrin or a phytopharmaceutically acceptable salt thereof:

| Composition | A | B | C | D |
|---|---|---|---|---|
| 14 | + | + | − | − |
| 15 | + | − | + | − |
| 16 | + | − | − | + |
| 17 | + | + | + | − |
| 18 | + | + | − | + |
| 19 | + | − | + | + |
| 20 | + | + | + | + |

In certain illustrative embodiments, the composition may comprise the components as set forth in the following table, '+' indicating presence, '−' indicating absence, 'A' indicating one or more C1- and C4-oxidised cellodextrin or a phytopharmaceutically acceptable salt thereof, 'B' indicating one or more native cellodextrin, 'C' indicating one or more C1-oxidised cellodextrin or a phytopharmaceutically acceptable salt thereof, and 'D' indicating one or more C4-oxidised cellodextrin:

| Composition | A | B | C | D |
|---|---|---|---|---|
| 21 | + | + | − | − |
| 22 | + | − | + | − |
| 23 | + | − | − | + |
| 24 | + | + | + | − |
| 25 | + | + | − | + |
| 26 | + | − | + | + |
| 27 | + | + | + | + |

In certain preferred embodiments, the degree of polymerization (DP) of any cellodextrin, C1-oxidised cellodextrin, C4-oxidised cellodextrin, and C1- and C4-oxidised cellodextrin as taught and employed herein may be each independently from 2 to 20, such as from 2 to 15, or from 2 to 10, or from 2 to 8, or from 2 to 5. In certain preferred embodiments, the number-average or the weight-average degree of polymerisation of a population or mixture of the cellodextrins, C1-oxidised cellodextrins, C4-oxidised cellodextrins, and C1- and C4-oxidised cellodextrins as taught and employed herein may be each independently between 2 and 10, such as between 3 and 7, such as for example about 3, about 4, about 5, about 6 or about 7.

In certain embodiments, the concentration of the cellobionic acid or salt thereof (e.g., in a (phytopharmaceutical) composition as taught herein) may be from 0.10 μM to 1000 μM, such as from 0.10 μM to 900 μM, from 0.10 μM to 800 μM, from 0.10 μM to 700 μM, or from 0.10 μM to 600 μM, preferably from 0.10 μM to 500 μM, such as from 0.10 μM to 400 μM, or from 0.10 μM to 300 μM, more preferably from 0.10 μM to 200 μM, even more preferably from 0.10 μM to 100 μM, such as about 0.10 μM, about 0.50 μM, about 1.0 μM, about 5.0 μM, about 10 μM, about 20 μM, about 30 μM, about 40 μM, about 50 μM, about 60 μM, about 70 μM, about 80 μM, about 90 μM, or about 100 μM.

In certain embodiments, the concentration of the one or more C1-oxidised cellodextrin or salt thereof (which may include cellobionic acid or salt thereof) (e.g., in a (phytopharmaceutical) composition as taught herein) may be from 0.10 μM to 1000 μM, such as from 0.10 μM to 900 μM, from 0.10 μM to 800 μM, from 0.10 μM to 700 μM, or from 0.10 μM to 600 μM, preferably from 0.10 μM to 500 μM, such as from 0.10 μM to 400 μM, or from 0.10 μM to 300 μM, more preferably from 0.10 μM to 200 μM, even more preferably from 0.10 μM to 100 μM, such as about 0.10 μM, about 0.50 μM, about 1.0 μM, about 5.0 μM, about 10 μM, about 20 μM, about 30 μM, about 40 μM, about 50 μM, about 60 μM, about 70 μM, about 80 μM, about 90 μM, or about 100 μM.

In certain embodiments, the concentration of the one or more C4-oxidised cellodextrin (e.g., in a (phytopharmaceutical) composition as taught herein) may be from 0.10 μM to 1000 μM, such as from 0.10 μM to 900 μM, from 0.10 μM to 800 μM, from 0.10 μM to 700 μM, or from 0.10 μM to 600 μM, preferably from 0.10 μM to 500 μM, such as from 0.10 μM to 400 μM, or from 0.10 μM to 300 μM, more preferably from 0.10 μM to 200 μM, even more preferably from 0.10 μM to 100 μM, such as about 0.10 μM, about 0.50 μM, about 1.0 μM, about 5.0 μM, about 10 μM, about 20 μM, about 30 μM, about 40 μM, about 50 μM, about 60 μM, about 70 μM, about 80 μM, about 90 μM, or about 100 μM.

In certain embodiments, the concentration of the one or more C1- and C4-oxidised cellodextrin (e.g., in a (phytopharmaceutical) composition as taught herein) may be from 0.10 μM to 1000 μM, such as from 0.10 μM to 900 μM, from 0.10 μM to 800 μM, from 0.10 μM to 700 μM, or from 0.10 μM to 600 μM, preferably from 0.10 μM to 500 μM, such as from 0.10 μM to 400 μM, or from 0.10 μM to 300 μM, more preferably from 0.10 μM to 200 μM, even more preferably from 0.10 μM to 100 μM, such as about 0.10 μM, about 0.50 μM, about 1.0 μM, about 5.0 μM, about 10 μM, about 20 μM, about 30 μM, about 40 μM, about 50 μM, about 60 μM, about 70 μM, about 80 μM, about 90 μM, or about 100 μM.

In certain embodiments, the total concentration of the cellodextrins, C1-oxidised cellodextrins including the cellobionic acid, C4-oxidised cellodextrins, and C1- and C4-oxidised cellodextrins (e.g., in a (phytopharmaceutical) composition as taught herein) may be from 0.10 μM to 1000 μM, such as from 0.10 μM to 900 μM, from 0.10 μM to 800 μM, from 0.10 μM to 700 μM, or from 0.10 μM to 600 μM, preferably from 0.10 μM to 500 μM, such as from 0.10 μM to 400 μM, or from 0.10 μM to 300 μM, more preferably from 0.10 μM to 200 μM, even more preferably from 0.10 μM to 100 μM, such as about 0.10 μM, about 0.50 μM, about 1.0 μM, about 5.0 μM, about 10 μM, about 20 μM, about 30 μM, about 40 μM, about 50 μM, about 60 μM, about 70 μM, about 80 μM, about 90 μM, or about 100 μM.

The inventors have found that combinations or mixtures of native cellodextrins, C1-oxidised cellodextrins, and C4-oxidised cellodextrins, and optionally C1- and C4-oxidised cellodextrins display advantageous plant elicitor activity when included at a large variety of relative molar proportions.

In certain particularly preferred embodiments, strong elicitor effects are seen with combinations comprising molar ratios of native cellodextrins:C1-oxidised cellodextrins:C4-oxidised cellodextrins of about 4:5:1. In such combinations C1- and C4-oxidised (i.e., doubly oxidised) cellodextrins are preferably not present.

Many other molar per parts amounts are operable in the present context, such as, without limitation about 6.5:3:0.5, about 3:6.5:0.5, about 4:3:3, about 4:1:5, about 0.5:9:0.5 (molar ratio native cellodextrins:C1-oxidised cellodextrins: C4-oxidised cellodextrins) or about 0.5:4:0.5:5, about 2.5: 2.5:2.5:2.5 (molar ratio native cellodextrins:C1-oxidised cellodextrins:C4-oxidised cellodextrins:C1- and C4-oxidised cellodextrins).

By means of further non-limiting examples, in a composition comprising native cellodextrins, C1-oxidised cellodextrins, and C4-oxidised cellodextrins:

- 0.25 to 9.50 molar parts may be native cellodextrins, 0.25 to 9.50 molar parts may be C1-oxidised cellodextrins, and 0.25 to 9.50 molar parts may be C4-oxidised cellodextrins, with the total being 10 parts;
- 2.50 to 6.00 molar parts may be native cellodextrins, 3.50 to 7.00 molar parts may be C1-oxidised cellodextrins, and 0.50 to 3.00 molar parts may be C4-oxidised cellodextrins, with the total being 10.00 parts; or
- 3.33 molar parts may be native cellodextrins, 3.33 molar parts may be C1-oxidised cellodextrins, and 3.33 molar parts may be C4-oxidised cellodextrins.

By means of further non-limiting examples, in a composition comprising native cellodextrins, C1-oxidised cellodextrins, C4-oxidised cellodextrins, and C1- and C4-oxidised cellodextrins:

- 0.25 to 9.25 molar parts may be native cellodextrins, 0.25 to 9.25 molar parts may be C1-oxidised cellodextrins, 0.25 to 9.25 molar parts may be C4-oxidised cellodextrins, and 0.25 to 9.25 molar parts may be C1- and C4-oxidised cellodextrins with the total being 10 parts;

2.50 molar parts may be native cellodextrins, 2.50 molar parts may be C1-oxidised cellodextrins, 2.50 molar parts may be C4-oxidised cellodextrins, and 2.50 molar parts may be C1- and C4-oxidised cellodextrins; or 0.25 to 4.75 molar parts may be native cellodextrins, 2.00 to 5.00 molar parts may be C1-oxidised cellodextrins, 0.25 to 4.75 molar parts may be C4-oxidised cellodextrins, and 3.00 to 6.00 molar parts may be C1- and C4-oxidised cellodextrins with the total being 10 parts.

In certain particularly preferred embodiments, the cellobionic acid, cellodextrins, C1-oxidised cellodextrins, C4-oxidised cellodextrins, and/or C1- and C4-oxidised cellodextrins may be produced by decomposition of cellulose by one or more lytic polysaccharide monooxygenase (LPMO). In certain embodiments, the composition, such as the phytopharmaceutical composition as taught herein, may comprise the decomposition product of cellulose by one or more LPMO, such decomposition product typically comprising a mixture of native, C1-oxidised, and C4-oxidised cellodextrins, and optionally C1- and C4-oxidised cellodextrins.

Lytic polysaccharide monooxygenases (LPMO) broadly encompass a class of copper-containing enzymes which catalyse cleavage of cellulose in an oxidative manner. These include C1-hydroxylating LPMO (EC 1.14.99.54) which form cellulose fragments that contain a D-glucono-1,5-lactone residue at the reducing end, which hydrolyses quickly and spontaneously to the aldonic acid. These further include C4-dehydrogenating LPMO (EC 1.14.99.56) which form cellulose fragments that contain a 4-dehydro-D-glucose residue at the non-reducing end. These further include C1-hydroxylating/C4-dehydrogenating LPMO (EC 1.14.99.54 and EC 1.14.99.56) which form cellulose fragments that contain a 4-dehydro-D-glucose residue at the non-reducing end and gluconic acid residue at the reducing end.

LPMO are widely distributed across bacterial and fungal kingdoms, and are presently classified into seven "auxiliary activity" (AA) families (AA9—formerly glycoside hydrolase (GH) family 61, AA10—formerly carbohydrate-binding module (CBM) 33, AA11, AA13, AA14, AA15 and AA16) according to the carbohydrate-active enzymes (www.cazy.org) database. The CAZY database entry for the AA9 family currently lists close to 600 GenBank (http://www.ncbi.nlm.nih.gov/) accession numbers for LPMO from microorganisms including inter alia *Arthrobotrys oligospora, Aspergillus fumigatus, Aspergillus oryzae, Botrytis cinerea, Fusarium fujikuroi, Fusarium graminearum, Magnaporthe grisea, Neurospora crassa*, and many others. While any suitable LPMO can be used to prepare the plant elicitor compounds and compound combinations as taught herein, in certain embodiments, at least one of the one or more LPMO may belong to auxiliary activity (AA) family 9. In certain preferred embodiments, at least one of the one or more LPMO may be from *Botrytis cinerea, Thielavia terrestris* or *Myceliophthora thermophila*. Example LPMO enzymes of this type, including GenBank accession numbers for their protein sequences, their isolation and modalities of their use in enzymatic reactions, are discussed in the experimental section and would be understood by the skilled person.

In certain embodiments, the LPMO activity may be enhanced by the inclusion of one or more cellobiose dehydrogenase (CDH) in the reaction. CDH are Auxiliary Activity 3 enzymes (EC 1.1.99.18) which catalyses oxidation of to cellobiono-1,5-lactone, and also acts more slowly on cellodextrins other than cellobiose.

The CAZY database entry for the AA3 family currently lists over 1300 GenBank accession numbers for CDH from many different sources. In certain preferred embodiments, the CDH may be from *Botrytis cinerea* or *Myceliophthora thermophila*. Exemplary protein sequences of such enzymes include those annotated under GenBank accession number AF074951.1 (*Myceliophthora thermophila* ATCC 42464 cellobiose dehydrogenase (cdh) mRNA, complete cds). Such proteins may be, for example, isolated from microorganism sources endogenously expressing the same, or may be produced by recombinant expression as known in the art. LPMO enzymes and enzyme mixtures are also available commercially (NZYTech, Lisabon, Portugal, LPMO-AA9 product code CZ0959, "Lytic cellulose monooxygenase 9B" from *Geotrichum candidum*; Novozymes, Bagsværd, Denmark, products Cellic® CTec 2 and Cellic® CTec 3).

In certain embodiments, cellulose to be acted on by the LPMO enzyme(s) and optionally the CDH enzyme(s) may be from lignocellulosic waste or pulping paper. Lignocellulose or lignocellulosic biomass refers to plant biomass, mainly composed of carbohydrate polymers including primarily cellulose and hemicellulose, and the aromatic polymer lignin. Lignocellulosic biomass is an abundant raw material and is employed for example in bio-refinery applications to produce biofuels, such as mainly bio-ethanol. Another common use of lignocellulosic biomass is in the production of wood pulp and paper. Accordingly, lignocellulosic waste or pulping paper represent advantageously abundant sources of cellulose.

In certain embodiments, the lignocellulosic waste may be lignocellulosic by-product from bio-refinery applications. Commonly, production of bio-fuels involves enzymatic hydrolysis of lignocellulosic biomass using LPMO-containing cocktails to break down the cellulose for downstream fermentation. Consequently, the bio-waste product from such bio-refineries already contains a certain amount of cellobionic acid and/or of cellodextrins and oxidised cellodextrins (e.g., about 1-3 w/v % aldonic acids such as cellobionic acid), which can be employed as taught herein, optionally (but not necessarily) subsequently to some process of isolation or purification from the bio-waste.

Accordingly, in certain embodiments, the (phytopharmaceutical) composition as taught herein may be prepared from LPMO-treated bio-refinery lignocellulosic by-product, or may comprise or consist essentially of LPMO-treated bio-refinery lignocellulosic by-product.

In further embodiments, one or more additional plant defence elicitor may be combined with the novel plant defence elicitors as taught herein. Hence, combination treatments are also envisaged. The administration of the distinct elicitors to plants may be simultaneous or sequential in any order, and they may be comprised in the same composition (e.g., admixed) or may be provided in a physically separated form, e.g., in different vials or packages, optionally forming a kit-of-parts.

In certain embodiments, such one or more further plant defence elicitor may be selected from plant or fungal cell wall derived compounds. In certain preferred embodiments, such one or more further plant defence elicitor may be selected from the group consisting of pectin fragments, oligogalacturonides, cellobiose, xyloglucan, non-branched β-1,3-glucan, chitin fragments, arabinose, arabinan, rhamnose, homogalacturonan, rhamnogalacturonan I and II, xylogalacturonan, starch, and combinations thereof.

The compounds, and combinations of or composition comprising the compounds as taught herein, are according to the present disclosure put to use as plant pathogen defence elicitor. This term broadly encompasses any compounds or compositions that are capable of eliciting natural plant defenses, of activating plant defence and resistance reactions against plant pathogen, of stimulating the production of plant defence molecules against plant pathogen and/or of preventing, controlling or treating a plant against infection by a plant pathogen, when administered to a plant, plant seed or an organ of a plant. Hence, when perceived by a plant, an elicitor can evoke molecular, biochemical and/or physiological defensive plant cell reactions, such as the synthesis, or increase of the synthesis, of plant defence molecule(s), for example ethylene and/or salicylic and jasmonic acid, the production of reactive oxygen species (ROS), and/or expression of specific defence-related genes and proteins, for example polygalacturonase inhibitor proteins (PGIP). The activation of signal transduction pathway(s) can subsequently lead to long-lasting defence gene expression and secondary metabolites production. As a result, a plant pathogen defence elicitor can enhance the ability of the plant to resist or battle a given pathogen. Plant defence elicitors are often subsumed by the group of agents colloquially known as biopesticides, which mainly include bioinsecticides, biofungicides, bionematicides, and others.

Hence, in certain embodiments, by means of the present compounds or compositions, a plant infection by a plant pathogen may be prevented, controlled or treated. While these terms are well-known as such, by means of further guidance, "preventing" may in particular mean avoiding occurrence of at least one adverse effect or symptom, preferably all adverse effects or symptoms induced by a plant pathogen infection; "controlling" may in particular mean stopping the progression of a plant pathogen infection, more precisely reducing or abolishing the plant pathogen spread across the healthy parts of a plant or of an organ of a plant, or from an infected plant to another plant, typically to a neighbouring plant; and "treating" may in particular mean ameliorating the symptom(s) of an infection, or completely curing an infection, typically by reducing or completely eliminating a phytopathogen (typically a fungus or bacterium), i.e., by eliminating any viable phytopathogen in the plant or in an organ or several or each organ(s) of the plant.

A plant may be contacted with an effective amount of the present compounds or compositions, such as contacted via an organ of the plant, preferably an organ selected from leaves, roots and/or fruits, or via seeds of the plant. The contacting step may be performed once or several times (for example regularly or periodically, for example on the appropriate season or at the appropriate plant development stage). The term "an effective amount" refers to an amount of the (active) compound or compounds as taught herein which induces or elicits plant natural defense, activate plant defense and resistance reaction against plant pathogen, and/or stimulates the production of plant defenses molecules against plant pathogen resulting in obtaining a plant that is resistant to pathogen(s). The effective amount is understood to be variable, as it may be affected by many factors, including but not limited to the type of plant treated, treatment dosages and application rates, method of contacting, weather and seasonal conditions experienced during the plant growing cycle, pathogen susceptibility, etc. Such variables are commonly encountered and understood by the skilled person, who may adjust the prophylactic or treatment regimen, e.g., application rate, application timings and/or frequencies, and application way. Particular suitable amounts or concentrations ranges are discussed and exemplified elsewhere in this specification. The terms "organ", "organ of a plant" or "plant's organ" interchangeably refer to a part of a plant or to a plant propagation material. Examples of plant's organs include, but are not limited to, leaves, stems, fruits, seeds, cuttings, tubers, roots, bulbs, rhizomes, and the like. The contacting step with the plant or organ can be performed in various ways, for example by spraying, drenching, soaking, dipping, injection, through soil feeding, and any combination thereof. Alternatively, the compounds or compositions can be applied on a plant or organ by supplying a volatile or vapour-based form of the compounds or compositions in the vicinity of the plant tissue and allowing the diffusion to the plant or organ through the atmosphere. The skilled person knows how to adapt the manner of administration to the particular use.

In the context of the present invention, the term "plant" typically designates a plant infected by or presenting a susceptibility to infection by a plant pathogen. For example, the plant may belong to the clade of Angiosperm.

In certain embodiments, the plant may belong to the clade of dicots. Examples of plants from the dicots clade include, but are not limited to, the Solanaceae family, comprising *Solanum lycopersicum* (tomato), *Solanum tuberosum* (potatoes), *Solanum melongena* (eggplant), *Capsicum* genus (pepper) and *Nicotiana tabacum* (tobacco); the Vitaceae family comprising the *Vitis* genus (grapevines); the Brassicaceae family, comprising *Brassica oleracea* (cabbage), *Brassica rapa* (turnip and Chinese cabbage), mustard species and *Arabidopsis thaliana*; the Rosaceae family, comprising *Malus pumila* (apple), *Pyrus* species (pear), and Fragaria *ananassa* (strawberry); the Fabaceae family comprising legumes such as pea, bean and soybean; the Asteraceae family, comprising sunflower; Amaranthaceae family, comprising sugar beet.

In certain embodiments, the plant may belong to the clade of monocots. An example of plants from the monocot clade includes, but is not limited to, the Gramineae or Poaceae family, such as maize, rice, barley, or wheat.

Hence, in certain embodiments, the plant may be a dicot plant, preferably selected from Brassicaceae, Solanaceae or Rosacea families, such as *Arabidopsis thaliana*, cabbage, tomato, grapevine, soybean, apple, pear, or strawberries, or wherein the plant is a monocot plant, preferably selected from Gramineae family, such as maize, rice, barley, or wheat.

In preferred embodiments, the plant pathogen may be a fungus or a bacterium. Hence, in such case the compositions as taught herein may also be conveniently denoted as antifungal and/or an antibacterial adjuvants, i.e., products that assist in the prevention or treatment of a plant disease typically caused by fungi or bacteria.

In certain embodiments, the pathogen may be a necrotrophic fungus or bacterium, a hemibiotrophic fungus or bacterium, or a biotrophic fungus or bacterium.

During the colonisation of plant hosts, most fungal pathogens exhibit one of two modes of nutrition: biotrophy, in which nutrients are obtained from living host cells, and necrotrophy, in which nutrients are obtained from host cells which have been previously killed by the fungus. A third mode of nutrition is hemibiotrophy, where the pathogen has an initial period of biotrophy followed by a period of necrotrophy. Phytopathogenic pathogens, in particular fungi, can thus be distinguished depending on their mode of nutrition: necrotrophic (e.g., *Botrytis cinerea*), biotrophic (e.g., *Ustilago maydis*) or hemibiotrophic (e.g., *Colletotrichum higginsianum*).

In particularly preferred embodiments, the plant pathogen may be a fungus, typically a phytopathogenic fungus. The expression "phytopathogen fungus" refers to fungi pathogens that infect plant organs. Examples of phytopathogenic fungi include, but are not limited to, fungi belonging to the Ascomycetes and Basidiomycetes classes, such as, for example, fungi of the order of Helotiales, such as, for example, family Sclerotiniaceae, *Botrytis/Botryotinia*, such as species *Botrytis cinerea*; fungi of the order of Hypocreales, such as, for example, family Nectriaceae, genus *Fusarium*; fungi of the order of Uredinales, such as, for example, family Pucciniaceae, genus *Puccinia*; fungi of the order of Ustilaginales, such as, for example, family Ustilaginaceae, genus *Ustilago*); fungi of the order of Sordariomycetes, such as, for example, family Glomerellaceae, genus *Colletotrichum.*

In further embodiments, the plant pathogen may be a bacterium, typically a phytopathogenic bacterium. The expression "phytopathogen bacterium" refers to bacterial pathogens that infect plant organs. Examples of phytopathogenic bacteria include, but are not limited to, bacteria of the order of Pseudomonadales, such as, for example, family Pseudomonadaceae, genus *Pseudomonas*, such as species *Pseudomonas syringae*; bacteria of the order of Burkholderiales, such as, for example, family Burkholderiaceae, genus *Ralstonia*, such as species *Ralstonia solanacearum*; bacteria of the order of Enterobacterales, such as, for example, family Erwiniaceae, genus *Erwinia*, such as species *Erwinia amylovora*, or family Pectobacteriaceae, genus *Pectobacterium*, such as species *Pectobacterium carotovorum* (formerly *Erwinia carotovora*); bacteria of the order of Xanthomonadales, such as, for example, family Xanthomonadaceae, genus *Xylella*, such as species *Xylella* fastidiosa, or genus *Xanthomonas*, such as species *Xanthomonas campestris*. Similarly to the fungi and based on the type of plant colonisation, bacteria can also be classified into necrotrophic, biotrophic and hemibiotrophic sub-classes.

Particularly preferred may be necrotrophic fungi, preferably as *Botrytis cinerea*. Hence, in certain embodiments, the plant pathogen is a fungus or a bacterium, such as a necrotrophic fungus or bacterium, such as *Botrytis cinerea*, a hemibiotrophic fungus or bacterium, or a biotrophic fungus or bacterium, such as *Pseudomonas syringae.*

In the present context, the plant infection by a plant pathogen typically designates a plant infection by at least one phytopathogen. The infection can occur on any organ of the plant. By means of examples and without limitation, the plant infection may be, e.g., a *B. cinerea* infection, for example a *B. cinerea* infection of *A. thaliana*, tomato, strawberry, sunflower, grapevine, or apple; a *C. higginsianum* infection, for example a *C. higginsianum* infection of turnip, Chinese cabbage, mustard, *A. thaliana*, or apple; a *U. maydis* infection, for example a *U. maydis* infection of maize; a *R. solanacearum* infection, for example a *R. solanacearum* infection of tomato, potatoes, eggplant, pepper, or tobacco; a *Pseudomonas syringae* infection, for example a *Pseudomonas syringae* infection on apple or pear; or any combination thereof, such as a *B. cinerea* and/or *C. higginsianum* infection of *A. thaliana*, an apple infection by *B. cinerea* and/or *C. higginsianum* or a tomato infection by *B. cinerea* and/or *R. solanacearum.*

In view of the foregoing discussion, the present application thus also particularly provides aspects and embodiments as set forth in the following Statements 1-17:

Statement 1. Use of cellobionic acid or a phytopharmaceutically acceptable salt thereof as plant pathogen defence elicitor.

Statement 2. A method for activating plant defence against plant pathogens comprising contacting a plant with an effective amount of cellobionic acid or a phytopharmaceutically acceptable salt thereof.

Statement 3. The use according to Statement 1 or the method according to Statement 2, wherein the cellobionic acid or salt thereof is comprised in a composition which further comprises one or more cellodextrin; one or more C1-oxidised cellodextrin, or a phytopharmaceutically acceptable salt thereof, one or more C4-oxidised cellodextrin; and/or one or more C1- and C4-oxidised cellodextrin, or a phytopharmaceutically acceptable salt thereof.

Statement 4. The use according to Statement 1 or 3 or the method according to Statement 2 or 3, wherein the cellobionic acid or salt thereof is comprised in a composition which further comprises one or more further plant defence elicitor, such as a plant elicitor selected from plant or fungal cell wall derived compounds, such as particularly a plant elicitor selected from the group consisting of pectin fragments, oligogalacturonides, cellobiose, xyloglucan, non-branched β-1,3-glucan, chitin fragments, arabinose, arabinan, rhamnose, homogalacturonan, rhamnogalacturonan I and II, xylogalacturonan, starch, and combinations thereof.

Statement 5. The use or method according to Statement 3 or 4, wherein the degree of polymerization (DP) of said cellodextrins, C1-oxidised cellodextrins, C4-oxidised cellodextrins, and C1- and C4-oxidised cellodextrins is each independently from 2 to 10, preferably from 2 to 5.

Statement 6. The use according to any one of Statements 1 or 3 to 5 or the method according to any one of Statements 2 to 5, wherein said cellobionic acid, or said cellodextrins, C1-oxidised cellodextrins, C4-oxidised cellodextrins, and C1- and C4-oxidised cellodextrins are produced by decomposition of cellulose by one or more lytic polysaccharide monooxygenase (LPMO).

Statement 7. The use or method according to Statement 6, wherein at least one of the one or more LPMO belongs to auxiliary activity (AA) family 9, such as an LPMO-AA9 from *Botrytis cinerea, Thielavia terrestris* or *Myceliophthora thermophila.*

Statement 8. The use or method according to Statement 6 or 7, wherein one or more cellobiose dehydrogenase (CDH), such as a CDH from *Botrytis cinerea* or *Myceliophthora thermophila*, is used to enhance the LPMO activity.

Statement 9. The use or method according to any one of Statements 6 to 8, wherein the cellulose is from lignocellulosic waste or pulping paper, such as wherein the composition comprises or consists essentially of LPMO-treated bio-refinery lignocellulosic by-product.

Statement 10. The use according to any one of Statements 1 or 3 to 9 or the method according to any one of Statements 2 to 9, wherein the concentration of the cellobionic acid or salt thereof is from 0.10 μM to 1000 μM, such as from 0.10 μM to 500 μM, preferably from 0.10 μM to 100 μM, such as from 0.10 μM to 10 μM.

Statement 11. The use or method according to any one of Statements 3 to 10, wherein the total concentration of the cellodextrins, C1-oxidised cellodextrins including the cellobionic acid, C4-oxidised cellodextrins, and C1- and C4-oxidised cellodextrins is from 0.10 μM to 1000 μM, such as from 0.10 μM to 500 μM, preferably from 0.10 μM to 100 μM, such as from 0.10 μM to 10 μM.

Statement 12. The use or method according to any one of Statements 3 to 11, wherein the composition comprises cellodextrins, C1-oxidised cellodextrins, and C4-oxidised cellodextrins in a molar ratio of about 4:5:1.

Statement 13. The use according to any one of Statements 1 or 3 to 12 or method according to any one of Statements 2 to 12, wherein:

a plant infection by a plant pathogen is prevented, controlled or treated;

the plant pathogen is a fungus or a bacterium, such as a necrotrophic fungus or bacterium, such as *Botrytis cinerea*, a hemibiotrophic fungus or bacterium, or a biotrophic fungus or bacterium, such as *Pseudomonas syringae;* the plant is a dicot plant, preferably selected from Brassicaceae, Solanaceae or Rosacea families, such as *Arabidopsis thaliana*, cabbage, tomato, grapevine, soybean, apple, pear, or strawberries, or wherein the plant is a monocot plant, preferably selected from Gramineae family, such as maize, rice, barley, or wheat; and/or contacting the plant is via an organ of the plant, preferably an organ selected from leaves, roots and/or fruits, or via seeds of the plant.

Statement 14. A phytopharmaceutical composition comprising cellobionic acid or a phytopharmaceutically acceptable salt thereof, and a phytopharmaceutically acceptable carrier.

Statement 15. The phytopharmaceutical composition according to Statement 14, wherein the composition comprises 0.10 μM to 1000 μM, such as from 0.10 μM to 500 μM, preferably from 0.10 μM to 100 μM, such as from 0.10 μM to 10 μM, of cellobionic acid or salt thereof.

Statement 16. The phytopharmaceutical composition according to Statement 14 or 15, wherein:

the composition further comprises one or more cellodextrin; one or more C1-oxidised cellodextrin, or a phytopharmaceutically acceptable salt thereof, one or more C4-oxidised cellodextrin; and/or one or more C1- and C4-oxidised cellodextrin, or a phytopharmaceutically acceptable salt thereof, the composition further comprises one or more further plant defence elicitor, such as a plant elicitor selected from plant or fungal cell wall derived compounds, such as particularly a plant elicitor selected from the group consisting of pectin fragments, oligogalacturonides, cellobiose, xyloglucan, non-branched β-1,3-glucan, chitin fragments, arabinose, arabinan, rhamnose, homogalacturonan, rhamnogalacturonan I and II, xylogalacturonan, starch, and combinations thereof, the degree of polymerization (DP) of said cellodextrins, C1-oxidised cellodextrins, C4-oxidised cellodextrins, and C1- and C4-oxidised cellodextrins is each independently from 2 to 10, preferably from 2 to 5;

said cellobionic acid, or said cellodextrins, C1-oxidised cellodextrins, C4-oxidised cellodextrins, and C1- and C4-oxidised cellodextrins are produced by decomposition of cellulose by one or more lytic polysaccharide monooxygenase (LPMO), optionally wherein:

at least one of the one or more LPMO belongs to auxiliary activity (AA) family 9, such as an LPMO-AA9 from *Botrytis cinerea, Thielavia terrestris* or *Myceliophthora* thermophila;

one or more cellobiose dehydrogenase (CDH), such as a CDH from *Botrytis cinerea* or *Myceliophthora thermophila*, is used to enhance the LPMO activity; and/or the cellulose is from lignocellulosic waste or pulping paper, such as wherein the composition comprises or consists essentially of LPMO-treated bio-refinery lignocellulosic by-product;

the total concentration of the cellodextrins, C1-oxidised cellodextrins including the cellobionic acid, C4-oxidised cellodextrins, and C1- and C4-oxidised cellodextrins is from 0.10 μM to 1000 μM, such as from 0.10 μM to 500 μM, preferably from 0.10 μM to 100 μM, such as from 0.10 μM to 10 μM; and/or the composition comprises cellodextrins, C1-oxidised cellodextrins, and C4-oxidised cellodextrins in a molar ratio of about 4:5:1.

Statement 17. The phytopharmaceutical composition according to any one of Statements 14 to 16, wherein the composition comprises one or more anionic, non-ionic, amphoteric, or cationic surfactant, or a combination thereof, such as Triton X-100, Tween-20, Tween-40, and/or Silwet L-77.

The present application also provides aspects and embodiments as set forth in the following Statements 1'-15':

Statement 1'. Use of a composition comprising:

(i) one or more cellodextrin (i.e., native or not-oxidised cellodextrins) and (ii) one or more C1-oxidised cellodextrin or a phytopharmaceutically acceptable salt thereof, one or more C4-oxidised cellodextrin, and/or one or more C1- and C4-oxidised cellodextrin or a phytopharmaceutically acceptable salt thereof, as plant pathogen defence elicitor.

Statement 2'. A method for activating plant defence against plant pathogens comprising contacting a plant with an effective amount of a composition comprising:

(i) one or more cellodextrins and (ii) one or more C1-oxidised cellodextrin or a phytopharmaceutically acceptable salt thereof, one or more C4-oxidised cellodextrin, and/or one or more C1- and C4-oxidised cellodextrin or a phytopharmaceutically acceptable salt thereof.

Statement 3'. The use according to Statement 1' or the method according to Statement 2', wherein the composition further comprises one or more further plant defence elicitor, such as a plant elicitor selected from plant or fungal cell wall derived compounds, such as particularly a plant elicitor selected from the group consisting of pectin fragments, oligogalacturonides, cellobiose, xyloglucan, non-branched β-1,3-glucan, chitin fragments, arabinose, arabinan, rhamnose, homogalacturonan, rhamnogalacturonan I and II, xylogalacturonan, starch, and combinations thereof.

Statement 4'. The use according to Statement 1' or 3' or the method according to Statement 2' or 3', wherein the degree of polymerization (DP) of said cellodextrins, C1-oxidised cellodextrins, C4-oxidised cellodextrins, and C1- and C4-oxidised cellodextrins is each independently from 2 to 10, preferably from 2 to 5.

Statement 5'. The use according to any one of Statements 1', 3' or 4' or the method according to any one of Statements 2' to 4', wherein said cellodextrins, C1-oxidised cellodextrins, C4-oxidised cellodextrins, and C1- and C4-oxidised cellodextrins are produced by decomposition of cellulose by one or more lytic polysaccharide monooxygenase (LPMO).

Statement 6'. The use or method according to Statement 5', wherein at least one of the one or more LPMO belongs to auxiliary activity (AA) family 9, such as an LPMO-AA9 from *Botrytis cinerea, Thielavia terrestris* or *Myceliophthora thermophila.*

Statement 7'. The use or method according to Statement 5' or 6', wherein one or more cellobiose dehydrogenase (CDH), such as a CDH from *Botrytis cinerea* or *Myceliophthora thermophila*, is used to enhance the LPMO activity.

Statement 8'. The use or method according to any one of Statements 5' to 7', wherein the cellulose is from lignocellulosic waste or pulping paper, such as wherein the composition comprises or consists essentially of LPMO-treated bio-refinery lignocellulosic by-product.

Statement 9'. The use according to any one of Statements 1' or 3' to 8' or the method according to any one of Statements 2' to 8', wherein the total concentration of the cellodextrins, C1-oxidised cellodextrins, C4-oxidised cellodextrins, and C1- and C4-oxidised cellodextrins is from 0.10 μM to 1000 μM, such as from 0.10 μM to 500 μM, preferably from 0.10 μM to 100 μM, such as from 0.10 μM to 10 μM.

Statement 10'. The use according to any one of Statements 1' or 3' to 9' or the method according to any one of Statements 2' to 9', the composition comprises cellodextrins, C1-oxidised cellodextrins, and C4-oxidised cellodextrins in a molar ratio of about 4:5:1.

Statement 11'. The use according to any one of Statements 1' or 3' to 10' or the method according to any one of Statements 2' to 10', wherein:

a plant infection by a plant pathogen is prevented, controlled or treated;

the plant pathogen is a fungus or a bacterium, such as a necrotrophic fungus or bacterium, such as *Botrytis cinerea*, a hemibiotrophic fungus or bacterium, or a biotrophic fungus or bacterium, such as *Pseudomonas syringae;* the plant is a dicot plant, preferably selected from Brassicaceae, Solanaceae or Rosacea families, such as *Arabidopsis thaliana*, cabbage, tomato, grapevine, soybean, apple, pear, or strawberries, or wherein the plant is a monocot plant, preferably selected from Gramineae family, such as maize, rice, barley, or wheat; and/or contacting the plant is via an organ of the plant, preferably an organ selected from leaves, roots and/or fruits, or via seeds of the plant.

Statement 12'. A phytopharmaceutical composition comprising:

(i) one or more cellodextrin (i.e., native or not-oxidised cellodextrins) and (ii) one or more C1-oxidised cellodextrin or a phytopharmaceutically acceptable salt thereof, one or more C4-oxidised cellodextrin, and/or one or more C1- and C4-oxidised cellodextrin or a phytopharmaceutically acceptable salt thereof, and a phytopharmaceutically acceptable carrier.

Statement 13'. The phytopharmaceutical composition according to Statement 12', wherein the total concentration of the cellodextrins, C1-oxidised cellodextrins, C4-oxidised cellodextrins, and C1- and C4-oxidised cellodextrins is from 0.10 μM to 1000 μM, such as from 0.10 μM to 500 μM, preferably from 0.10 μM to 100 μM, such as from 0.10 μM to 10 μM.

Statement 14'. The phytopharmaceutical composition according to Statement 12' or 13', wherein:

the composition further comprises one or more further plant defence elicitor, such as a plant elicitor selected from plant or fungal cell wall derived compounds, such as particularly a plant elicitor selected from the group consisting of pectin fragments, oligogalacturonides, cellobiose, xyloglucan, non-branched β-1,3-glucan, chitin fragments, arabinose, arabinan, rhamnose, homogalacturonan, rhamnogalacturonan I and II, xylogalacturonan, starch, and combinations thereof;

the degree of polymerization (DP) of said cellodextrins, C1-oxidised cellodextrins, C4-oxidised cellodextrins, and C1- and C4-oxidised cellodextrins is each independently from 2 to 10, preferably from 2 to 5;

said cellodextrins, C1-oxidised cellodextrins, C4-oxidised cellodextrins, and C1- and C4-oxidised cellodextrins are produced by decomposition of cellulose by one or more lytic polysaccharide monooxygenase (LPMO), optionally wherein:

at least one of the one or more LPMO belongs to auxiliary activity (AA) family 9, such as an LPMO-AA9 from *Botrytis cinerea, Thielavia terrestris* or *Myceliophthora* thermophila;

one or more cellobiose dehydrogenase (CDH), such as a CDH from *Botrytis cinerea* or *Myceliophthora thermophila*, is used to enhance the LPMO activity; and/or the cellulose is from lignocellulosic waste or pulping paper, such as wherein the composition comprises or consists essentially of LPMO-treated bio-refinery lignocellulosic by-product;

the composition comprises cellodextrins, C1-oxidised cellodextrins, and C4-oxidised cellodextrins in a molar ratio of about 4:5:1.

Statement 15'. The phytopharmaceutical composition according to any one of Statements 12' to 14', wherein the composition comprises one or more anionic, non-ionic, amphoteric, or cationic surfactant, or a combination thereof, such as Triton X-100, Tween-20, Tween-40, and/or Silwet L-77.

The present application also provides aspects and embodiments as set forth in the following Statements 1*-17*:

Statement 1*. Use of one or more C4-oxidised cellodextrin as plant pathogen defence elicitor.

Statement 2*. A method for activating plant defence against plant pathogens comprising contacting a plant with an effective amount of one or more C4-oxidised cellodextrin.

Statement 3*. The use according to Statement 1* or the method according to Statement 2*, wherein the one or more C4-oxidised cellodextrin is comprised in a composition which further comprises one or more cellodextrin; one or more C1-oxidised cellodextrin, or a phytopharmaceutically acceptable salt thereof, and/or one or more C1- and C4-oxidised cellodextrin, or a phytopharmaceutically acceptable salt thereof.

Statement 4*. The use according to Statement 1* or 3* or the method according to Statement 2* or 3*, wherein the one or more C4-oxidised cellodextrin is comprised in a composition which further comprises one or more further plant defence elicitor, such as a plant elicitor selected from plant or fungal cell wall derived compounds, such as particularly a plant elicitor selected from the group consisting of pectin fragments, oligogalacturonides, cellobiose, xyloglucan, non-branched β-1,3-glucan, chitin fragments, arabinose, arabinan, rhamnose, homogalacturonan, rhamnogalacturonan I and II, xylogalacturonan, starch, and combinations thereof.

Statement 5*. The use according to any one of Statements 1*, 3* or 4* or the method according to any one of Statements 2* to 4*, wherein the degree of polymerization (DP) of said one or more C4-oxidised cellodextrin, or of said cellodextrins, C1-oxidised cellodextrins, C4-oxidised cellodextrins, and C1- and C4-oxidised cellodextrins is each independently from 2 to 10, preferably from 2 to 5.

Statement 6*. The use according to any one of Statements 1* or 3* to 5* or the method according to any one of Statements 2* to 5*, wherein said one or more C4-oxidised cellodextrin, or said cellodextrins, C1-oxidised cellodextrins, C4-oxidised cellodextrins, and C1- and C4-oxidised cellodextrins are produced by decomposition of cellulose by one or more lytic polysaccharide monooxygenase (LPMO).

Statement 7*. The use or method according to Statement 6*, wherein at least one of the one or more LPMO belongs to auxiliary activity (AA) family 9, such as an LPMO-AA9 from *Botrytis cinerea, Thielavia terrestris* or *Myceliophthora thermophila.*

Statement 8*. The use or method according to Statement 6* or 7*, wherein one or more cellobiose dehydrogenase (CDH), such as a CDH from *Botrytis cinerea* or *Myceliophthora thermophila*, is used to enhance the LPMO activity.

Statement 9*. The use or method according to any one of Statements 6* to 8*, wherein the cellulose is from lignocellulosic waste or pulping paper, such as wherein the composition comprises or consists essentially of LPMO-treated bio-refinery lignocellulosic by-product.

Statement 10*. The use according to any one of Statements 1* or 3* to 9* or the method according to any one of Statements 2* to 9*, wherein the concentration of the one or more C4-oxidised cellodextrin is from 0.10 μM to 1000 μM, such as from 0.10 μM to 500 μM, preferably from 0.10 μM to 100 μM, such as from 0.10 μM to 10 μM.

Statement 11*. The use or method according to any one of Statements 3* to 10*, wherein the total concentration of the cellodextrins, C1-oxidised cellodextrins, C4-oxidised cellodextrins, and C1- and C4-oxidised cellodextrins is from 0.10 μM to 1000 μM, such as from 0.10 μM to 500 μM, preferably from 0.10 μM to 100 μM, such as from 0.10 μM to 10 μM.

Statement 12*. The use or method according to any one of Statements 3* to 11*, wherein the composition comprises cellodextrins, C1-oxidised cellodextrins, and C4-oxidised cellodextrins in a molar ratio of about 4:5:1.

Statement 13*. The use according to any one of Statements 1* or 3* to 12* or method according to any one of Statements 2* to 12*, wherein:

- a plant infection by a plant pathogen is prevented, controlled or treated;
- the plant pathogen is a fungus or a bacterium, such as a necrotrophic fungus or bacterium, such as *Botrytis cinerea*, a hemibiotrophic fungus or bacterium, or a biotrophic fungus or bacterium, such as *Pseudomonas syringae;*
- the plant is a dicot plant, preferably selected from Brassicaceae, Solanaceae or Rosacea families, such as *Arabidopsis thaliana*, cabbage, tomato, grapevine, soybean, apple, pear, or strawberries, or wherein the plant is a monocot plant, preferably selected from Gramineae family, such as maize, rice, barley, or wheat; and/or
- contacting the plant is via an organ of the plant, preferably an organ selected from leaves, roots and/or fruits, or via seeds of the plant.

Statement 14*. A phytopharmaceutical composition comprising one or more C4-oxidised cellodextrin, and a phytopharmaceutically acceptable carrier.

Statement 15*. The phytopharmaceutical composition according to Statement 14*, wherein the composition comprises 0.10 μM to 1000 μM, such as from 0.10 μM to 500 μM, preferably from 0.10 μM to 100 μM, such as from 0.10 μM to 10 μM, of the one or more C4-oxidised cellodextrin.

Statement 16*. The phytopharmaceutical composition according to Statement 14* or 15*, wherein:

- the composition further comprises one or more cellodextrin; one or more C1-oxidised cellodextrin, or a phytopharmaceutically acceptable salt thereof, and/or one or more C1- and C4-oxidised cellodextrin, or a phytopharmaceutically acceptable salt thereof,
- the composition further comprises one or more further plant defence elicitor, such as a plant elicitor selected from plant or fungal cell wall derived compounds, such as particularly a plant elicitor selected from the group consisting of pectin fragments, oligogalacturonides, cellobiose, xyloglucan, non-branched β-1,3-glucan, chitin fragments, arabinose, arabinan, rhamnose, homogalacturonan, rhamnogalacturonan I and II, xylogalacturonan, starch, and combinations thereof,
- the degree of polymerization (DP) of said one or more C4-oxidised cellodextrin, or of said cellodextrins, C1-oxidised cellodextrins, C4-oxidised cellodextrins, and C1- and C4-oxidised cellodextrins is each independently from 2 to 10, preferably from 2 to 5;
- said one or more C4-oxidised cellodextrin, or said cellodextrins, C1-oxidised cellodextrins, C4-oxidised cellodextrins, and C1- and C4-oxidised cellodextrins are produced by decomposition of cellulose by one or more lytic polysaccharide monooxygenase (LPMO), optionally wherein:
  - at least one of the one or more LPMO belongs to auxiliary activity (AA) family 9, such as an LPMO-AA9 from *Botrytis cinerea, Thielavia terrestris* or *Myceliophthora* thermophila;
  - one or more cellobiose dehydrogenase (CDH), such as a CDH from *Botrytis cinerea* or *Myceliophthora thermophila*, is used to enhance the LPMO activity; and/or
  - the cellulose is from lignocellulosic waste or pulping paper, such as wherein the composition comprises or consists essentially of LPMO-treated bio-refinery lignocellulosic by-product;
- the total concentration of the cellodextrins, C1-oxidised cellodextrins, C4-oxidised cellodextrins, and C1- and C4-oxidised cellodextrins is from 0.10 μM to 1000 μM, such as from 0.10 μM to 500 μM, preferably from 0.10 μM to 100 μM, such as from 0.10 μM to 10 μM; and/or
- the composition comprises cellodextrins, C1-oxidised cellodextrins, and C4-oxidised cellodextrins in a molar ratio of about 4:5:1.

Statement 17*. The phytopharmaceutical composition according to any one of Statements 14* to 16*, wherein the composition comprises one or more anionic, non-ionic, amphoteric, or cationic surfactant, or a combination thereof, such as Triton X-100, Tween-20, Tween-40, and/or Silwet L-77.

The present application also provides aspects and embodiments as set forth in the following Statements 1#-16#:

Statement 1#. Use of one or more C1- and C4-oxidised cellodextrin or a phytopharmaceutically acceptable salt thereof as plant pathogen defence elicitor.

Statement 2#. A method for activating plant defence against plant pathogens comprising contacting a plant with an effective amount of one or more C1- and C4-oxidised cellodextrin or a phytopharmaceutically acceptable salt thereof.

Statement 3#. The use according to Statement 1# or the method according to Statement 2#, wherein the one or more C1- and C4-oxidised cellodextrin or salt thereof is comprised in a composition which further comprises one or more cellodextrin; one or more C1-oxidised cellodextrin, or a phytopharmaceutically acceptable salt thereof, and/or one or more C4-oxidised cellodextrin.

Statement 4#. The use according to Statement 1# or 3# or the method according to Statement 2# or 3#, wherein the one or more C1- and C4-oxidised cellodextrin or salt thereof is comprised in a composition which further comprises one or more further plant defence elicitor, such as a plant elicitor selected from plant or fungal cell wall derived compounds, such as particularly a plant elicitor selected from the group consisting of pectin fragments, oligogalacturonides, cellobiose, xyloglucan, non-branched β-1,3-glucan, chitin fragments, arabinose, arabinan, rhamnose, homogalacturonan, rhamnogalacturonan I and II, xylogalacturonan, starch, and combinations thereof.

Statement 5#. The use according to any one of Statements 1#, 3# or 4# or the method according to any one of Statements 2# to 4#, wherein the degree of polymerization (DP) of said one or more C1- and C4-oxidised cellodextrin, or of said cellodextrins, C1-oxidised cellodextrins, C4-oxidised cellodextrins, and C1- and C4-oxidised cellodextrins is each independently from 2 to 10, preferably from 2 to 5.

Statement 6#. The use according to any one of Statements 1# or 3# to 5# or the method according to any one of Statements 2# to 5#, wherein said one or more C1- and C4-oxidised cellodextrin, or said cellodextrins, C1-oxidised cellodextrins, C4-oxidised cellodextrins, and C1- and C4-oxidised cellodextrins are produced by decomposition of cellulose by one or more lytic polysaccharide monooxygenase (LPMO).

Statement 7#. The use or method according to Statement 6#, wherein at least one of the one or more LPMO belongs to auxiliary activity (AA) family 9, such as an LPMO-AA9 from *Botrytis cinerea, Thielavia terrestris* or *Myceliophthora thermophila.*

Statement 8#. The use or method according to Statement 6# or 7#, wherein one or more cellobiose dehydrogenase (CDH), such as a CDH from *Botrytis cinerea* or *Myceliophthora thermophila*, is used to enhance the LPMO activity.

Statement 9#. The use or method according to any one of Statements 6# to 8#, wherein the cellulose is from lignocellulosic waste or pulping paper, such as wherein the composition comprises or consists essentially of LPMO-treated bio-refinery lignocellulosic by-product.

Statement 10#. The use according to any one of Statements 1# or 3# to 9# or the method according to any one of Statements 2# to 9#, wherein the concentration of the one or C1- and C4-oxidised cellodextrin or salt thereof is from 0.10 μM to 1000 μM, such as from 0.10 μM to 500 μM, preferably from 0.10 μM to 100 μM, such as from 0.10 μM to 10 μM.

Statement 11#. The use or method according to any one of Statements 3# to 10#, wherein the total concentration of the cellodextrins, C1-oxidised cellodextrins, C4-oxidised cellodextrins, and C1- and C4-oxidised cellodextrins is from 0.10 μM to 1000 μM, such as from 0.10 μM to 500 μM, preferably from 0.10 μM to 100 μM, such as from 0.10 μM to 10 μM.

Statement 12#. The use according to any one of Statements 1# or 3# to 11# or method according to any one of Statements 2# to 11#, wherein:

- a plant infection by a plant pathogen is prevented, controlled or treated;
- the plant pathogen is a fungus or a bacterium, such as a necrotrophic fungus or bacterium, such as *Botrytis cinerea*, a hemibiotrophic fungus or bacterium, or a biotrophic fungus or bacterium, such as *Pseudomonas syringae;*
- the plant is a dicot plant, preferably selected from Brassicaceae, Solanaceae or Rosacea families, such as *Arabidopsis thaliana*, cabbage, tomato, grapevine, soybean, apple, pear, or strawberries, or wherein the plant is a monocot plant, preferably selected from Gramineae family, such as maize, rice, barley, or wheat; and/or
- contacting the plant is via an organ of the plant, preferably an organ selected from leaves, roots and/or fruits, or via seeds of the plant.

Statement 13#. A phytopharmaceutical composition comprising one or more C1- and C4-oxidised cellodextrin or a phytopharmaceutically acceptable salt thereof, and a phytopharmaceutically acceptable carrier.

Statement 14#. The phytopharmaceutical composition according to Statement 13#, wherein the composition comprises 0.10 μM to 1000 μM, such as from 0.10 μM to 500 μM, preferably from 0.10 μM to 100 μM, such as from 0.10 μM to 10 μM, of the one or more C1- and C4-oxidised cellodextrin or salt thereof.

Statement 15#. The phytopharmaceutical composition according to Statement 13# or 14#, wherein:

- the composition further comprises one or more cellodextrin; one or more C1-oxidised cellodextrin, or a phytopharmaceutically acceptable salt thereof, and/or one or more C4-oxidised cellodextrin;
- the composition further comprises one or more further plant defence elicitor, such as a plant elicitor selected from plant or fungal cell wall derived compounds, such as particularly a plant elicitor selected from the group consisting of pectin fragments, oligogalacturonides, cellobiose, xyloglucan, non-branched β-1,3-glucan, chitin fragments, arabinose, arabinan, rhamnose, homogalacturonan, rhamnogalacturonan I and II, xylogalacturonan, starch, and combinations thereof,
- the degree of polymerization (DP) of said one or more C1- and C4-oxidised cellodextrin, or of said cellodextrins, C1-oxidised cellodextrins, C4-oxidised cellodextrins, and C1- and C4-oxidised cellodextrins is each independently from 2 to 10, preferably from 2 to 5;
- said one or more C1- and C4-oxidised cellodextrins, or said cellodextrins, C1-oxidised cellodextrins, C4-oxidised cellodextrins, and C1- and C4-oxidised cellodextrins are produced by decomposition of cellulose by one or more lytic polysaccharide monooxygenase (LPMO), optionally wherein:
  - at least one of the one or more LPMO belongs to auxiliary activity (AA) family 9, such as an LPMO-AA9 from *Botrytis cinerea, Thielavia terrestris* or *Myceliophthora* thermophila;
  - one or more cellobiose dehydrogenase (CDH), such as a CDH from *Botrytis cinerea* or *Myceliophthora thermophila*, is used to enhance the LPMO activity; and/or
  - the cellulose is from lignocellulosic waste or pulping paper, such as wherein the composition comprises or consists essentially of LPMO-treated bio-refinery lignocellulosic by-product; and/or
- the total concentration of the cellodextrins, C1-oxidised cellodextrins, C4-oxidised cellodextrins, and C1- and C4-oxidised cellodextrins is from 0.10 μM to 1000 μM, such as from 0.10 μM to 500 μM, preferably from 0.10 μM to 100 μM, such as from 0.10 μM to 10 μM.

Statement 16#. The phytopharmaceutical composition according to any one of Statements 13# to 15#, wherein the composition comprises one or more anionic, non-ionic, amphoteric, or cationic surfactant, or a combination thereof, such as Triton X-100, Tween-20, Tween-40, and/or Silwet L-77.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as follows in the spirit and broad scope of the appended claims.

The herein disclosed aspects and embodiments of the invention are further supported by the following non-limiting examples.

EXAMPLES

Example 1—Materials and Methods Used in Example 2

Plant Material and Fungal Inoculation

*Arabidopsis thaliana* Columbia (Col-0) was the accession used for all the experiments. Seeds were surface sterilised by subsequent treatment with 50% v/v Et-OH and 3% bleach solution in agitation for 5 and 10 min, respectively. Seeds were then washed three times with distilled water and stratified for 3 days at 4° C. in the dark. For qPCR analysis and microarray experiments, seeds were sown on square petri dishes (13×13 mm) containing half strength Murashige and Skoog (MS) salt, 2.5 mM MES, 1% w/v sucrose and 0.8% w/v plant agar. The experiments were performed using 14-day old seedlings grown vertically in a controlled growth cabinet with short day conditions (8/16 h light/dark; 100 μmol photons $m^{-2}$ $s^{-1}$) at 22±0.5° C. Treatments were performed by applying 40-50 μl of fresh-prepared and filtered solution per seedling.

For "in planta" growth test of *Botrytis cinerea* and histochemical assays, five-week-old Col-0 plants were germinated in soil and grown in controlled chamber (8/16 h light/dark at 22/20° C. day/night) with a relative humidity equal to 70%. Treatments were performed by applying 40-50 μl of fresh-prepared and filtered solution per leaf.

*Botrytis cinerea* (strain B05.10, from the INRA/IJPB Institute, Versailles, France) was grown on potato dextrose agar medium at 21° C., with a photoperiod of 12 h light/12 h dark. Leaves were inoculated with two 5-μL droplets of *B. cinerea* spores (5×$10^5$ spores ml-1). At the indicated time points, genomic DNA from whole leaves was extracted following the modified protocol of Edwards et al. (*A simple and rapid method for the preparation of plant genomic DNA for PCR analysis*. Nucl. Acid. Res. 1991, vol. 19, 13491991) and fungal biomass was quantified as described by Gachon and Saindrenan (*Real-time PCR monitoring of fungal development in Arabidopsis thaliana infected by Alternaria brassicicola and Botrytis cinerea*. Plant Physiol Biochem. 2004, vol. 42, 367-371).

RNA Extraction, cDNA Preparation and qPCR Analysis

For RNA extraction, 14-day old leaves from ten independent plants were collected at the indicated time point after treatments, pooled and frozen in liquid nitrogen. Total RNA was extracted from 100 mg of ground-frozen samples using the Maxwell® LEV Plant RNA Kit (Promega, Madison, WI, USA) and the RNA integrity was determined through NanoDrop 2000 UV-Vis Spectrophotometer (Thermo Scientific, Loughborough, UK). First-strand cDNA was synthesized by using SOLIScript® RT cDNA synthesis MIX (Solis Biodyne, Tartu, Estonia) and qPCRs were performed using SYBR® Selected MasterMix 2× (Applied Biosystems, Thermo Fisher Scientific, Waltham, USA), following the manufacturers' protocols. The cycling conditions consisted of an initial 7 min at 95° C., followed by 40 two-step cycles at 95° C. for 5 s and at 60° C. for 30 s. Melting curve analysis was performed after cycle completion to validate amplicon identity. Relative expression levels were calculated following the standard curve-based method (Larionov et al. *A standard curve based method for relative real time PCR data processing*, BMC Bioinformatics. 2005, vol. 6, 1) by using ACTIN as reference. Gene-specific primers used in this work are indicated below.

Microarray Hybridization and Data Analysis

RNA sample preparation for microarray hybridization was carried out as described in the Applied Biosystems™ GeneChip™ Whole Transcript (WT) PLUS Reagent Kit User Guide (Thermo Fisher Scientific, Waltham, MA, USA). Briefly, 200 ng of total RNA was used to generate double-stranded cDNA. Twelve μg of subsequently synthesized cRNA were purified and reverse transcribed into single-stranded (ss)cDNA, where unnatural dUTP residues were incorporated. Purified and labelled sscDNAs were hybridised to *Arabidopsis* Gene 1.0 ST arrays (Affymetrix, Santa Clara, CA, USA) and the fluorescent signals were measured with an Applied Biosystems™ GeneChip Scanner 3000 7 G System. Sample processing was performed at a Genomics Core Facility, "KFB—Center of Excellence for Fluorescent Bioanalytics" (Regensburg, Germany).

Normalised probe set signals in $\log_2$ scale were calculated by using the RMA algorithm. Average linkage hierarchical clusters of differentially expressed genes were generated by using Cluster 3.0 and visualized by java TreeView.

Gene Ontology and Pathway Enrichment Analysis

Gene Ontology analysis related to biological process for cytoscape analysis was performed on up- and downregulated genes ($\log_2$ fold change >1.5 or <−1.5, t-test p-value<0.05) through gProfiler software using Benjamini and Hochberg FDR (<0.05) as filtering step and using only annotated genes accordingly to Reimand et al. (Pathway enrichment analysis and visualization of omics data using g:Profiler, GSEA, Cytoscape and EnrichmentMap. Nat Protoc. 14:482-517. 2019).

Callose Staining

Callose deposits quantification was performed essentially as described by Zarattini et al. (*The bile acid deoxycholate elicits defences in Arabidopsis and reduces bacterial infection*. Mol Plant Pathol. 2017, vol. 18(4), 540-554). Briefly, 5-weeks old *Arabidopsis* leaves were stained using 0.01% w/v aniline blue in 150 mm $K_2HPO_4$ (pH 9.5) buffer for 30 min and then de-stained in a lactophenol clearance solution overnight. Leaves were examined by stereofluorescence microscopy with an Azio Zoom V.16 (Carl Zeiss Inc., Oberkochen, Germany) and callose spots were quantified using ImageJ software.

Hydrogen Peroxide ($H_2O_2$) Detection Assays

Hydrogen peroxide was assayed in both in vitro-growth and in soil-growth *Arabidopsis* plants. In situ detection of $H_2O_2$ was performed following the protocol described by Daudi and O'Brien (*Detection of Hydrogen Peroxide by DAB Staining in Arabidopsis Leaves*. Bio Protoc. 2012, vol. 2(18), e263). Briefly, 5-week-old Col-O plants leaves were droplet-treated (40-50 μl drops per leaf) with indicated compounds. At 24 h after treatment four rosette leaves from five independent plants were gently vacuum-infiltrated (5 min) with 1 mg $ml^{-1}$ 3,3'-diaminobenzidine (DAB) dissolved in 10 mM sodium phosphate buffer and 0.05% v/v Tween 80. The staining reaction was terminated 5 h after DAB infiltration, and leaves were fixed in ethanol:glycerol:acetic acid 3:1:1. Chlorophyll was removed by several washing steps with 70% v/v ethanol and pictures were token with a stereomicroscope (Discovery V8, Zeiss).

Elicitor-induced $H_2O_2$ was also detected by luminol-peroxidase-based assay as described by Albert et al. (*Chemiluminescence Detection of the Oxidative Burst in Plant Leaf Pieces*. Bio-protocol 2015, vol. 5(6), e1423). Briefly, twenty leaves from 10 independent 4-5-week-old Col-0 plants were cut and incubated in $ddH_2O$ overnight. Time course luminescence was evaluated using The SpectraMax iD3 Multi-Mode Microplate Reader (Molecular devices, San Jose, CA, USA) with an integration time per well=1000 ms.

Superoxide ($O_2^-$) Detection Assay

Superoxide anion was assayed by performing nitro blue tetrazolium (NBT) assay. Briefly, 5-week-old Col-O were droplet-treated with the indicated compound. At 24 h after treatment, four leaves from five plants were cut and placed in tubes containing the NBT solution (3.5 mg ml-1 NBT, 50 mM sodium phosphate buffer, pH 7.5) and subjected to vacuum infiltration for 5 min. Then, leaves were incubated under dark conditions overnight. Chlorophyll was removed by several washing steps with 70% v/v ethanol and pictures were token with a stereomicroscope (Discovery V8, Zeiss).

AA9 Cloning, Expression and Oligosaccharide Characterisation

Several enzymes of the lytic polysaccharide monooxygenase (LPMO) auxiliary activity (AA) family-9 (AA9), were cloned to produce various AA9-produced cello-oligosaccharides (AA9_COS), for use as elicitors. Particularly active examples included: TtAA9E from *Thielavia terrestris* (ACE10234.1) obtained synthetically from Eurofins Genomic (Ebersberg, Germany), gene sequence ATG TTA GCT AAT GGT GCA ATC GTT TTC CTT GCT GCC GCC TTG GGT GTG TCC GGA CAT TAC ACC TGG CCA CGT GTC AAT GAC GGT GCC GAC TGG CAG CAG GTA AGG AAG GCC GAT AAT TGG CAG GAT AAC GGT TAC GTT GGT GAT GTG ACG TCA CCA CAA ATC AGG TGC TTT CAA GCT ACC CCA AGT CCT GCT CCA AGT GTA CTT AAT ACT ACA GCT GGC TCT ACC GTC ACT TAC TGG GCC AAC CCA GAT GTG TAT CAT CCA GGT CCT GTT CAA TTT TAC ATG GCT AGG GTG CCT GAC GGC GAA GAT ATT AAC TCA TGG AAC GGT GAC GGA GCT GTT TGG TTC AAA GTC TAC GAA GAT CAT CCT ACT TTC GGT GCC CAA TTG ACA TGG CCT TCC ACT GGT AAG AGT TCT TTT GCT GTA CCC ATT CCA CCA TGC ATC AAA AGT GGA TAT TAT CTA TTG AGA GCC GAA CAG ATT GGA TTG CAT GTG GCT CAG AGT GTT GGA GGA GCT CAA TTC TAT ATT TCC TGC GCC CAA TTA TCT GTT ACT GGA GGA GGA TCA ACC GAA CCA CCC AAT AAG GTT GCA TTC CCC GGA GCT TAT TCC GCC ACT GAT CCA GGT ATT CTT ATT AAT ATT TAT TAT CCT GTG CCT ACG TCC TAT CAA AAT CCT GGA CCA GCT GTA TTT TCT TGC (SEQ ID NO: 1). The synthetic gene was cloned into a pPICZα-A containing AOX1 methanol-induced promoter, α-factor secretion signal, C-terminal c-myc epitope and polyhistidine tag (6His-Tag). The resulting plasmids (~10 μg of pPICZT::lpmo) was inserted by transformation into *P. pastoris* X-33. Competent cells were prepared as following: yeast cells from 100 mL YPD (1% (w/v) yeast extract, 2% (w/v) peptone and 2% (w/v) dextrose) medium were grown to an $OD_{600}$ of 1 to 2 and pelleted by centrifugation at 1,500×g for 5 minutes. The cells were then washed twice with water and suspended at room temperature for 30 min in 8 mL of 0.1 M LiCl and 10 mM DTT, 0.6 M sorbitol and 10 mM Tris-HCl pH 7.5. The cells were then pelleted and resuspended in 1M sorbitol to a final concentration of about $10^{10}$ cells/mL. The transformation method was performed as described by Invitrogen. The transformed *P. pastoris* colonies were grown and selected in YPDS (1% (w/v) yeast extract, 2% (w/v) peptone, 2% (w/v) dextrose, 1 M sorbitol, and 2% (w/v) agar) medium containing 0.2 mg/mL zeocin at 30° C. for 3 days (S. Wu, G. J. Letchworth, *High efficiency transformation by electroporation of Pichia pastoris pretreated with lithium acetate and dithiothreitol*, Biotechniques. 36:2004, 152-154, doi.org/10.2144/04361dd02). The protein expression was performed as follow: isolated zeocin-resistant transformants were submitted to a selection in YPD containing 0.2 mg/mL zeocin and incubated at 30° C. and 200 rpms for 16 h. 50 μL of YPD pre-culture was inoculated in 5 ml of BMGY which contains glycerol as a carbon source (1% yeast extract, 2% (w/v) peptone, 1.34% (w/v) YNB, $4\times10^{-5}$% biotin, 0.1 M potassium phosphate (pH 6.0) and 1% (w/v) glycerol) and then incubated at the same conditions for 16 h. The cells were pelleted and suspended in 1 ml BMMY, which contains methanol to induce protein expression and also used as a carbon source (1% (w/v) yeast extract, 2% (w/v) peptone, 1.34% (w/v) YNB, $4\times10^{-5}$% biotin, 0.1 M potassium phosphate (pH 6.0) and 1% (v/v) methanol). The culture medium was then daily supplemented with 2% (v/v) methanol for 3 days. The enzyme expression was confirmed by SDS-PAGE analysis of the supernatant content (M. Haon, S. Grisel, D. Navarro, A. Gruet, J. G. Berrin, C. Bignon, *Recombinant protein production facility for fungal biomass-degrading enzymes using the yeast Pichia pastoris*, Front Microbiol. 6:2015, 1002, doi.org/10.3389/fmicb.2015.01002).

Also a second example of active LPMO used is the MtAA9A gene (MYCTH_112089) *Thermothelomyces thermophilus* M77 (formerly *Myceliophthora thermophila*), obtained from the Fungal Genetic Stock Center (University of Missouri, Kansas City, Missouri.), PCR amplified from genomic DNA with the original signal peptide. The PCR product was amplified using the oligonucleotide primers forward (5'-AGCATCATTACACCTCAGCAATGAAGTCCTTCACCCTCAC-3'; SEQ ID NO: 2) and reverse (5'-TAAATCACTAGATATCTCTATTAGACGCACTGCGAGTAGT-3'; SEQ ID NO: 3) and was cloned into the pEXPYR vector (Kadowaki et al. *Functional characterization of a lytic polysaccharide monooxygenase from the thermophilic fungus Myceliophthora thermophila. PlosOne* 2018, vol. 13, e0202148) using the Ligation-Independent Cloning protocol (LIC). The clone was transformed in *A. nidulans* A773, as described (Segato et al. *High-yield secretion of multiple client proteins in Aspergillus*. Enzyme Microb. Technol. 2012, vol. 51, 100-106). Approximately $10^7$ spores $ml^{-1}$ were inoculated in liquid minimal medium at pH 6.5, containing 50 ml/l Clutterbuck salts (120 g/l $NaNO_3$, 10.4 g/l KCl, 10.4 g/l $MgSO_4{\cdot}7H_2O$ and 30.4 g/l of $KH_2PO_4$), 1 ml/l trace elements (22 g/l of $ZnSO_4{\cdot}7H_2O$, 11 g/l of $H_3BO_3$, 5 g/l of $MnCl_2{\cdot}4H_2O$, 5 g/l of $FeSO_4{\cdot}$7H2O, 1.6 g/l of $CoCl_2{\cdot}5H_2O$, 1.6 g/l of $CuSO_4{\cdot}5H_2O$, 1.1 g/l of $Na_2MoO_4{\cdot}4H_2O$ and 50 g/l of $Na_2EDTA$), supplemented with 1 mg/L pyridoxine and 2% (w/v) maltose and maintained in static culture at 37° C. for 48 h. The culture medium was filtered using Miracloth membrane (Calbiochem, San Diego, CA, USA).

For all secreted proteins the same following steps were used for their separation and purification. Proteins were concentrated 10 times by VivaFlow 200 tangential cross-flow concentrator (molecular mass cutoff, 10 kDa; Sartorius Stedim Biotech GmbH, Germany) and immediately applied to a 10 ml DEAE-Sepharose column (GE Healthcare) pre-equilibrated with 20 mM Tris/HCl buffer pH 8.0. The enzyme was collected in the flow through fraction and concentrated by ultrafiltration (10 kDa cutoff Centricon-Millipore, Billerica, MA, USA). The MtAA9A was saturated with copper by incubating the protein solution in 50 mM Tris-HCl pH 8.0 with a 3-fold molar excess of Cu(II) $SO_4$ for 10 min at room temperature and further purified using size exclusion chromatography on a HiLoad 16/60 Sephadex75 column (GE Healthcare) with a running buffer consisting of 150 mM NaCl and 20 mM Tris-HCl pH 8.0. The total protein was quantified using the Bradford method (Bradford. *A Rapid and Sensitive Method for the Quantitation of Microgram Quantities of Protein Utilizing the Principle of Protein-Dye Binding*. Anal. Biochem. 1976, vol. 72, 248-254). The protein purity was analysed by SDS-PAGE, stained with Coomassie blue G-250. The cellulosic substrate PASC-phosphoric acid swollen cellulose was prepared as following: 4 grams of Avicel cellulose (Sigma Aldrich Saint-Luis) was suspended into phosphoric acid, 100 mL (86% w/v) at room temperature and stirred for an hour. Then, the mixture was washed several times with 20 liters of ice-cold water to remove the $H_3PO_4$ before adding 1% $NaHCO_3$ solution to neutralize any residual $H_3PO_4$. The final dry matter was analyzed in a Moisture Analyzer MA45 (Sartorius, Germany), the preparation was done following the standard procedure described by Wood (*Preparation of Crystalline, Amorphous, and Dyed Cellulase Substrates*. Methods Enzymol. 1988, vol. 160, 19-25). PASC (0.5%, w/v) was incubated with the 1 μM MtAA9A in 20 mM sodium acetate buffer (pH 5.0) using 1 mM ascorbic acid as reducing agent in a final volume of 10 ml. The reaction was incubated at 50° C. and shaking at 800 rpm for 16 h. The reaction was then centrifuged at 13,000×g for 3 min and the supernatant was transferred to a new tube. A sample of 60 μL was inserted in the HPLC conical vial and LPMO reaction products were analysed by high-performance anion exchange chromatography (HPAEC) on a Dionex ICS6000 instrument equipped with pulsed amperometry detection (PAD) and a CarboPac PA1 column (2×250 mm) with a CarboPac PA1 guard column (2×50 mm). The elution was performed as described by Westereng et al. (*Efficient separation of oxidized cello-oligosaccharides generated by cellulose degrading lytic polysaccharide monooxygenases*. J Chromatogr A. 2013, vol. 1271, 144-152). The peaks of the cellulose oligomers in the chromatograms were assigned according to Westereng et al. 2013 (supra).

Beta-Glucosidases Enzymatic Digestion Assay

The native cellodextrines cellobiose, cellotriose and cellotetraose at 100 μM each, and C1-oxidized cellobionic acid, cellotrionic acid and cellotetraonic acid at 100 μM each, and the AA9_COS (100 uM) mixture were all incubated individually with 1 μM of beta-glucosidases enzyme from *Aspergillus niger* (Megazymes, Ireland, product code: E-BGLUC) for 1 hour at 50 Celsius degree, using Na-acetate buffer 50 mM at pH 5.5. The volume of reaction was set at 500 μl and carried in 2 ml gas tight tubes, shacked constantly at 800 rpm, and the hydrolysis was sampled 100 μl after 5 minutes, 30 minutes and 60 minutes. The hydrolysates were analysed by HPAEC analytics according to Westereng et al. 2013 (vide supra).

Example 2—Oxidised Cellodextrins and Mixtures of Oxidised and Native Cellodextrins Act as Potent Plant Defence Elicitors In this example, members of the AA9 LPMO family, namely TtAA9E, and MtAA9A were cloned from the fungi *Thielavia terrestris* and *Myceliophthora thermophila*, respectively, and the product of their activity on cellulose substrate was for the first time demonstrated and characterised as plant defence elicitor. To understand the impact of LPMO-derived cello-oligosaccharides (hereafter named AA9_COS) in plants, genome-wide analysis was carried out in *Arabidopsis* seedlings. The analysis of early transcriptional responses showed a powerful modulation of the plant immune system. In addition, single components, in particular cellobionic acid, cellotrionic acid and cellobiose were separated to characterise the specific effects of the oxidised and native cellodextrins from the AA9_COS mixtures. Synergistic effects arising from the combined action of cellobionic acid and other oxidised cellodextrins, or from the combined action of oxidised cellodextrins such as cellobionic acid and native cellodextrins as found in the AA9_COS mixture, were observed for several readouts relevant for plant defences. The smallest of the oxidized cellodextrins, cellobionic acid, has to our knowledge never been shown to activate plant defences, and to even achieve effects different from and superior to or stronger than those of cellobiose. Interestingly, no oxidative burst was detected after AA9_COS treatment but a 60% reduction of *Botrytis cinerea* in planta propagation was observed. Together, the data establishes that mixtures of oxidised cellodextrins and native cellodextrins, as well as certain individual components, such as in particular cellobionic acid, can be employed as powerful plant defence elicitors, such as in agricultural and horticultural applications.

Figure 1B:
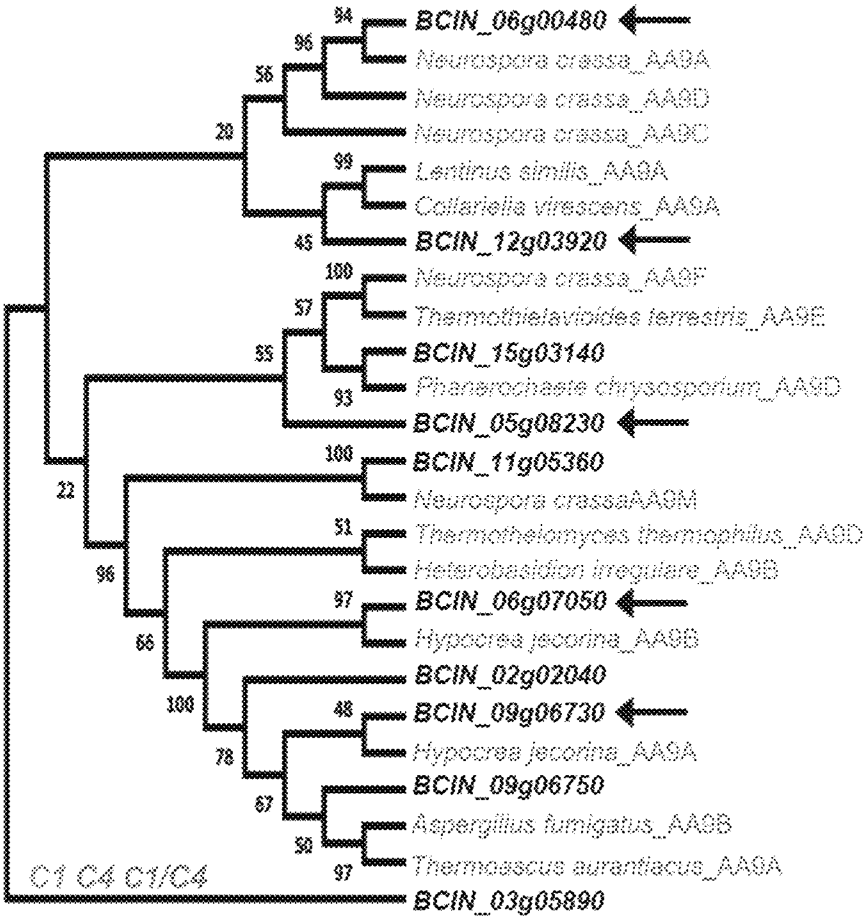
Figure 1C:
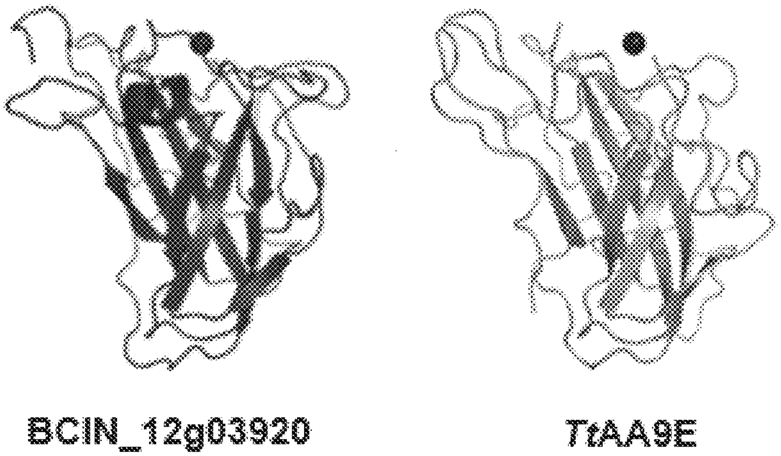
Figure 1D:
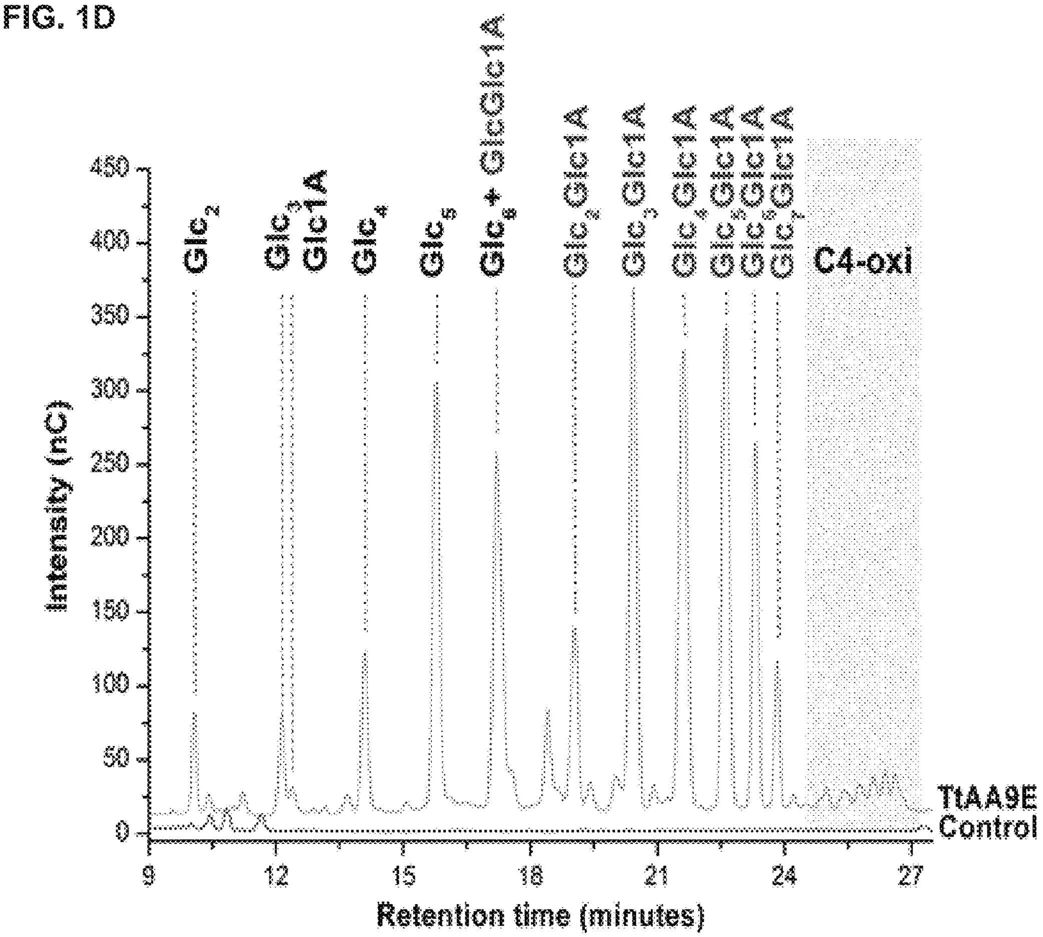

Expression of *Botrytis cinerea* Lytic Polysaccharide Monooxygenase (LPMO) Auxiliary Activity (AA) Family 9 (BcAA9) Enzymes During Pathogenic Attack To understand the involvement of AA9s during pathogenicity, the expression of *Botrytis cinerea* Auxiliary Activity 9 (BcAA9) gene family was measured 48 h after inoculation of *Arabidopsis thaliana* leaves. Among the ten genes of this family, BCIN_05g08230, BCIN_06g00480, BCIN_06g07050 and BCIN_09g06730 were expressed at least three-fold with respect to BcTUB gene (FIG. 1*a*), whereas the BCIN_12g03920 showed an even higher expression. To predict the regioselectivity of AA9s deployed by *B. cinerea* during pathogenicity, we built a phylogenetic tree comparing the BcAA9s catalytic module sequences with structurally-resolved AA9s enzymes (FIG. 1*b*). This analysis showed that three (BCIN_06g07050, BCIN_09g06730 and BCIN_12g03920) of the five in planta expressed BcAA9 genes clustered with AA9s enzymes from other species featuring C1/C4-regioselectivity. Moreover, the prediction of the structural catalytic domain of BCIN_12g03920 enzyme, the most highly expressed BcAA9, showed a high similarity with the fungus *Thermothielavioides terrestris* TtAA9E structure (FIG. 1*c*). Therefore, to produce a cellodextrins pool mimicking the in vivo activity of BcAA9s, the TtAA9E enzyme as well as MtAA9A enzyme were chosen from our collection. The cellodextrins obtained after incubation of TtAA9 with cellulosic substrate (phosphoric acid swollen cellulose, PASC) was purified with molecular sieves (3 KDa) and characterized with High-Performance Anion-Exchange Chromatography with Pulsed Amperometric Detection (HPAEC-PAD) (FIG. 1*d*). An HPAEC characterisation of the individual components of the AA9_COS demonstrated a 4:5:1 ratio between native, C1-oxidized and C4-oxidized cellodextrins, respectively. The ability of the products to resist the cellodextrine-degrading enzymes beta-glucosidases was also tested. Degradative tests showed that cellobionic acid and 4-keto-cellobiose (respectively the C1 and C4 oxidation products of cellobiose), were the only products able to resist the digestion by beta-glucosidases after instant (less then 5 minutes) incubation.

Figure 2:
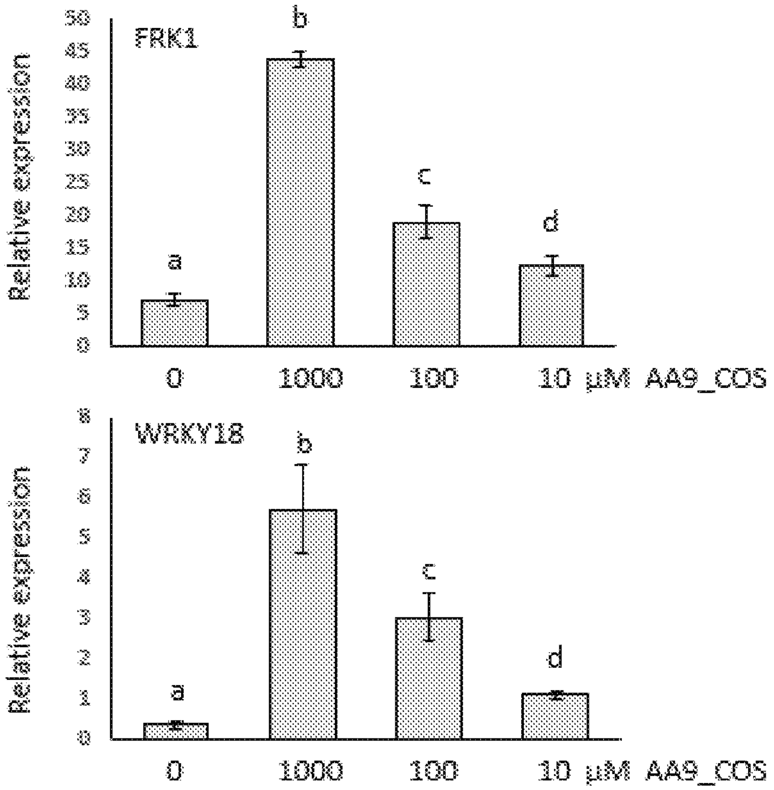
FIG. 2 illustrates FRK1 and WRKY18 gene expression in *Arabidopsis* in response to different concentrations of AA9_COS. The expression of FRK1 and WRKY18 genes was evaluated in 14-day old *Arabidopsis* plants 1 hour after treatment with increasing concentrations of AA9_COS. Different letters correspond to significantly different expression levels according to the Mann-Whitney test ($p<0.05$).

Treatment with a Mixture of Oxidised Cellodextrins and Native Cellodextrins Induced Transcriptomic Changes in *Arabidopsis* Seedlings In *Arabidopsis*, the DAMPs-dependent elicitation of PTI is known to be accompanied by a deep immune gene transcriptional reprogramming. Herein, cDNA microarray analysis was performed 1 h after treatments with AA9_COS or cellobiose, in 14-day old *Arabidopsis* plants. For both substances we used the concentration of 100 μM, because at this concentration cellobiose was reported to activate defence in *Arabidopsis* root (Souza et al. 2017, supra), and further because dose-response analysis of selected defence marker genes, such as FRK1 and WRKY18 (FIG. 2), showed a satisfactory activation at this concentration. The transcriptomic analysis was carried out by using *Arabidopsis* 1.0 ST microarray chip (Affymetrix, Santa Clara, CA, USA) and Differentially Expressed Genes (DEGs) were selected using two criteria: $\log_2$ expression ratios ≥1.5-fold or ≥−1.5-fold and Student's t-test p-value≤0.05. With these criteria we observed that exogenous application of AA9_COS exerted a powerful effect on *Arabidopsis* transcriptome.

FIG. 3 shows a general overview about the statistical analysis of microarray data obtained following the treatments. This analysis highlighted changes in expression of 935 genes in AA9_COS treated plants, among them 664 genes were upregulated, and 271 genes were downregulated (FIG. 3*a*). On the other hand, cellobiose treatment elicited transcriptional changes of 440 genes, of which 346 and 94 were up- or down-regulated, respectively (FIG. 3*a*). Interesting, by plotting the gene expression ratios on $\log_{10}$-transformed p-value in a volcano plot we observed that the magnitude of expression and the level of significance of upregulated genes triggered by both treatments were higher as compared to the downregulated genes (FIG. 3*c* and FIG. 3*d*). Moreover, principal component analysis also explained 73% of the combined variance and separate samples between treatments (FIG. 3*b*). Control plants cluster separates from both treatments. Considering that the first component (PC1) is associated with the largest possible variance (39%), it clearly explains the effect of each treatment. Yet, the second principal component (PC2), which is associated with 19% of the variance, might be attributed to the different responses induced between cellobiose and AA9_COS application (FIG. 3*b*). This data is in agreement with the other analyses, where the changes in transcriptome were clearly different among the treatments.

Transcriptomic Change Induced by Treatment with a Mixture of Oxidised Cellodextrins and Native Cellodextrins was Mainly Related to Defence Responses To identify the biological processes of differentially expressed genes (DEGs) triggered by AA9_COS, gene ontology (GO) and pathway enrichment analysis were performed as described by Reimand et al. (*Pathway enrichment analysis and visualization of omics data using g:Profiler, GSEA, Cytoscape and EnrichmentMap*. Nat Protoc. 2019, vol. 14, 482-517). Generally, enrichment maps incorporate clusters of similar GO terms to create networks of nodes and edges representing gene sets and overlapped genes between gene sets, respectively. The GO analysis was performed using g:Profiler software (Raudvere et al. *g:Profler: A web server for functional enrichment analysis and conversions of gene lists*. Nucl. Acids Res. 2019, vol. 47, 191-198). The majority of GO terms were related to plant defence, including responses to wounding, incompatible interaction, and bacterial and pathogen attacks. AA9_COS also activated genes involved in the JA- and SA-signalling pathways, callose deposition, and response to the fugal elicitor chitin. For example, GO terms with particularly significant p values/FDR values included:

GO:0002376, immune system process, GO:0042742 defense response to bacterium, GO:0009408 response to heat, GO:0006955 immune response, GO:0045087 innate immune response, GO:0046677 response to antibiotic, GO:0010200 response to chitin, GO:0050832 defense response to fungus, GO:0009620 response to fungus, GO:0042542 response to hydrogen peroxide, GO:0034605 cellular response to heat, GO:0046777 protein autophosphorylation, GO:0009817 defense response to fungus, incompatible interaction, GO:0052542 defense response by callose deposition, GO:0009644 response to high light intensity, GO:0031347 regulation of defense response, GO:0010243 response to organonitrogen compound, GO:0009814 defense response, incompatible interaction, GO:0000302 response to reactive oxygen species, GO:0009636 response to toxic substance, and GO:0006979 response to oxidative stress.

Figure 4:
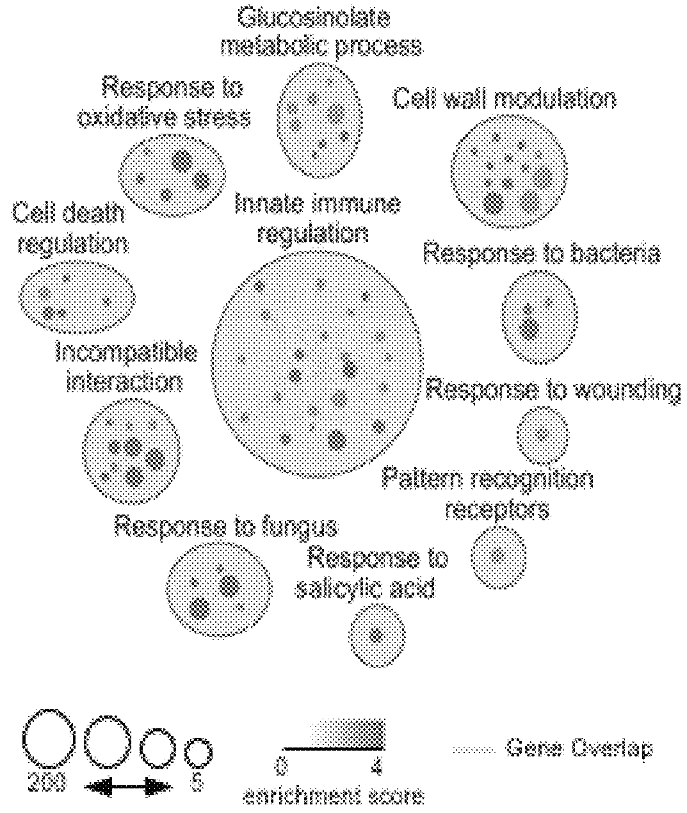
FIG. 4 illustrates that LPMO product AA9_COS-induced genes were related to pathogen defence. Gene ontology (GO) term enrichment analysis related to biological processes of 668 significantly up-regulated genes revealed enrichment of plant defence responses. The GO analysis was performed by using g:Profiler software (Benjamini-Hochberg FDR<0.05) and the EnrichmentMap function of Cytoscape. Each node represents a pathway, edges represent overlapped genes between nodes and circle size represents the number of genes encompassed.
Figure 3A:
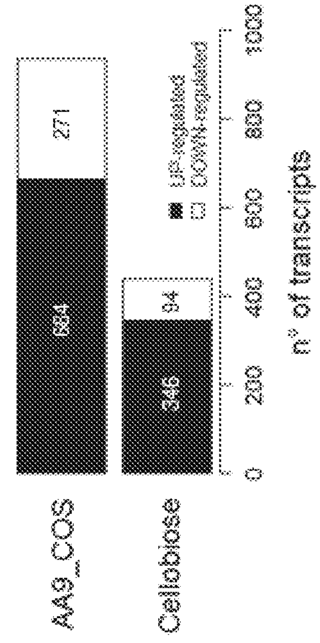
(FIG. 3A) Differentially expressed genes 1 hour after treatment with 100 μM cellodextrins AA9_COS and cellobiose.
Figure 3B:
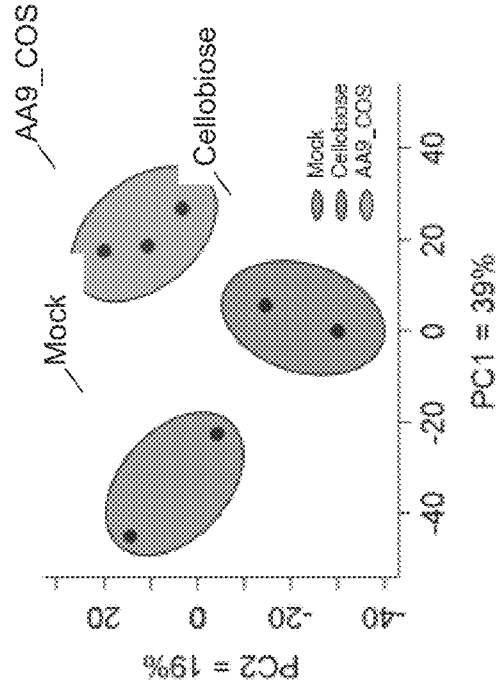
(FIG. 3B) Principal component analysis of differentially expressed genes (DEGs) induced by AA9_COS, cellobiose and mock treatments. The overall gene expression similarities between samples are visualised using two principal components (PC1 and PC2), capturing 39% and 19% of the total variation, respectively.
Figure 3C:
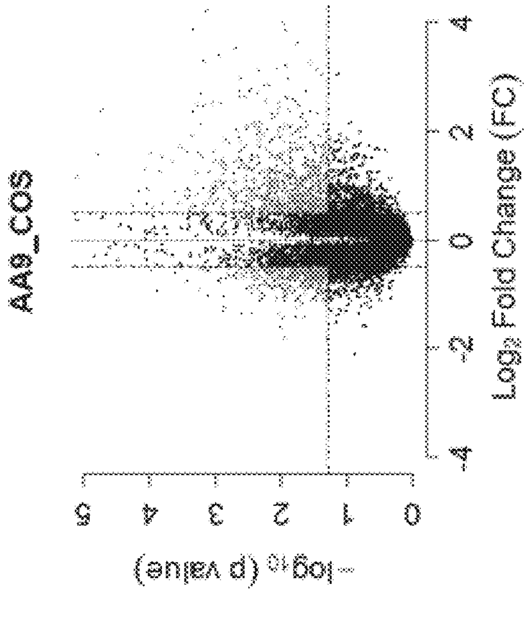
(FIGS. 3C and 3D) Volcano plot was generated using gene expression ratios ($log_2$ fold change) plotted against the negative $log_{10}$-transformed t-test p-values. Data points represent the expression of genes modulated by AA9_COS (FIG. 3C) or cellobiose (FIG. 3D) treatments, respectively.
Figure 3D:
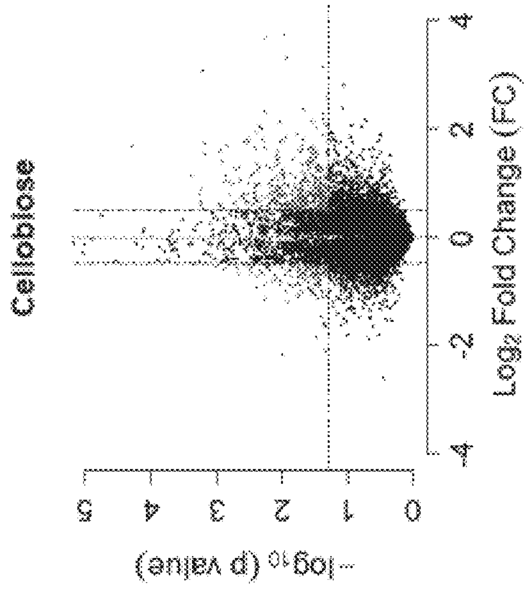

To better visualize the GO analysis, we clustered the GO terms by using the "Autoannotate" cytoscape tool thus obtaining 10 clusters associated to defence responses (FIG. 4). Among them, the most five enriched groups were defined as Innate Immune regulation (22 nodes), Cell wall modulation (12 nodes), Incompatible interaction (9 nodes), Glucosinolate metabolic process (8 nodes) and Response to oxidative stress (5 nodes) (FIG. 4). In summary, the pathway enrichment analysis revealed that the exposure of *Arabidopsis* plants to AA9_COS increased the expression of genes associated with several levels of plant defence.

Figures 5A, 5B, 5C, 5D, 5E:
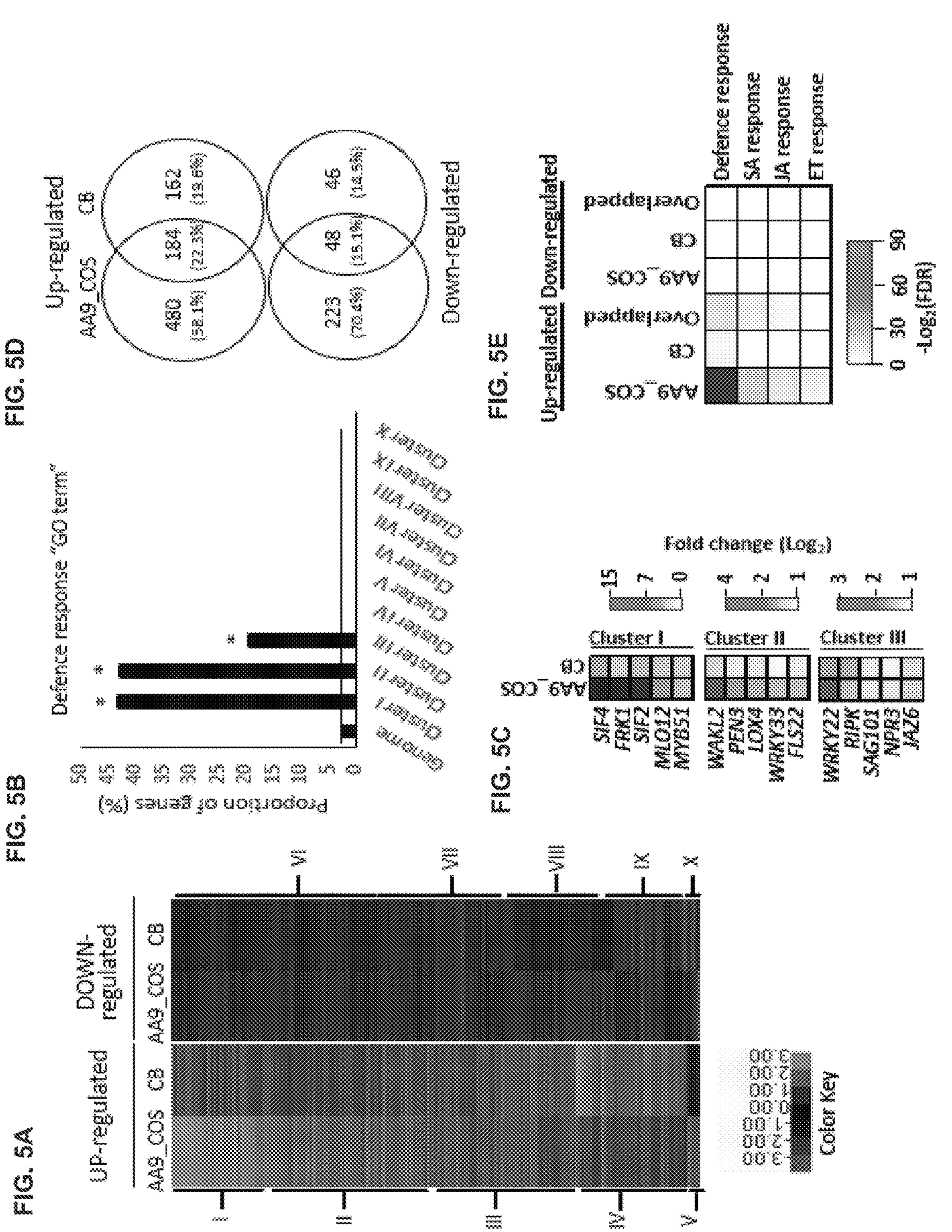
(FIG. 5A) Hierarchical clustering analysis of gene expression patterns that showed significant expression changes as compared to mock (p value; 0.05 and $\log_2$ fold change ($\log_2FC$) 1.5) 1 hour after AA9_COS or CB treatments in 14-day old Col-0 plants. The clusters were divided in up-regulated (left panel, apart from cluster 5, which showed opposite patterns of expression between treatments: upregulation by AA9_COS and down-regulation by cellobiose) or down-regulated (right panel) genes.
(FIG. 5B) The proportion of defence response-related genes from the relative GO-term evaluated per cluster.
(FIG. 5C) Heatmap of selected defence genes belonging to cluster I, II and III.
(FIG. 5D) Venn diagram showing specific and shared up- and down-regulated genes induced by AA9_COS and CB treatments.
(FIG. 5E) Gene ontology enrichment analyses performed with PSGEA indicated that defence-related genes were upregulated both by AA9_COS and by cellobiose treatments. −log 2(FDR) denotes gene ontology enrichment significance.

Genome Wide Comparison Demonstrated that Oxidized Cellodextrins Act Stronger in Triggering Defence-Associated Genes than Native Cellodextrins To elucidate differences and overlaps in transcriptome responses between AA9_COS and cellobiose application, a pair-wise transcriptome comparison was performed (FIG. 5). Hierarchical clustering revealed gene sets (clusters I and II) that were more intensely activated by AA9_COS than by cellobiose treatment, whereas comparable gene expression was detected in genes belonging to cluster III (FIG. 5*a*, Table 71).

TABLE II

Hierarchical clustering of differentially expressed genes following 100 μM AA9_COS or 100 μM cellobiose in Col-0 plants (cluster I). Values represent fold change gene expression compared to the control.

| AGI code | Gene description | AA9_COS | Cellobiose |
|---|---|---|---|
| AT2G19190 | FLG22-induced receptor-like kinase 1 | 14.83 | 1.38 |
| AT2G43620 | chitinase family protein | 12.32 | 2.15 |
| AT3G46280 | protein kinase-like protein | 25.18 | 4.51 |
| AT1G14540 | peroxidase 4 | 6.81 | 1.22 |
| AT2G17740 | cysteine/histidine-rich C1 domain-containing protein | 6.16 | 1.04 |
| AT2G36690 | 2-oxoglutarate (2OG) and Fe(II)-dependent oxygenase superfamily protein | 9.57 | 1.99 |
| AT1G36640 | hypothetical protein | 6.14 | 1.27 |
| AT5G64120 | peroxidase 71 | 6.04 | 1.42 |
| AT1G51850 | Leucine-rich repeat protein kinase family protein | 14.58 | 4.14 |
| AT1G74310 | chaperone protein ClpB1 | 10.50 | 2.87 |
| AT3G24500 | multiprotein-bridging factor 1c | 6.50 | 1.75 |
| AT2G39200 | protein MILDEW RESISTANCE LOCUS O 12 | 8.29 | 2.09 |
| AT2G46240 | BCL-2-associated athanogene 6 | 7.86 | 2.00 |
| AT4G22710 | cytochrome P450, family 706, subfamily A, polypeptide 2 | 4.40 | 1.15 |

TABLE II-continued

Hierarchical clustering of differentially expressed genes following 100 μM AA9_COS or 100 μM cellobiose in Col-0 plants (cluster I). Values represent fold change gene expression compared to the control.

| AGI code | Gene description | AA9_COS | Cellobiose |
|---|---|---|---|
| AT1G07400 | class I heat shock protein | 8.78 | 2.58 |
| AT1G49000 | hypothetical protein | 5.59 | 1.67 |
| AT2G26150 | heat stress transcription factor A-2 | 7.22 | 2.19 |
| AT4G01700 | Chitinase family protein | 4.08 | 1.23 |
| AT1G52200 | PLAC8 family protein | 5.14 | 1.57 |
| AT1G51800 | putative leucine-rich repeat protein kinase | 7.87 | 2.44 |
| AT1G54050 | CIII heat shock protein 17.4 | 4.38 | 1.36 |
| AT2G27660 | cysteine/histidine-rich C1 domain-containing protein | 5.22 | 1.63 |
| AT5G52640 | heat shock protein 90.1 | 9.82 | 3.70 |
| AT1G51790 | leucine-rich repeat protein kinase-like protein | 5.34 | 1.99 |
| AT1G79680 | wall-associated receptor kinase-like 10 | 4.42 | 1.62 |
| AT2G39518 | hypothetical protein | 6.67 | 2.22 |
| AT3G09350 | protein Fes1A | 6.70 | 2.18 |
| AT2G26560 | phospholipase A 2A | 6.25 | 2.02 |
| AT1G36622 | hypothetical protein | 5.00 | 1.62 |
| AT2G29500 | HSP20 family protein | 8.78 | 3.11 |
| AT5G51440 | heat shock protein 23.5 | 3.83 | 1.36 |
| AT1G30700 | FAD-binding Berberine family protein | 5.05 | 1.73 |
| AT4G26200 | 1-aminocyclopropane-1-carboxylate synthase 7 | 6.20 | 2.14 |
| AT1G51920 | hypothetical protein | 4.48 | 1.55 |
| AT5G57220 | cytochrome P450, family 81, subfamily F, polypeptide 2 | 3.08 | 1.07 |
| AT5G05300 | hypothetical protein | 4.48 | 1.78 |
| AT1G13520 | hypothetical protein | 5.13 | 2.05 |
| AT2G39210 | major facilitator protein | 4.16 | 1.67 |
| AT5G39580 | peroxidase 62 | 9.34 | 3.82 |
| AT3G26210 | cytochrome P450 71B23 | 3.32 | 1.35 |
| AT2G15220 | basic secretory protein family protein | 2.66 | 1.08 |
| AT3G16030 | G-type lectin S-receptor-like serine/threonine-protein kinase CES101 | 3.79 | 1.47 |
| AT5G48570 | peptidyl-prolyl cis-trans isomerase FKBP65 | 8.71 | 3.39 |
| AT1G55450 | S-adenosyl-L-methionine-dependent methyltransferases superfamily protein | 3.05 | 1.19 |
| AT1G02920 | glutathione S-transferase F7 | 2.81 | 1.10 |
| AT1G11100 | SNF2, helicase and zinc-finger domain-containing protein | 4.10 | 1.70 |
| AT3G51910 | heat stress transcription factor A-7a | 3.25 | 1.35 |
| AT5G67450 | zinc-finger protein 1 | 3.49 | 1.44 |
| AT1G30755 | hypothetical protein | 2.61 | 1.08 |
| AT1G19020 | hypothetical protein | 4.01 | 1.68 |
| AT1G61360 | G-type lectin S-receptor-like serine/threonine-protein kinase | 2.82 | 1.18 |
| AT4G11000 | ankyrin repeat-containing protein | 2.95 | 1.23 |
| AT5G15870 | glycosyl hydrolase family 81 protein | 2.73 | 1.14 |
| AT1G02930 | glutathione S-transferase F6 | 2.80 | 1.18 |
| AT5G37670 | heat shock protein 15.7 | 2.47 | 1.04 |
| AT1G02360 | putative chitinase | 2.45 | 1.03 |
| AT1G51820 | SIF2 | 15.74 | 6.99 |
| AT1G59865 | hypothetical protein | 5.93 | 2.57 |
| AT5G48540 | receptor-like protein kinase-related family protein | 4.26 | 1.85 |
| AT5G44585 | hypothetical protein | 5.04 | 2.20 |
| AT1G64400 | long-chain acyl-CoA synthetase | 2.70 | 1.18 |
| AT1G24145 | hypothetical protein | 2.62 | 1.15 |
| AT1G61560 | MLO-like protein 6 | 2.59 | 1.14 |
| AT5G46050 | peptide transporter 3 | 4.05 | 1.74 |
| AT5G44910 | Toll-Interleukin-Resistance domain-containing protein | 2.57 | 1.10 |
| AT1G27020 | hypothetical protein | 2.49 | 1.06 |
| AT3G14200 | chaperone DnaJ-domain containing protein | 5.59 | 2.55 |
| AT5G19230 | GPI-anchored glycoprotein membrane precursor | 2.73 | 1.24 |
| AT1G51890 | probable LRR receptor-like protein kinase | 4.23 | 1.91 |
| AT3G22060 | Receptor-like protein kinase-related family protein | 2.90 | 1.31 |
| AT1G18570 | myb domain protein 51 | 3.23 | 1.46 |
| AT4G21120 | amino acid transporter 1 | 2.39 | 1.07 |
| AT4G23280 | putative cysteine-rich receptor-like protein kinase 20 | 2.54 | 1.14 |
| AT5G39020 | putative receptor-like protein kinase | 2.27 | 1.02 |
| AT4G01750 | rhamnogalacturonan xylosyltransferase 2 | 5.63 | 2.59 |
| AT3G54420 | chitinase class IV | 3.75 | 1.74 |
| AT5G10695 | hypothetical protein | 4.81 | 2.27 |
| AT5G37600 | glutamine synthetase 1; 1 | 3.29 | 1.56 |
| AT5G44070 | glutathione gamma-glutamylcysteinyltransferase 1 | 3.02 | 1.44 |
| AT5G48530 | hypothetical protein | 4.41 | 2.07 |
| AT4G25110 | metacaspase 2 | 3.71 | 1.74 |
| AT5G14470 | GHMP kinase family protein | 2.58 | 1.21 |
| AT2G44490 | PEN2 | 2.56 | 1.20 |
| AT3G15500 | ATAF-like NAC-domain transcription factor | 2.57 | 1.20 |
| AT1G14200 | RING finger domain-containing protein | 3.72 | 1.86 |
| AT3G12910 | no apical meristem domain-containing transcriptional regulator | 2.73 | 1.36 |
| AT1G18382 | — | 2.81 | 1.39 |
| AT4G23220 | cysteine-rich receptor-like protein kinase 14 | 3.49 | 1.69 |
| AT4G12400 | carboxylate clamp-tetratricopeptide repeat protein | 6.70 | 3.23 |

TABLE II-continued

Hierarchical clustering of differentially expressed genes following 100 μM AA9_COS or 100 μM cellobiose in Col-0 plants (cluster I). Values represent fold change gene expression compared to the control.

| AGI code | Gene description | AA9_COS | Cellobiose |
|---|---|---|---|
| AT4G27280 | EF-hand, calcium binding motif-containing protein | 2.76 | 1.33 |
| AT5G35320 | hypothetical protein | 2.12 | 1.02 |
| AT1G65845 | hypothetical protein | 4.08 | 1.99 |
| AT4G15233 | ABC transporter G family member 42 | 3.41 | 1.66 |
| AT1G03220 | aspartyl protease-like protein | 2.22 | 1.08 |
| AT4G22470 | protease inhibitor/seed storage/lipid transfer protein (LTP) family protein | 3.47 | 1.77 |
| AT3G12580 | heat shock protein 70-4 | 6.41 | 3.24 |
| AT2G22880 | VQ motif-containing protein | 2.66 | 1.35 |
| AT3G08970 | J domain protein ATERDJ3A | 4.77 | 2.46 |
| AT4G11890 | receptor-like cytosolic kinase ARCK1 | 3.40 | 1.75 |
| AT4G38550 | phospholipase like protein (PEARLI 4) family | 3.11 | 1.60 |
| AT1G16110 | wall associated kinase-like 6 | 2.84 | 1.46 |
| AT1G53625 | hypothetical protein | 3.02 | 1.55 |
| AT4G23570 | phosphatase SGT1a | 4.29 | 2.22 |
| AT5G62020 | heat stress transcription factor B-2a | 1.93 | 1.00 |
| AT2G36220 | hypothetical protein | 2.76 | 1.44 |
| AT2G38870 | PR-6 proteinase inhibitor family protein | 2.44 | 1.27 |
| AT2G02010 | glutamate decarboxylase 4 | 2.12 | 1.11 |

These clusters contained most of the core defensive marker genes such as FRK1, WRKY33, NAC055, as well as several LRR-receptors and Wall Associated Receptors Kinase (FIG. 5*b* and FIG. 5*c*, Table 1). Yet, cluster V for which opposite expression profiles were detected between cellobiose (downregulated) and AA9_COS (upregulated), contained WRKY40 which is known to be important in signalling immunity responses against biotrophic pathogens. This analysis shows that AA9_COS exerted a more powerful effect in triggering plant defence responses compared to cellobiose.

Cluster IV, which grouped genes upregulated only by cellobiose treatment (FIG. 5*a*), featured genes associated with cellulose and carbohydrate metabolism as well as cell growth GO terms, suggesting that cellobiose is likely to be more easily metabolised by plants than AA9_COS.

Figure 6:
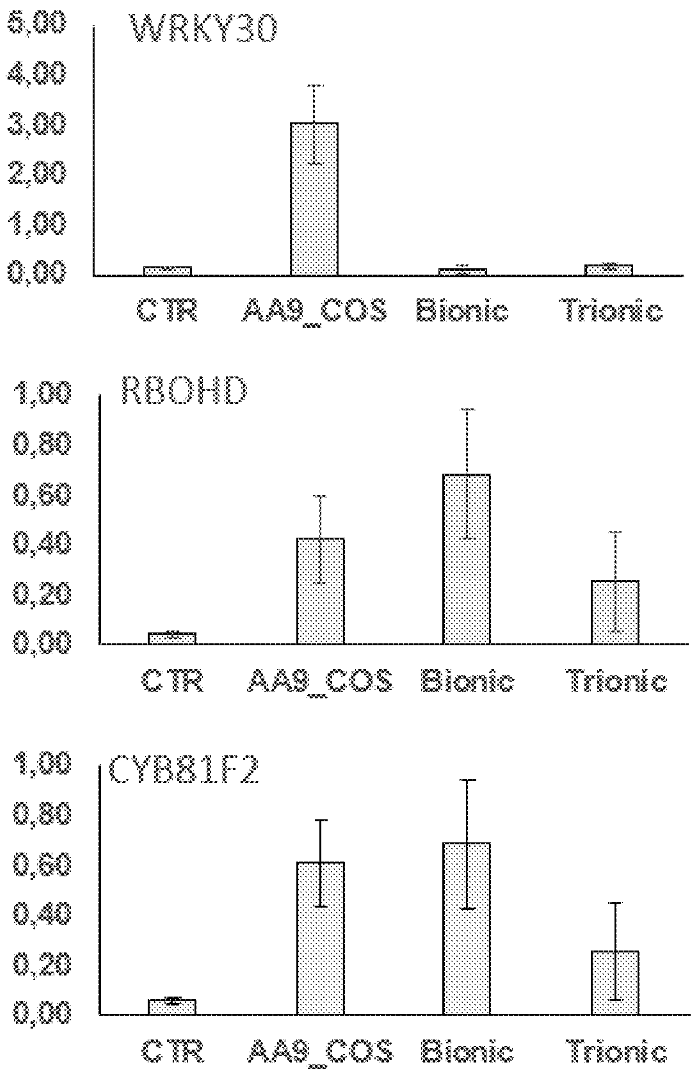
FIG. 6 illustrates the effect of AA9_COS and of the single components cellobionic acid (“Bionic”) or cellotrionic acid (“Trionic”) on the activation of 3 marker genes (CYB81F2, RBOHD, and WRKY30).

Cellobionic acid alone was demonstrated to have similar or even higher elicitor capacity to an identical quantity of the mixture of oxidised and native cellodextrins (AA9_COS) as well as to cellotrionic acid in eliciting specific plant defence gene markers CYB81F2 and RBOHD (FIG. 6), whereas the generic WRKY30 marker known to be activated by native cellodextrines was only activated by AA9_COS.

Regarding the total number of commonly induced genes, the upregulated genes (22.1%, 184 genes) were almost four-fold more numerous compared to the downregulated genes (15.1%, 48 genes) (FIG. 5*d*). Interestingly, even while a large number of shared upregulated genes were associated with defence responses, including SA (salicylic acid)- and JA (jasmonic acid)-responsive genes (FIG. 5*e*), genes upregulated by AA9_COS were much more enriched in defence response as indicated by the much higher $-\log_2$ (FDR) values (FIG. 5*e*).

Similarly, we found that the SA- and JA-dependent genes were quite enriched among genes upregulated by AA9_COS treatment, whereas a negligible enrichment in ET (ethylene)-responsive genes was detected (FIG. 5*e*). Altogether these results suggest that AA9_COS triggered considerably higher magnitude of defence gene expression than cellobiose, which indicates that oxidised cellodextrins, such as aldonic acids, such as in particular cellobionic acid, contributed greatly to the defence gene induction. The data even allows to postulate a synergistic effect arising from the combined action of cellobionic acid and other oxidised cellodextrins, or from the combined action of oxidised cellodextrins such as cellobionic acid and native cellodextrins as found in the AA9_COS mixture, were observed for several readouts relevant for plant defences.

Figure 16A:
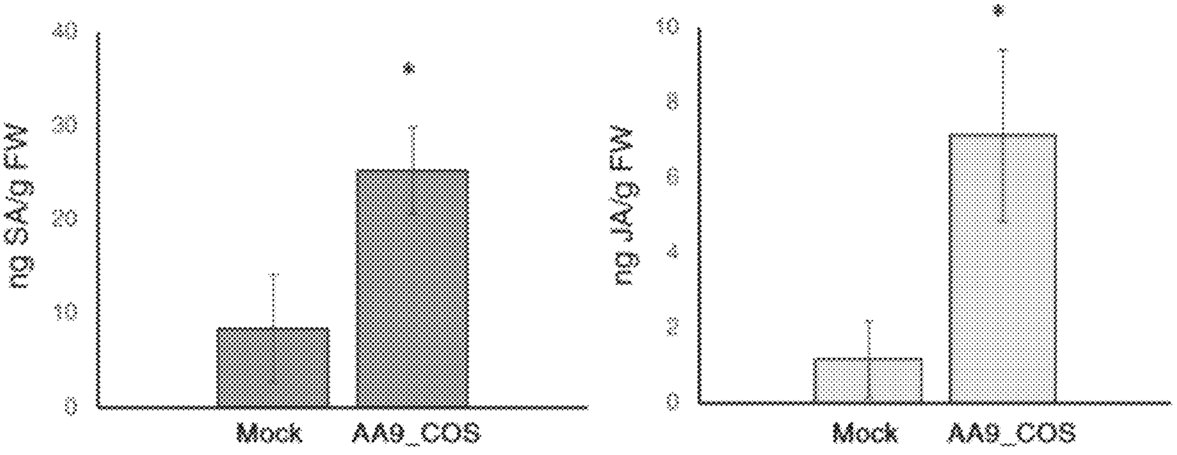
(FIG. 16A) Salicylic acid (SA) and jasmonic acid (JA) contents were quantified by high-performance liquid chromatography-electrospray ionization-tandem mass spectrometry (HPLC-ESI-MS/MS). Three pools (n=3) of fifteen leaves from three five-week-old *Arabidopsis* plants were treated with 100 μM AA9_COS or mock and leaves were collected, pooled and immediately frozen in liquid nitrogen 24 h after treatments. For each independent pool, JA and SA extraction and quantification was performed. Bars represent mean and standard deviation of three pool, asterixis indicate significant differences (one-way ANOVA test).
Figure 16B:
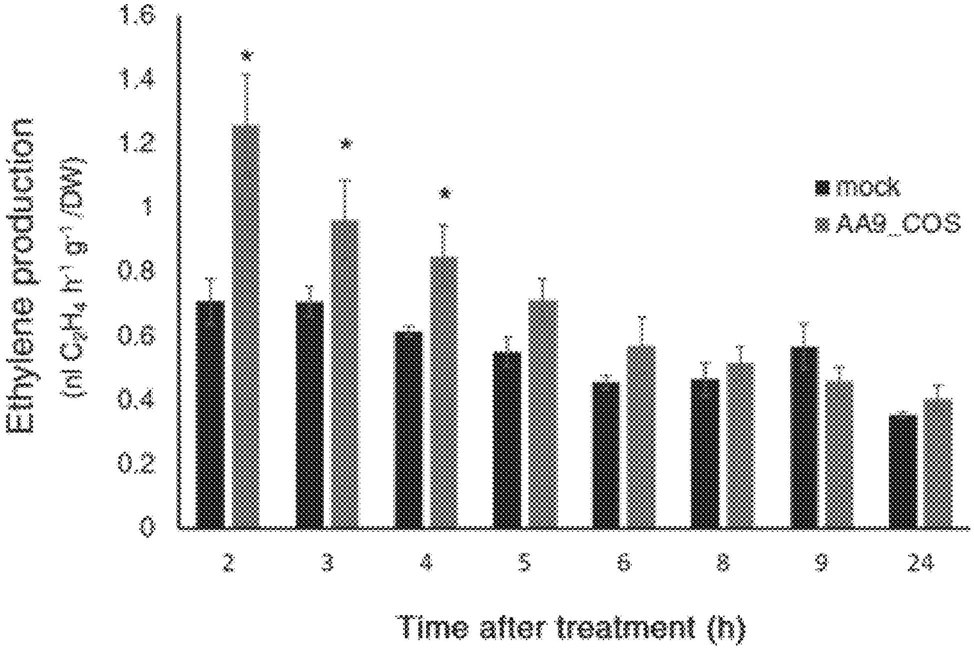
(FIG. 16B) Ethylene was measured in a time course-analysis using square dishes containing 100 fourteen-day-old seedlings each. Bars represent mean and standard error of eight independent square dishes (n=8). Asterixis indicate significant differences (one-way ANOVA test). DW: dry weight. FW: Fresh weight.

These predictions were further proved by liquid chromatography tandem mass spectrometry (LC-MS) quantification of SA and JA and gas-laser detection for ethylene, related to AA9_COS-treated plants (FIG. 16). About fourfold and eightfold increase in SA and JA levels, respectively, were detected 24 h after AA9_COS treatment as compared to mock. Instead, the ethylene was monitored in a time-course analysis from the immediate applications of AA9_COS until the following 24 h. An early twofold increase of ET was observed 2 h after AA9_COS treatment as compared to mock and significantly higher ET level lasted till 4 h after treatment, which is typical for this volatile hormone (FIG. 16).

Components of Signalling Transduction Modulated by a Mixture of Oxidised Cellodextrins and Native Cellodextrins Transcription Factors (TF) are regulatory elements acting upstream in signalling pathways. Transcriptomic analysis showed that AA9_COS activated specific defence-related TFs belonging to different families such as MYBs, NACs and WRKYs.

WRKY TF genes act as essential regulators for pathogen-triggered responses in numerous plant species. Ten members of the WRKY TF family were significantly upregulated by AA9_COS, among which WRKY18 was the most expressed (Table I). Previously, it has been shown that WRKY18 acted in complex with WRKY40 and WRKY60, whereas WRKY18, 33 and 40 were core players in signalling the early FLG22-depended defensive responses (Birkenbihl et al. *Induced Genome-Wide Binding of Three Arabidopsis WRKY Transcription Factors during Early MAMP-Triggered Immunity*. Plant Cell. 2017, vol. 29(1), 20-38). Although WRKY60 expression was not significantly ($p>0.05$) induced by AA9_COS, WRKY40 and WRKY33 expression was around 2-fold higher as compared to mock-treated plants. On the contrary, only WRKY18, 22 and 11 were found to be significantly upregulated by cellobiose (Table I).

Another class of TFs which plays important roles in regulating both biotic and abiotic stress responses is represented by the NAC TF family (Nuruzzaman et al. *Roles of*

*NAC transcription factors in the regulation of biotic and abiotic stress responses in plants*. Front Microbiol. 2013, vol. 4, 248). Five NAC genes were significantly upregulated by AA9_COS, three of which were significantly induced by cellobiose as well (Table I). Importantly, the most AA9_COS-induced NAC gene, namely NAC055, has been previously shown to act as key regulator for JA-responsive genes (Hickman et al. *Architecture and dynamics of the jasmonic acid gene regulatory network*. Plant Cell 2017, vol. 29, 2086-2105). This could also underlie the higher enrichment of JA-dependent responses observed in AA9_COS-treated than in cellobiose-treated plants (FIG. 5*e*).

Likewise, members of the MYBs TFs family were induced by AA9_COS. Although many MYB genes were also significantly modulated by cellobiose, a significant increase in the expression of MYB51 gene was observed following AA9_COS treatment. Because MYB51 is the main regulator of the MAMPs-dependent Indole Glucosinolate accumulation in *Arabidopsis* (Frerigmann et al. *Regulation of Pathogen-Triggered Tryptophan Metabolism in Arabidopsis thaliana by MYB Transcription Factors and Indole Glucosinolate Conversion Products*. Mol Plant. 2016, vol. 9(5), 682-695), this indicates that AA9_COS could also protect plants via this secondary metabolite pathway.

TABLE I

Gene expression fold changes of selected transcription factors involved in hormone signaling and defense-associated processes

| Transcription factor family | Gene identifier | Probeset | Annotation | Fold change (treatment/CTR) Cellodextrins Expression | Cellodextrins p-value | Cellobiose Expression | Cellobiose p-value |
|---|---|---|---|---|---|---|---|
| WRKY TFs | AT4G31800 | 13476200 | WRKY18 | 3.32 | 0.005 | 4.02 | 0.03 |
| | AT2G30250 | 13414799 | WRKY25 | 2.86 | 0.026 | 2.31 | >0.05 |
| | AT4G01250 | 13480486 | WRKY22 | 2.75 | 0.001 | 2.34 | 0.03 |
| | AT2G38470 | 13402383 | WRKY33 | 2.38 | 0.050 | 1.33 | >0.05 |
| | AT5G15130 | 13501728 | WRKY72 | 2.34 | 0.038 | 1.41 | >0.05 |
| | AT5G24110 | 13530150 | WRKY30 | 2.28 | 0.012 | 1.30 | >0.05 |
| | AT4G31550 | 13492012 | WRKY11 | 2.19 | 0.006 | 1.95 | 0.00 |
| | AT1G80840 | 13361730 | WRKY40 | 1.82 | 0.043 | −1.05 | >0.05 |
| | AT2G23320 | 13396306 | WRKY15 | 1.68 | 0.015 | −1.06 | >0.05 |
| | AT1G18860 | 13341989 | WRKY61 | 1.54 | 0.050 | −1.05 | >0.05 |
| NAC TFs | AT3G15500 | 13428695 | NAC055 | 2.57 | 0.039 | 1.20 | >0.05 |
| | AT3G04070 | 13444373 | NAC047 | 2.29 | 0.014 | 1.81 | 0.05 |
| | AT3G17730 | 13429694 | NAC057 | 1.62 | 0.030 | 1.40 | 0.05 |
| | AT5G04410 | 13497454 | NAC078 | 1.57 | 0.007 | 1.31 | 0.00 |
| | AT3G18400 | 13450847 | NAC058 | 1.52 | 0.017 | 1.41 | >0.05 |
| MYB TFs | AT1G18570 | 13341812 | MYB51 | 3.23 | 0.018 | 1.46 | >0.05 |
| | AT1G76970 | 13388340 | Target of MYB protein 1 | 2.23 | 0.007 | 1.64 | >0.05 |
| | AT4G37260 | 13478745 | MYB73 | 1.69 | 0.020 | 1.06 | >0.05 |

Figure 7:
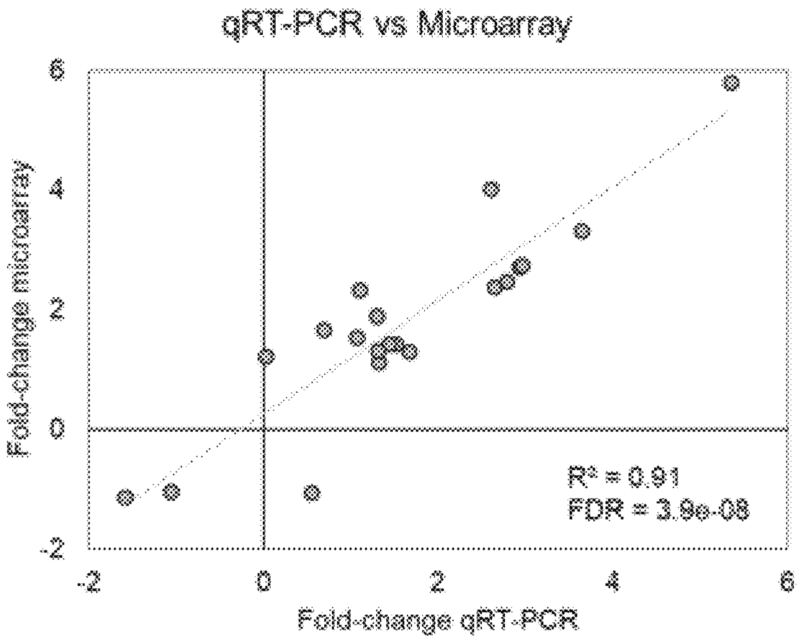
FIG. 7 illustrates correlation between microarray and qPCR data. The fold change gene expression determined by qPCR and by cDNA-microarray were plotted for a subset of 10 differentially expressed genes in *Arabidopsis*. The $R^2$ and FDR indicate good correlation between the real-time PCR and microarray results.

In addition, to confirm the reproducibility of the present microarray gene expression data, 10 genes (listed in Table Si) were further analysed by qPCR using aliquots of the same array-hybridised RNA. The values determined by qPCR were well-correlated with the ratios generated from the microarray results ($R^2$=0.91, FDR=3.9$e^{-8}$; FIG. 7), even if the expression values obtained from the microarray data generally underestimated fold enrichments determined by qPCR.

TABLE S1 list of genes used to correlate qPCR and microarray expression data

| AGI code | Gene name | Condition | qPCR | Microarray |
|---|---|---|---|---|
| At1G21120 | IGMT2 | Cellobiosebiose vs mock | −1.59 | −1.14 |
| | | AA9_COS vs mock | 5.35 | 5.81 |
| AT1G72520 | LOX4 | Cellobiose vs CTR | 0.69 | 1.68 |
| | | AA9_COS vs CTR | 2.78 | 2.48 |
| AT3G45640 | MPK3 | Cellobiose vs CTR | 0.02 | 1.22 |
| | | AA9_COS vs CTR | 1.52 | 1.44 |
| AT2G43790 | MPK6 | Cellobiose vs CTR | 0.55 | −1.06 |
| | | AA9_COS vs CTR | 1.32 | 1.13 |
| AT3G26830 | PAD3 | Cellobiose vs CTR | −1.06 | −1.04 |
| | | AA9_COS vs CTR | 1.67 | 1.31 |
| AT1G59870 | PEN3 | Cellobiose vs CTR | 1.07 | 1.55 |
| | | AA9_COS vs CTR | 2.93 | 2.72 |
| AT2G14610 | PR1 | Cellobiose vs CTR | 1.29 | 1.91 |
| | | AA9_COS vs CTR | 1.44 | 1.44 |
| AT4G31800 | WRKY18 | Cellobiose vs CTR | 2.60 | 4.02 |
| | | AA9_COS vs CTR | 3.65 | 3.32 |
| AT4G01250 | WRKY22 | Cellobiose vs CTR | 1.10 | 2.34 |
| | | AA9_COS vs CTR | 2.96 | 2.75 |
| AT2G38470 | WRKY33 | Cellobiose vs CTR | 1.31 | 1.33 |
| | | AA9_COS vs CTR | 2.64 | 2.38 |

Figure 8A:
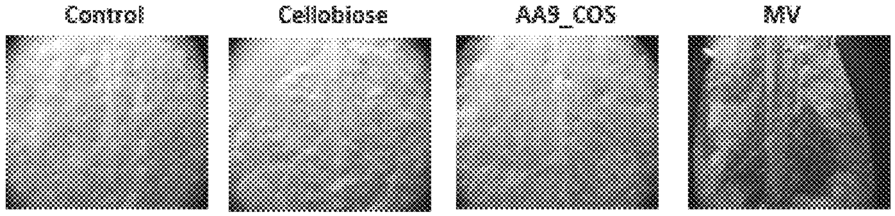
FIG. 8 illustrates that AA9_COS did not trigger an oxidative burst. Representative images of DAB (FIG. 8A) or NBT (FIG. 8B) stained leaves from 4 to 5-week *Arabidopsis* wild-type plants 24 hours after treatments are provided.
(FIG. 8C) Luminol-based assay for hydrogen peroxide detection showed that neither AA9_COS nor cellobiose treatment triggered detectable oxidative burst formation in *Arabidopsis* plants. The positive control $H_2O_2$ curve is labelled. The overlapped curves representing different treatments are labelled with “other”. MV, methyl viologen, and NaCl, sodium chloride, were used as positive controls.
Figure 8B:
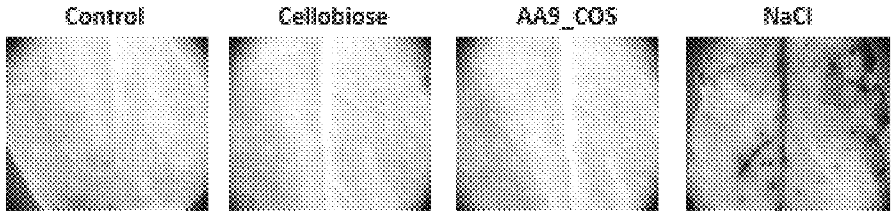
Figure 8C:
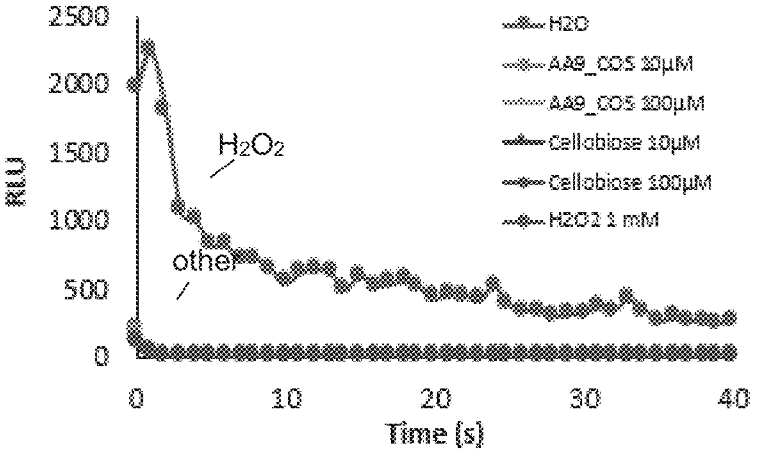

A Mixture of Oxidised Cellodextrins and Native Cellodextrins Did not Induce Oxidative Burst in *Arabidopsis* Leaves Transient and rapid generation of apoplastic reactive oxygen species (ROS), referred to as oxidative burst, is a hallmark of the early response to several MAMPs and chemical elicitor treatments (Torres et al. *Reactive oxygen* species *signaling in response to pathogens*. Plant Physiol. 2006, vol. 141(2), 373-8; Zarattini et al. 2017, supra). To evaluate the in situ production of hydrogen peroxide ($H_2O_2$)

and superoxide anion ($O_2^-$), two classical histochemical DAB and NBT assays were performed 24 h after treatments in 5-week old plants. As shown in FIG. 8*a* and FIG. 8*b*, no measurable production of $H_2O_2$ and $O^{2-}$ was detected following either AA9_COS or cellobiose treatments. Moreover, to evaluate the short-term extracellular $H_2O_2$ production, luminol-based assay was carried out in 14-day old plants (FIG. 8*c*). Similarly, no $H_2O_2$ production was detected in this assay from exposure to AA9_COS or cellobiose, indicating that either AA9_COS or cellobiose treatments triggered the plant immune system independently to the oxidative burst.

Figure 9A:
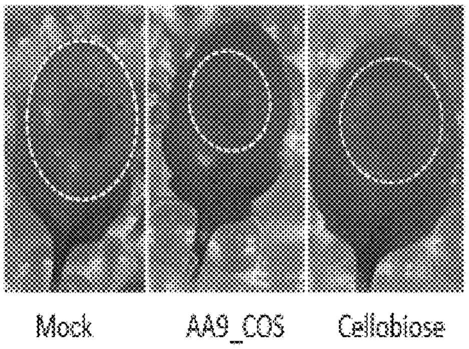
(FIG. 9A) Three days after infection photographs were taken and the lesion area was determined by ImageJ (FIG. 9B).
Figure 9C:
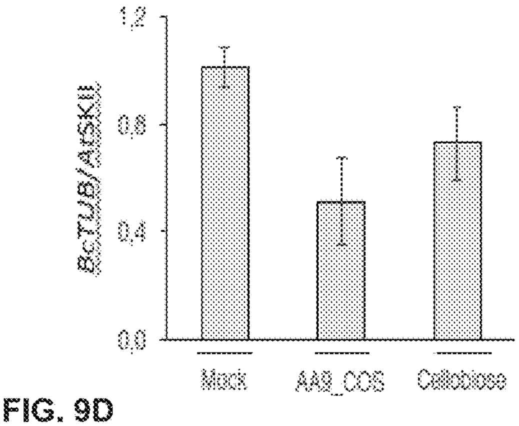
(FIG. 9C) The *B. cinerea* in planta growth was determined by qPCR 3 days after inoculation using housekeeping genes specific for *Arabidopsis* (AtSKII) and *B. cinerea* (BcTUB).
Figure 9B:
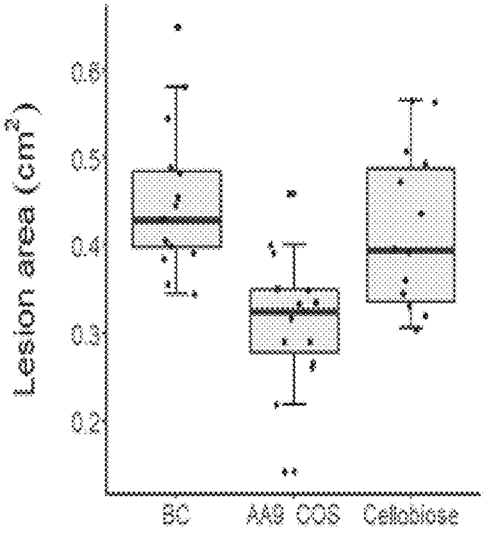
FIG. 9 illustrates AA9_COS induced resistance against *B. cinerea*. Detached leaves from 5 week-old *Arabidopsis* plants were spotted with 10 μl spore suspension ($10^5$ spores/mL).
(FIG. 9D) Callose was determined 6 and 24 hours following treatments in 5-week old plants.
(FIG. 9E) Representative pictures 24 hours after indicated treatments, bars indicate 500 μm.

Oxidised Cellodextrins Triggered Plant Basal Defence and Increased Protection Against *B. cinerea* Differently from Native Cellodextrines To demonstrate that the present treatments induced protection against necrotrophic fungi, in agreement with the gene expression data (FIG. 4), five-week-old plants were droplet-treated with either 100 μM AA9_COS or 100 μM cellobiose and leaves were inoculated with 10 μl *B. cinerea* spore suspension (5×10$^5$ spores ml-1) 24 h after treatments. Three days after fungus inoculation, the areas of the developing necrotic lesions were analysed by ImageJ software and the *B. cinerea* "in planta" growth was evaluated through qPCR. Representative pictures of the necrotic lesions formed on treated and not-treated plants are shown in FIG. 9*a*. The average sizes of necrotic lesions developed on AA9_COS pre-treated leaves were significantly reduced by 30% when compared with untreated leaves while a little protection to *B. cinerea* was observed in cellobiose-treated plant (FIG. 9*b*). The resulting lesion morphology data were well-correlated with the "in planta" growth carried out 3 days after infection. In fact, a reduction in the fungus biomass growth of approximately 50% was observed in AA9_COS pre-treated plants, whereas slight reduction in *B. cinerea* growth was detected in cellobiose pre-treated plants (FIG. 9*c*). Hence, in this experiment both treatments have a positive effect in protecting *Arabidopsis* against *B. cinerea* infection, with AA9_COS acting considerably stronger compared to cellobiose (FIG. 9*c*).

Figure 9D:
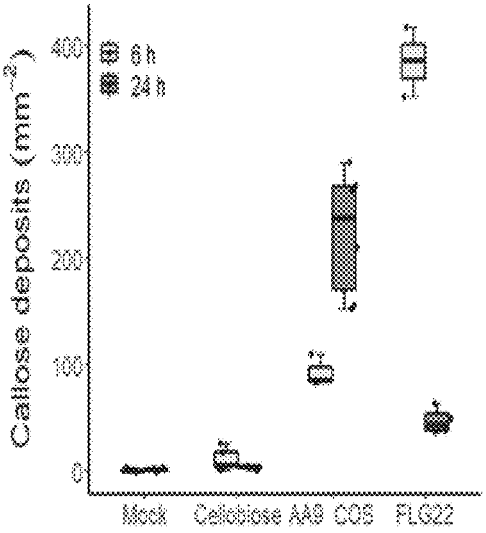
Figure 9E:
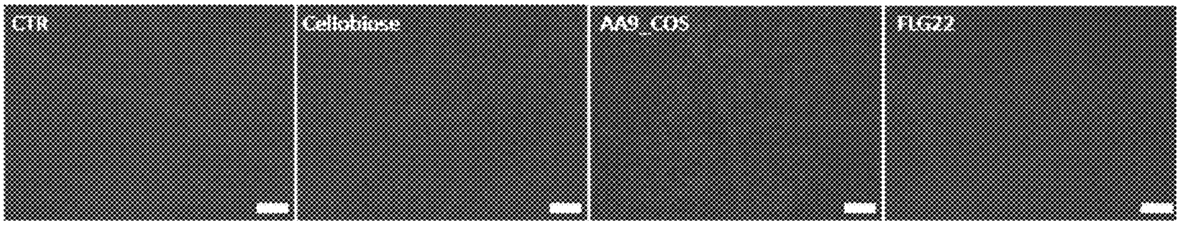

Indeed, the GO term enrichment analysis showed that AA9_COS upregulated gene clusters were associated with "cell wall modification". Among them, several genes were associated to callose deposition in the cell wall (FIG. 4). To experimentally elaborate this, callose was stained 6 and 24 h following 100 μM AA9_COS, 100 μM cellobiose or 1 μM FLG22 treatments in 5-week old *Arabidopsis* plants (FIG. 9*d*). At both time points a significant increase in callose accumulation was detected following AA9_COS treatment. On the contrary, no visible callose spots were detected after cellobiose treatment. Interestingly, different dynamics and amplitudes in callose deposition were observed between AA9_COS and FLG22 treatment, with the former acting stronger at 24 h post treatment and the latter acting stronger at 6 h (FIG. 9*d*).

Altogether these results confirm that AA9_COS induced resistance against the necrotrophic fungus *B. cinerea* which was more pronounced or intense than resistance induced by cellobiose.

A Mixture of Oxidised Cellodextrins and Native Cellodextrins Triggered Camalexin Biosynthesis and Signalling Previous studies have shown that Tryptophan-derived camalexin accumulation is a key response to enhance resistance against *B. cinerea*. The regulation of camalexin biosynthesis occurring during pathogen attack has been well described (He et al. *The Arabidopsis Pleiotropic Drug Resistance Transporters PEN*3 *and PDR*12 *Mediate Camalexin Secretion for Resistance to Botrytis cinerea*. Plant Cell. 2019, vol. 31(9), 2206-2222). This pathway involves the activation of MPK3-MPK6-WRKY33 signalling module which in turn induces the expression of PAD3 together with PDR12 and PEN3, two Pleiotropic Drug Resistance Transporter genes.

We carried out real-time qPCR and analysed expression profiles of these genes in 14-day old *Arabidopsis* plants 1 and 24 hours after 100 μM AA9_COS or 100 μM cellobiose treatments. Except for PDR12 (data not shown), a significant mRNA accumulation of MPK3/6, WRKY33, PAD3 and PEN3 was observed following AA9_COS application compared to both mock and cellobiose treated samples (FIG. 10). Apart from PAD3, comparable gene expression profiles were observed following cellobiose treatment, even though at a lower magnitude of expression compared to AA9_COS treated plants (FIG. 10).

Figure 10A:
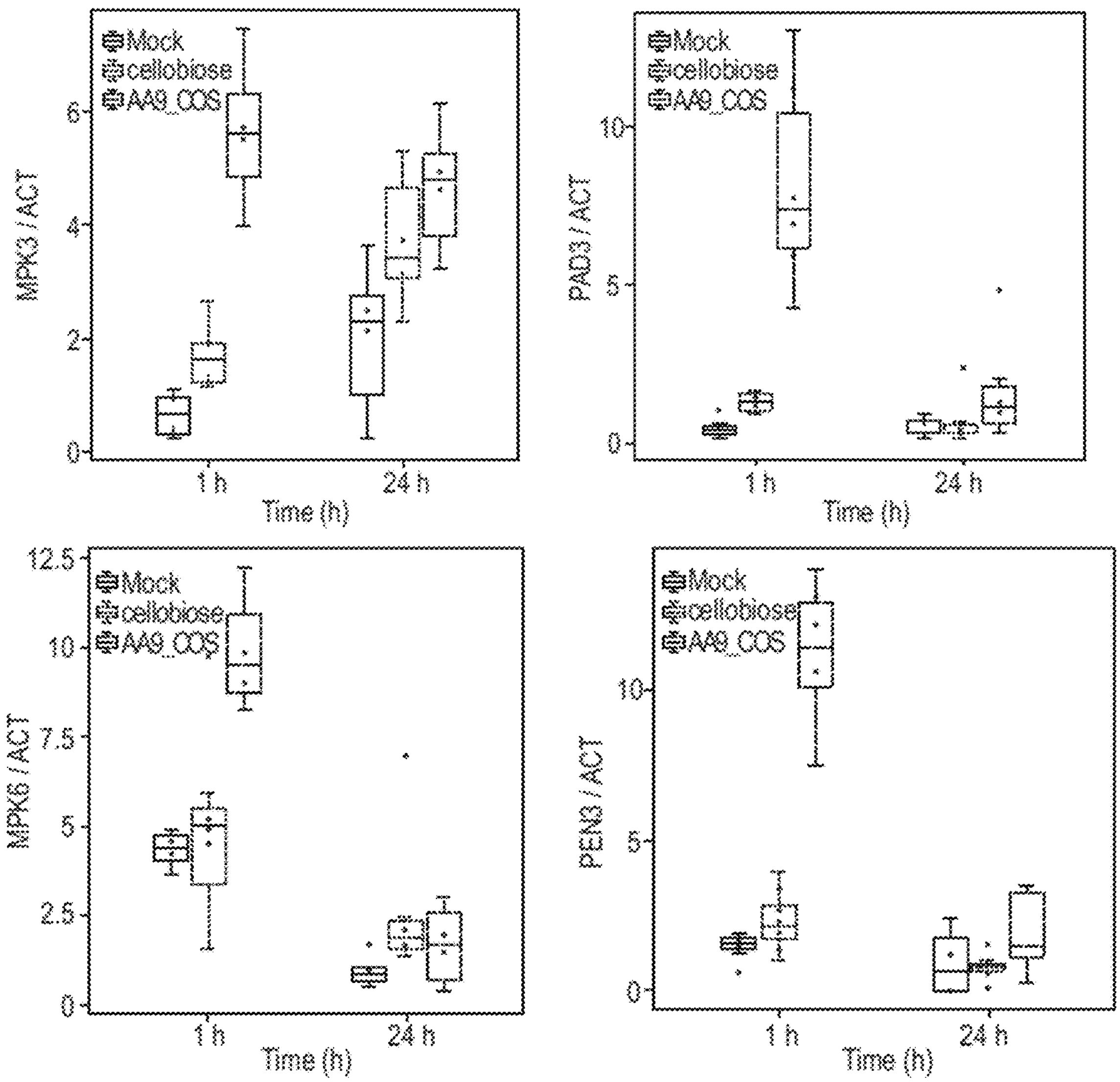
(FIG. 10A) The expression of genes involved in camalexin signalling and biosynthesis was evaluated in 14-day old *Arabidopsis* plants 1 and 24 hours after 100 μM AA9_COS or 100 μM cellobiose treatments. Median values are plotted in the boxes with data generated from two independent biological replicates. Different letters correspond to expression levels that are significantly different according to the Mann-Whitney test (significance set at p<0.05), (FIG. 10B) Proposed model for the AA9_COS regulation of camalexin biosynthesis and signaling, (FIG. 10C) Camalexin quantification, and (FIG. 10D) Early immunohistochemical quantification or Western-blot analysis of the MPK3/6 phosphorylation after the indicated treatments.
Figure 10A:
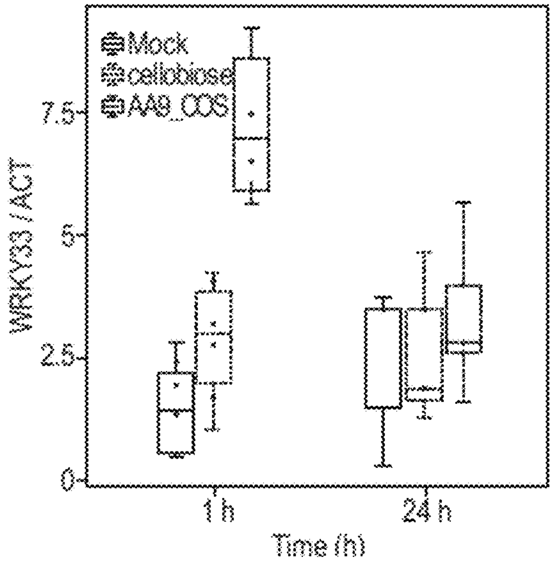
Figure 10B:
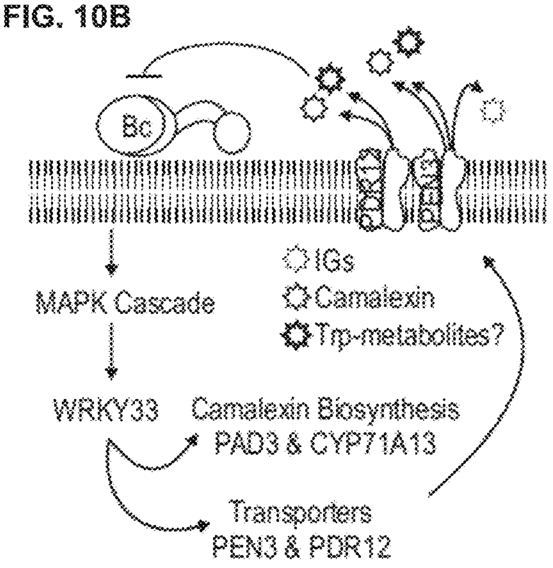
FIG. 10 illustrates that treatment with cellodextrins triggered camalexin signalling in *Arabidopsis*.
Figure 10C:
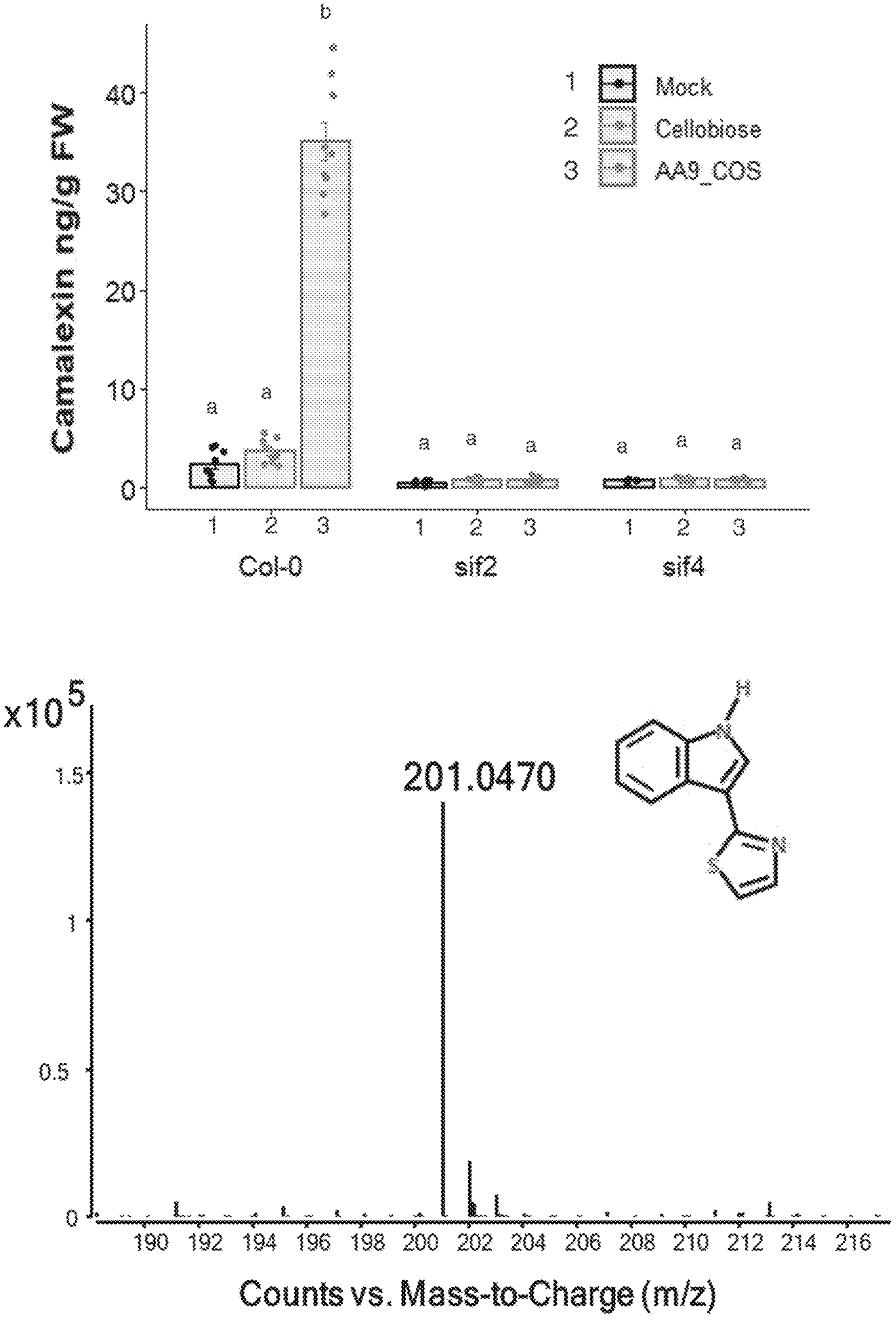

FIG. 10*c* illustrates camalexin quantification in 14-day-old Col-0, sif2, and sif4 KO mutants 24 h after 100 μM AA9_COS, 100 μM cellobiose, or mock treatments. For each treatment, camalexin was extracted from a pool of 14-day-old *Arabidopsis*. Briefly, 100 mg of ground-frozen samples were soaked using 80% (v:v) methanol in 1:1 (m/v) ratio. After homogenization, the supernatant was recovered through centrifugation at 17,000×g for 5 min and evaporated at 50° C. in nitrogen gas atmosphere. The residues were finally resuspended in high-performance LC-grade methanol and filtrated with 0.22-μm filters. Each pool was then analysed three times by LC-MS, using a reverse-phase LUNA® Omega 5 μm Polar C18 column (250×4.6 mm). The mobile phases were composed of 0.1% in water (solvent A) and acetonitrile (solvent B). The applied gradient was as follows: 0-2 min, 10% B; 2-13 min, 10-98% B; 13-23 min, 98% B; 23-25 min, 98-10% B; 25-30 min, 98% B; post-run 1 min.

Cellobiose and mock yielded comparable levels of camalexin (mock=2.4±1.4 ng g-1, cellobiose=3.7±1.8 ng g-1), whereas AA9-COS yielded 35.0±5.4 ng g-1 in Col-0 plants. On the contrary, no camalexin production, along with an increase of *B. cinerea* in planta growth, was observed in both sif2 and sif4 AA9_COS-treated plants.

Figure 10D:
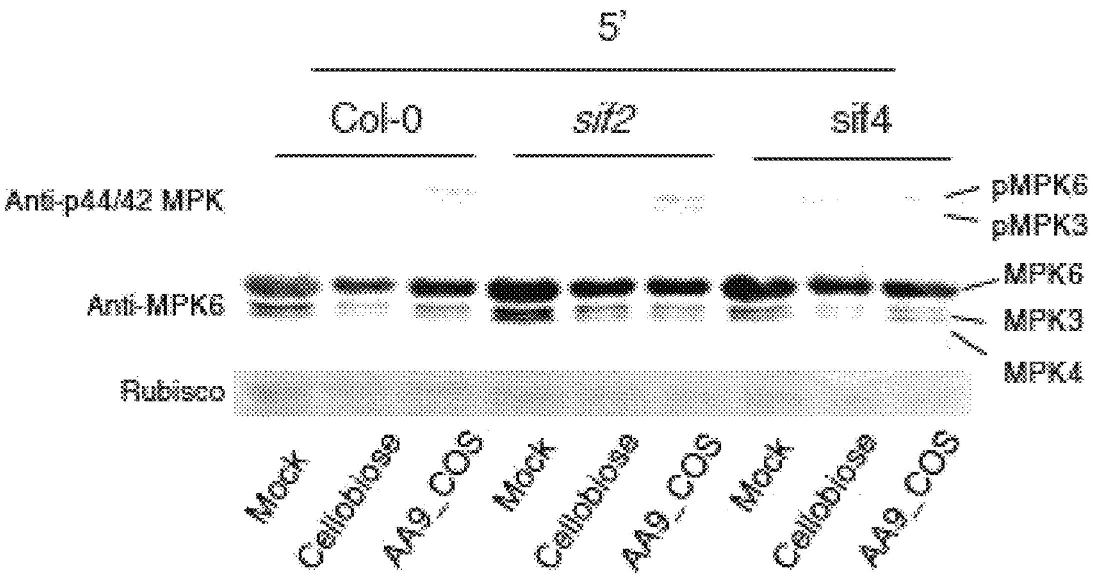

FIG. 10*d* illustrates early immunohistochemical quantification or Western-blot analysis of the MPK3/6 phosphorylation after the indicated treatments. Fourteen-day-old *Arabidopsis* wild-type, sif2, and sif4 mutants plants were treated with 100 μM AA9_COS, 100 μM cellobiose, or mock. Leaves were collected 5 mins after treatment, immediately frozen in liquid nitrogen, and stored at −80° C. for analysis. After protein extraction, for each sample 20 μg of proteins were denatured and separated on 12% acrylamide/bis-acrylamide SDS-PAGE gels. The separated proteins were transferred on a 0.45-μm Immobilon-PPVDF membrane (Millipore). Blocking was performed in TBST containing 5% non-fat dry milk, and blots were incubated overnight at 4° C. with specific antibodies (anti-AtMPK6 and anti-Phospho-p44/42 MPK (Thr202/Tyr204)), washed in TBST, and incubated with the secondary antibody anti-Rabbit IgG conjugated with horseradish peroxidase (HRP) enzyme diluted to 1/10,000. The chemiluminescent detection of HRP was performed withClarity™Western ECL Substrate and ChemiDoc™MP Imaging System.

Early MPK3/6 phosphorylation was detected after 100 μM AA9_COS treatment, whereas no phosphorylation was observed upon treatments with 100 μM cellobiose in Col-0 plants (FIG. 10*d* and data not shown). Therefore, the MPK3/6 proteins and their phosphorylated forms (pMPK3/6) were hybridized in Col-0, sif2, and sif4 mutant lines. After AA9_COS treatment, present inventors observed a signal for the pMPK3/6 both in Col-0 and sif2 and sif4 KO lines, even if a slight decrease in pMPK3/6 forms was observed in sif4 KO lines (FIG. 10*d* and data not shown).

Figure 11:
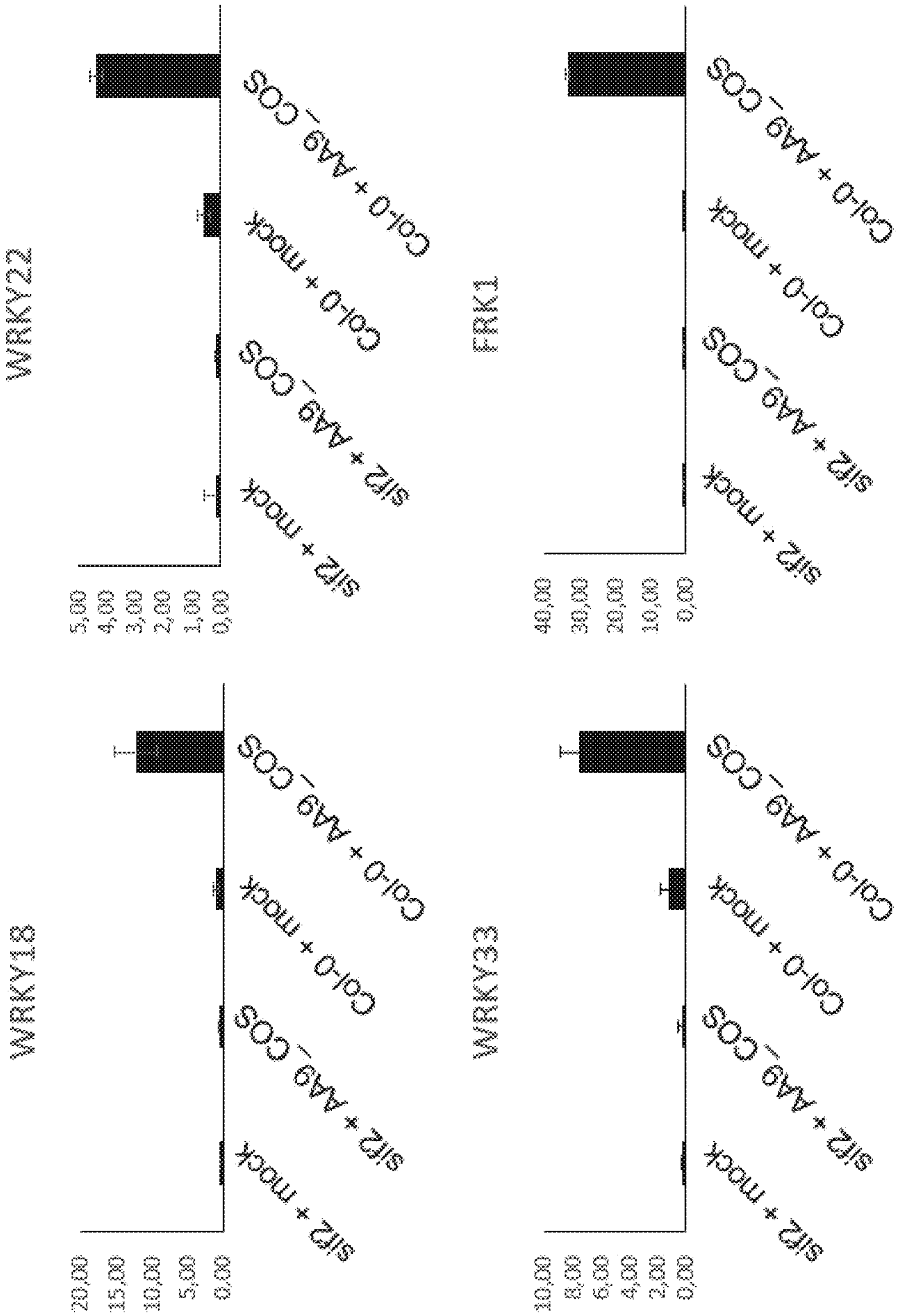
FIG. 11 illustrates gene expression of selected marker genes in SIF2 knock-out mutant plants (“SIF2”) 1 hour after treatment with 100 μM AA9_COS cellodextrins (“CD”). Wild type (“Col-0”) and mock (“mock”) controls are included.

SIF2 and SIF4, Two LRR-RLKs, Appear to be Involved in Defences Activation Driven by a Mixture of Oxidised Cellodextrins and Native Cellodextrins The transcriptomic analysis highlighted several PRR genes being modulated by AA9_COS treatment. Among them, two leucine-rich repeat receptor-like kinases (LRR-RLK), namely Stress Induced Factor 2 and 4 (SIF2 and SIF4), were strongly upregulated and featured in cluster 1 (FIG. 5*d*). To evaluate whether SIF2 and SIF4 play a role in signalling the AA9_COS-dependent defence gene activation, sif2-1 and sif4-1 loss-of-function mutants were droplet-treated with 100 μM AA9_COS and the expression of four marker-genes, FRK1, WRKY18, WRKY22 and WRKY33, was evaluated 1 h after treatment (FIG. 11). In both sif2-1 (FIG. 11) and sif4-1 (not shown) mutants the gene expression of all marker genes tested was not upregulated by the AA9_COS while the increase in the expression of these genes in wild-type plants was marked, indicating these LRR-RLKs are likely comprised among key regulators in signalling the AA9_COS-dependent PTI gene expression activation.

Protection in Tomatoes

Figure 12:
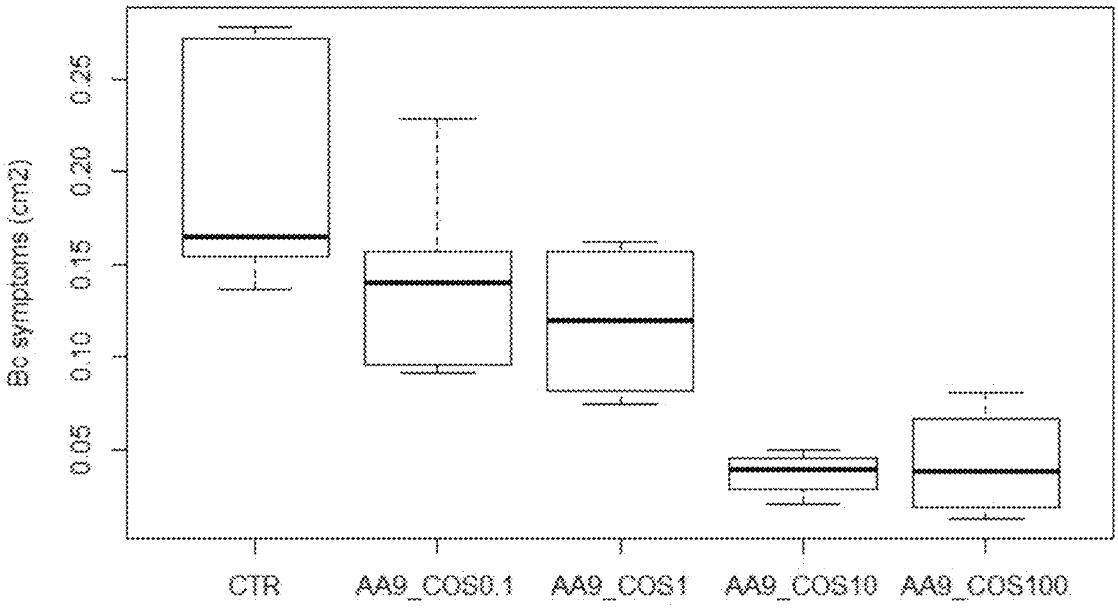
FIG. 12 illustrates plant elicitor activity of different concentrations of AA9_COS in tomatoes.

Protection of tomato plants against pathogen *Botrytis cinerea* using several concentrations (negative control (CTR), 0.1 μM, 1 μM, 10 μM, 100 μM) of AA9_COS cellodextrins (4:5:1 native cellodextrins, C1-oxidised and C4-oxidised cellodextrins) was demonstrated using the assay of Bc symptoms as described above. The values represent the size of the lesion areas produced during the infection by the pathogen, i.e., values lower than the control suggest that defence mechanisms were elicited. Beneficial effects were observed already with the lowest concentration of AA9_COS, i.e., 0.1 μM, and were pronounced already with 10 μM (FIG. 12).

Figure 13:
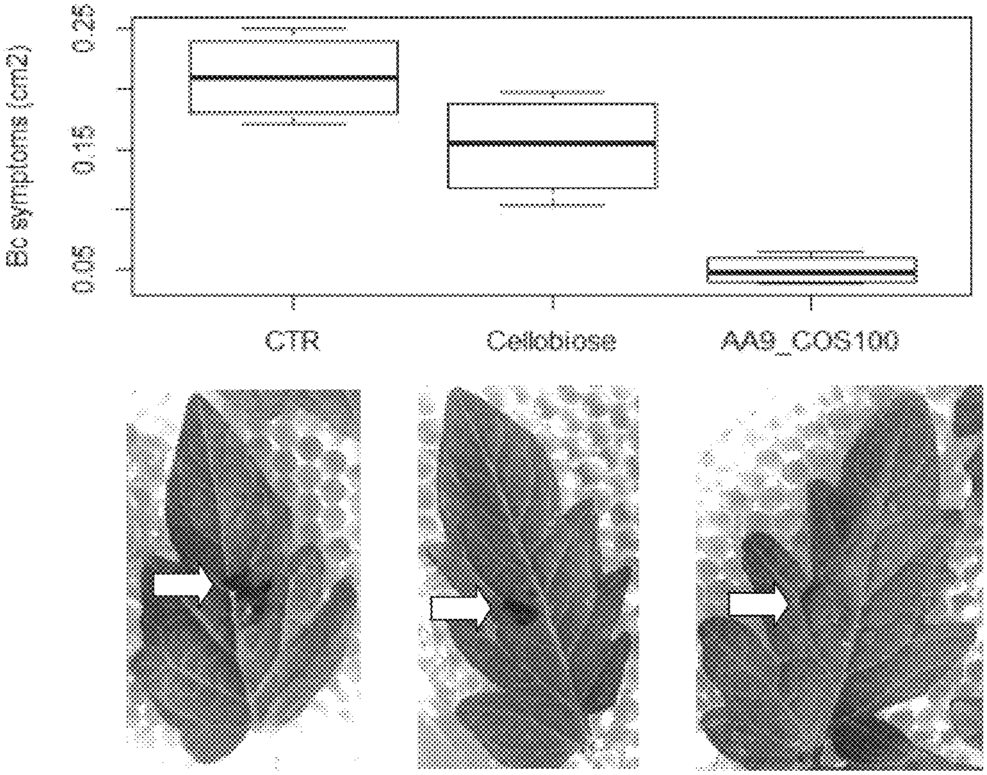
FIG. 13 illustrates plant elicitor activity of cellobiose vs. AA9_COS in tomatoes.

Comparison of Cellobiose Vs. A Mixture of Oxidised Cellodextrins and Native Cellodextrins in Tomatoes Protection of tomato plants against pathogen *Botrytis cinerea* using 100 μM cellobiose or 100 μM AA9_COS was compared ('CTR' is negative control). The values represent the size of the lesion areas produced during the infection by the pathogen, i.e., values lower than the control suggest that defence mechanisms were elicited. Cellobiose alone demonstrated less protective effect than the AA9_COS mixture (FIG. 13). All experiments were carried on 4 weeks old tomato plants infected with $10^6$ spores per millilitres of *Botrytis cinerea.*

Figure 14:
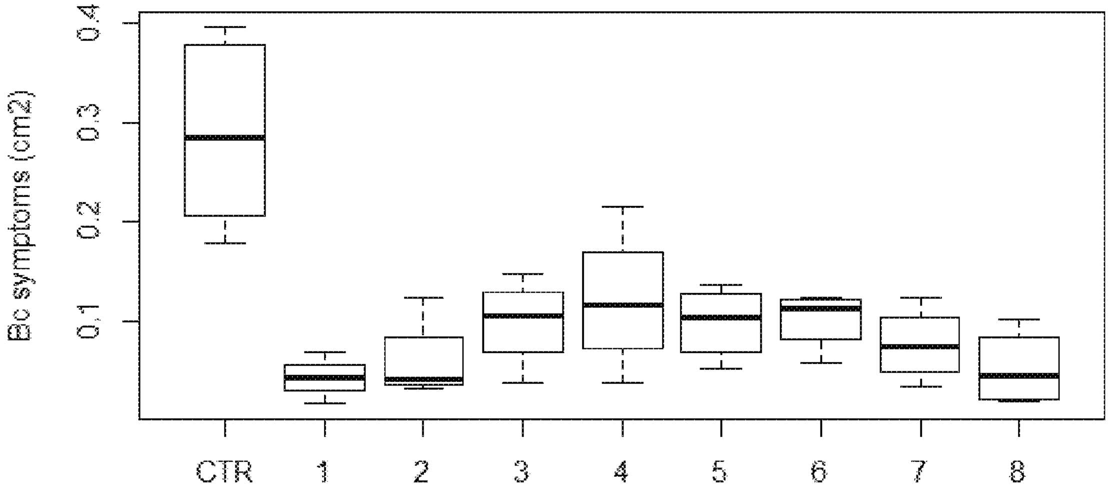
FIG. 14 illustrates plant elicitor activity of several combinations of native cellodextrines, and C1-oxidised, C4-oxidised, and optionally C1- and C4-oxidised (double oxidised) cellodextrines.

Comparison of Plant Elicitor Activity of Mixtures of Oxidised Cellodextrins and Native Cellodextrins Having Different Molar Ratios of Components Protection of tomatoes plant against pathogen *Botrytis cinerea* using several combinations of native cellodextrines, and C1-oxidised, C4-oxidised, and optionally C1- and C4-oxidised (double oxidised) cellodextrines was tested (FIG. 14). In particular, the numerals in FIG. 14 represent mixtures with the following molar proportions of the respective cellodextrins components:

native:C1-oxidised:C4-oxidised (1) 4:5:1; (2) 6.5:3:0.5; (3) 3:6.5:0.5; (4) 4:3:3; (5) 4:1:5; (6) 0.5:9:0.5;

native:C1-oxidised:C4-oxidised:doubly oxidised (7) 0.5:4:0.5:5; (8) 2.5:2.5:2.5:2.5.

The molar per parts amounts of the components were adjusted using a combination of known techniques to isolate the respective components, and admixing thereof. 'CTR' represents negative control, water.

The values represent the size of the lesion areas produced during the infection by the pathogen, i.e., values lower than the control suggest that defence mechanisms were elicited. All experiments were carried on 4 weeks old tomato plants infected with $10^6$ spores of *Botrytis cinerea*. All mixtures were applied having the same molar mass concentration of 100 μM.

Generally all mixtures used had successfully elicited plants defences. In this experimental model, the most active mixture was 4:5:1 and the least active 4:3:3, with other mixtures giving intermediate protection.

Example 3—Obtaining of the AA9_COS from Biorefinery Waste or Ad Hoc Designed Waste Bioprocessing Using Cellulosic Substrates and AA9 Enzymes Oxidised cellodextrins or mixtures of native and oxidised cellodextrins illustrating embodiments of the present invention, or components thereof such as cellobionic, can be obtained from several bio-resources, often waste of the bio-refinery industry based on lignocellulose, such as according to the following examples of existing bioprocesses that generate amount of waste containing or consisting entirely or partly of the AA9_COS.

Lignocellulosic Bioethanol Production:

The production of lignocellulosic bioethanol uses non-edible parts of wood or crop as source of cellulose to be converted into fermentable sugars via chemical-enzymatical reaction steps. The enzymes commercially and widely used contain considerable amount of AA9 or similar cellulose active family members of the AA family considered LPMO. The leftover lignocellulosic digested after the fermentation and ad distillation results in mixtures of phenols and undigested sugar derived molecules among which cellobionic acid is typically present at percentage from 0.1 to 2% of the total wet volume. As these enzymatic cocktails are designed to maximize the monosaccharides isolation, they contain significant amounts of beta-glucosidase enzymes that convert majority of the oxidised cellodextrins into the non-fermentable C1 or C4 oxidized disaccharide version (cellobionic acid and 4-ketobiose), alongside the fermentable glucose molecule. Examples of such processes are the Poet-DSM plant in USA, the SEKAB technology in Sweden, the GranBio in Brazil, ST1 in Finland, all operated by Novozymes Cellic Ctec family, Metgen and Graanul biotech joint venture on the Sweetwoods technology in Estonia, using their proprietary enzymes containing AA9 enzymes.

Production of Nanocellulose Fibers:

In the new emerging nanocellulose fibers industry great interest is given towards the use of cellulases enzymes containing especially AA9 like the enzyme needed to initiate the fibers opening. Similar to lignocellulosic bio-refineries, these processes are generating leftover stream of sugars.

Among these the cellobionic acid is present in amount estimated to be in a range of 0.1 to 2% of the total wet volume of sugar waste stream. The tuneable composition of the enzymes to be used in this processes render possible to configure without the presence of beta-glucosidase as the fibers must be retained intact therefore possible longer oxidised cellodextrins or mixtures of longer native and oxidised cellodextrins are obtainable rather than primarily or only the disaccharide version as in the case of lignocellulose bio-refinery.

Ad Hoc Bioprocesses for Valorisation of Wastepaper:

New ad hoc bioprocesses are envisaged for the direct or maximized production of oxidised cellodextrins or mixtures of native and oxidised cellodextrins by using low cost cellulosic substrate like waste paper that could be pre-treated enzymatically with AA9 enzymes to obtained several of the oxidised cellodextrins or mixtures of native and oxidised cellodextrins, prior its normal recycling chain (pulping).

So-obtained materials containing oxidised cellodextrins or mixtures of native and oxidised cellodextrins can be applied in agro-technology either directly or following optional enrichment or purification or formulation with suitable carriers.

Figure 15:
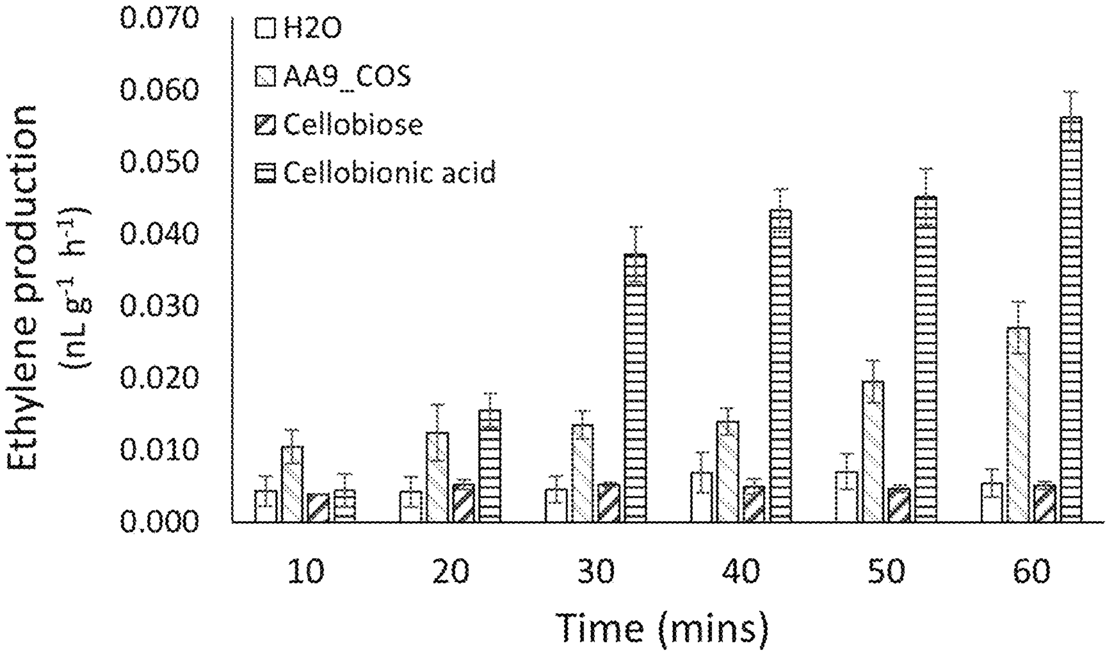
FIG. 15 illustrates ethylene emanation.

Example 4—Ethylene Emanation (FIG. 15)

Three *Arabidopsis* seedlings were cultivated in vitro for 3 weeks in glass vials containing sterile Murashige Skoog medium and treatments were performed by spraying 100 μM AA9_COS, 100 μM cellobiose, 100 μM cellobionic acid or mock (H2O). Ethylene production was analysed in three independent experiments with the ETD 300 detector (Sensor-Sense, Nijmegen, the Netherlands) under a stop-and-flow routine where the gas from one vial accumulated in an interval of 10 min, and then flushed to the detector. Bars in FIG. 15 represent mean and standard deviation. Ethylene production was higher in *Arabidopsis* seedlings treated with AA9_COS or cellobionic acid than in mock-treated seedlings. This demonstrates that the oxidized oligosaccharides contained in the AA9_COS mixture, especially cellobionic acid, are responsible for the induction of the key defence-related plant phytohormone Ethylene.

The invention claimed is:

1. A method for activating plant defence against plant pathogens, the method comprising:

contacting a plant with an effective amount of cellobionic acid or a phytopharmaceutically acceptable salt thereof.

2. The method according to claim 1, wherein the cellobionic acid or salt thereof is comprised in a composition, the composition further comprising:

one or more cellodextrins;

one or more C1-oxidised cellodextrins, or a phytopharmaceutically acceptable salt thereof;

one or more C4-oxidised cellodextrins; and/or one or more CI- and C4-oxidised cellodextrins, or a phytopharmaceutically acceptable salt thereof.

3. The method according to claim 1, wherein the cellobionic acid or salt thereof is comprised in a composition, the composition further comprising:

one or more further plant defence activator.

4. The method according to claim 2, wherein the cellodextrins, C1-oxidised cellodextrins, C4-oxidised cellodextrins, and C1- and C4-oxidised cellodextrins each independently have a degree of polymerization (DP) of from 2 to 10.

5. The method according to claim 1, wherein the cellobionic acid was produced by decomposition of cellulose by one or more lytic polysaccharide monooxygenase (LPMO).

6. The method according to claim 5, wherein at least one of the one or more LPMO belongs to auxiliary activity (AA) family 9.

7. The method according to claim 5, wherein one or more cellobiose dehydrogenase (CDH) is used to enhance the LPMO activity.

8. The use of method according to claim 5, wherein the cellulose is from lignocellulosic waste or pulping paper.

9. The method according to claim 1, wherein cellobionic acid or salt thereof is comprised in a composition and the concentration of the cellobionic acid or salt thereof in the composition is from 0.10 μM to 1000 μM.

10. The method according to claim 3, wherein the total concentration of the cellodextrins, C1-oxidised cellodextrins including the cellobionic acid, C4-oxidised cellodextrins, and/or C1- and C4-oxidised cellodextrins in the composition is from 0.10 μM to 1000 μM.

11. The method according to claim 1, wherein the composition comprises cellodextrins, C1-oxidised cellodextrins, and C4-oxidised cellodextrins in a molar ratio of about 4:5:1.

12. The method according to claim 1, wherein:

a plant infection by a plant pathogen is prevented, controlled, or treated;

the plant pathogen is a fungus or a bacterium;

the plant is a dicot plant; and/or contacting the plant is via an organ of the plant.

13. A phytopharmaceutical composition comprising cellobionic acid or a phytopharmaceutically acceptable salt thereof, and a phytopharmaceutically acceptable carrier comprising one or more anionic, non-ionic, amphoteric, or cationic surfactant, or a combination thereof.

14. The phytopharmaceutical composition of claim 13, wherein the composition comprises 0.10 μM to 1000 μM of cellobionic acid or salt thereof.

15. The phytopharmaceutical composition of claim 13, wherein:

the composition further comprises one or more cellodextrin; one or more C1-oxidised cellodextrin, or a phytopharmaceutically acceptable salt thereof; one or more C4-oxidised cellodextrin; and/or one or more C1- and C4-oxidised cellodextrin, or a phytopharmaceutically acceptable salt thereof;

the composition further comprises one or more further plant defence elicitor;

the DP of the cellodextrins, C1-oxidised cellodextrins, C4-oxidised cellodextrins, and C1- and C4-oxidised cellodextrins is each independently from 2 to 10;

the cellobionic acid, or the cellodextrins, C1-oxidised cellodextrins, C4-oxidised cellodextrins, and C1- and C4-oxidised cellodextrins are produced by decomposition of cellulose by one or more LPMO, optionally wherein:

at least one of the one or more LPMO belongs to auxiliary activity (AA) family 9;

one or more CDH is used to enhance the LPMO activity; and/or the cellulose is from lignocellulosic waste or pulping paper;

the total concentration of the cellodextrins, C1-oxidised cellodextrins including the cellobionic acid, C4-oxidised cellodextrins, and C1- and C4-oxidised cellodextrins is from 0.10 μM to 1000 μM; and/or the composition comprises cellodextrins, C1-oxidised cellodextrins, and C4-oxidised cellodextrins in a molar ratio of about 4:5:1.

16. The phytopharmaceutical composition of claim 13, wherein the surfactant is a non-ionic surfactant $[C_{14}H_{22}O(C_2H_4O)_n]$ that has a hydrophilic polyethylene oxide chain with an average of 9.5 ethylene oxide units and a 4-(1,1,3,3-tetramethylbutyl)-phenyl group, polyoxyethylene (20) sorbitan monolaurate, polyoxyethylene (20) sorbitan monopalmitate, and/or 3-(2-methoxyethoxy) propylmethyl-bis(trimethylsilyloxy) silane.

17. The method according to claim 3, wherein the one or more further plant defence activator is a plant or fungal cell wall derived compound.

18. The method according to claim 3, wherein the one or more further plant defence activator is pectin fragments, oligogalacturonides, cellobiose, xyloglucan, non-branched β-1,3-glucan, chitin fragments, arabinose, arabinan, rhamnose, homogalacturonan, rhamnogalacturonan I and II, xylogalacturonan, starch, or combinations thereof.

19. The method according to claim 4, wherein the DP is from 2 to 5.

20. The method according to claim 2, wherein the C1-oxidised cellodextrins, C4-oxidised cellodextrins, and/or C1- and C4-oxidised cellodextrins were produced by decomposition of cellulose by one or more LPMO.

* * * * *

SEQUENCE LISTING

```
<160> NUMBER OF SEQ ID NOS: 3

<210> SEQ ID NO 1
<211> LENGTH: 678
<212> TYPE: DNA
<213> ORGANISM: artificial sequence
<220> FEATURE:
<223> OTHER INFORMATION: TtAA9E from Thielavia terrestris

<400> SEQUENCE: 1

atgttagcta atggtgcaat cgttttcctt gctgccgcct tgggtgtgtc cggacattac      60

acctggccac gtgtcaatga cggtgccgac tggcagcagg taaggaaggc cgataattgg     120

caggataacg gttacgttgg tgatgtgacg tcaccacaaa tcaggtgctt tcaagctacc     180

ccaagtcctg ctccaagtgt acttaatact acagctggct ctaccgtcac ttactgggcc     240

aacccagatg tgtatcatcc aggtcctgtt caattttaca tggctagggt gcctgacggc     300

gaagatatta actcatggaa cggtgacgga gctgtttggt tcaaagtcta cgaagatcat     360

cctactttcg gtgcccaatt gacatggcct tccactggta agagttcttt tgctgtaccc     420

attccaccat gcatcaaaag tggatattat ctattgagag ccgaacagat tggattgcat     480

gtggctcaga gtgttggagg agctcaattc tatatttcct gcgcccaatt atctgttact     540

ggaggaggat caaccgaacc acccaataag gttgcattcc ccggagctta ttccgccact     600

gatccaggta ttcttattaa tatttattat cctgtgccta cgtcctatca aaatcctgga     660

ccagctgtat tttcttgc                                                   678


<210> SEQ ID NO 2
<211> LENGTH: 40
<212> TYPE: DNA
<213> ORGANISM: artificial sequence
<220> FEATURE:
<223> OTHER INFORMATION: MtAA9A forward primer

<400> SEQUENCE: 2

agcatcatta cacctcagca atgaagtcct tcaccctcac                           40


<210> SEQ ID NO 3
<211> LENGTH: 40
<212> TYPE: DNA
```

-continued

```
<213> ORGANISM: artificial sequence
<220> FEATURE:
<223> OTHER INFORMATION: MtAA9A reverse primer

<400> SEQUENCE: 3

taaatcacta gatatctcta ttagacgcac tgcgagtagt                    40
```